United States Patent [19]
Iino et al.

[11] Patent Number: 5,347,446
[45] Date of Patent: Sep. 13, 1994

[54] MODEL PREDICTIVE CONTROL APPARATUS

[75] Inventors: Yutaka Iino; Junko Ohya, both of Kawasaki, Japan

[73] Assignee: Kabushiki Kaisha Toshiba, Kawasaki, Japan

[21] Appl. No.: 938,256

[22] PCT Filed: Feb. 10, 1992

[86] PCT No.: PCT/JP92/00131
§ 371 Date: Oct. 8, 1992
§ 102(e) Date: Oct. 8, 1992

[87] PCT Pub. No.: WO92/14197
PCT Pub. Date: Aug. 20, 1992

[30] Foreign Application Priority Data

Feb. 8, 1991 [JP] Japan ................. 3-017527
Feb. 20, 1991 [JP] Japan ................. 3-047494
Apr. 8, 1991 [JP] Japan ................. 3-075333
Jul. 30, 1991 [JP] Japan ................. 3-190162

[51] Int. Cl.$^5$ .................. G05B 13/04; G05B 13/02
[52] U.S. Cl. .................. 364/149; 364/153; 364/164
[58] Field of Search .................. 364/148–158, 364/159, 165, 164

[56] References Cited

U.S. PATENT DOCUMENTS

| | | | |
|---|---|---|---|
| 4,349,869 | 9/1982 | Prett et al. ................. | 364/159 |
| 4,358,822 | 11/1982 | Sanchez ................. | 364/151 |
| 4,634,946 | 1/1987 | Moulds, IV et al. ................. | 364/150 |
| 4,714,988 | 12/1987 | Hiroi et al. ................. | 364/158 |
| 4,792,870 | 12/1988 | Pinson ................. | 364/165 |
| 4,969,408 | 11/1990 | Archer et al. ................. | 364/149 |
| 5,057,992 | 10/1991 | Traiger ................. | 364/148 |
| 5,170,935 | 12/1992 | Federspiel et al. ................. | 364/151 |

Primary Examiner—Jerry Smith
Assistant Examiner—Jim Trammell
Attorney, Agent, or Firm—Foley & Lardner

[57] ABSTRACT

A model predictive control apparatus constructed in consideration of limit conditions of the process and also suitable for a multi-input/output system and an input device suitable for such a control apparatus are disclosed.

The model predictive control apparatus includes an transformation unit for transforming the cost function and the limit condition to a conditional expression only relating to the manipulated variable. A suitable cost function parameter adjustment unit in which robustness is taken into consideration is provided. Alternatively, by designation of a response time constant, a weight corresponding thereto is calculated or determined to carry out evaluation of stability margin.

In addition, the input device is adapted to carry out, through a picture on screen, setting or alteration of a predictive model or control parameters, etc. to be inputted, thus to suitably conduct setting while confirming it on the screen.

21 Claims, 30 Drawing Sheets

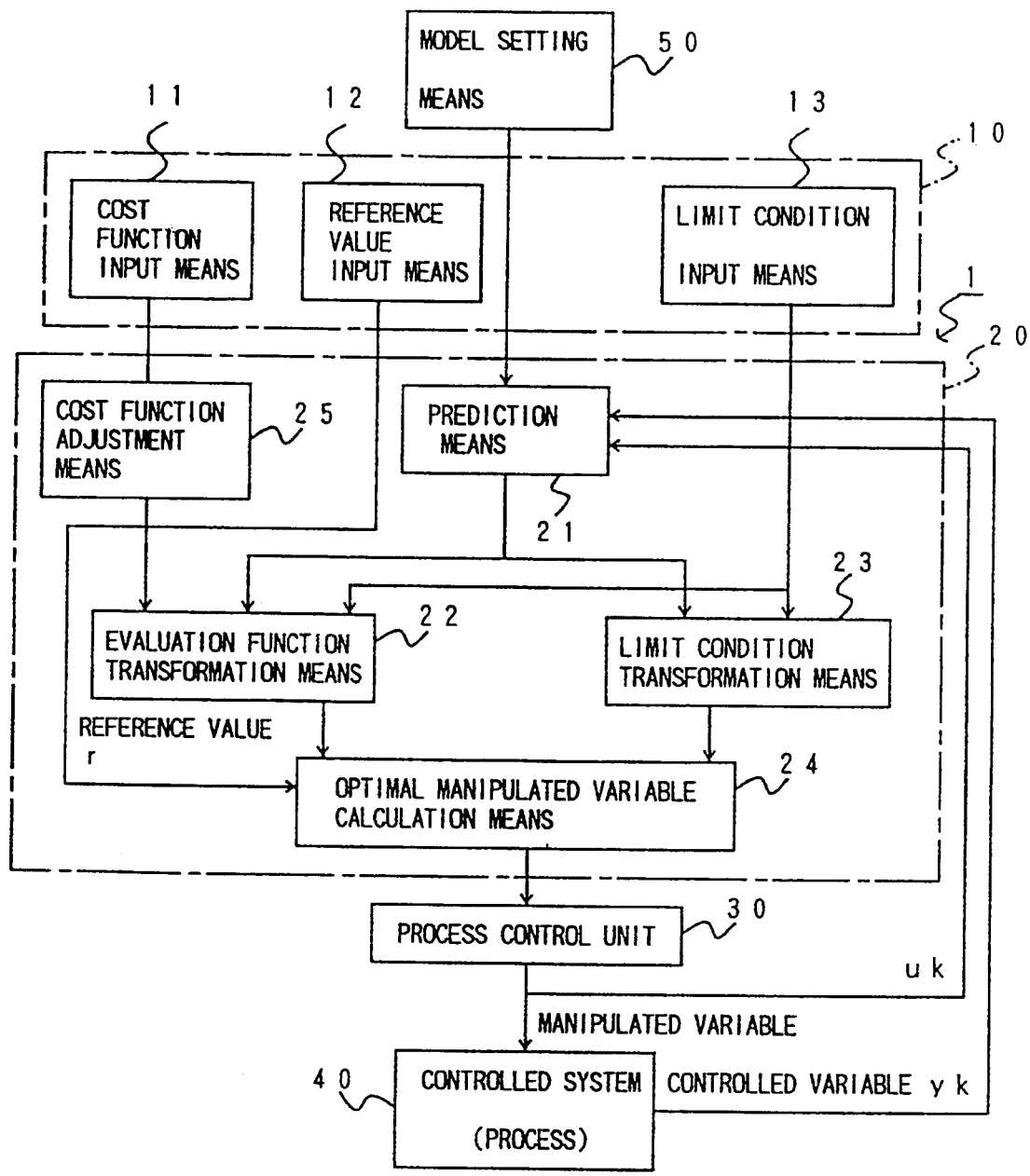
F I G. 1

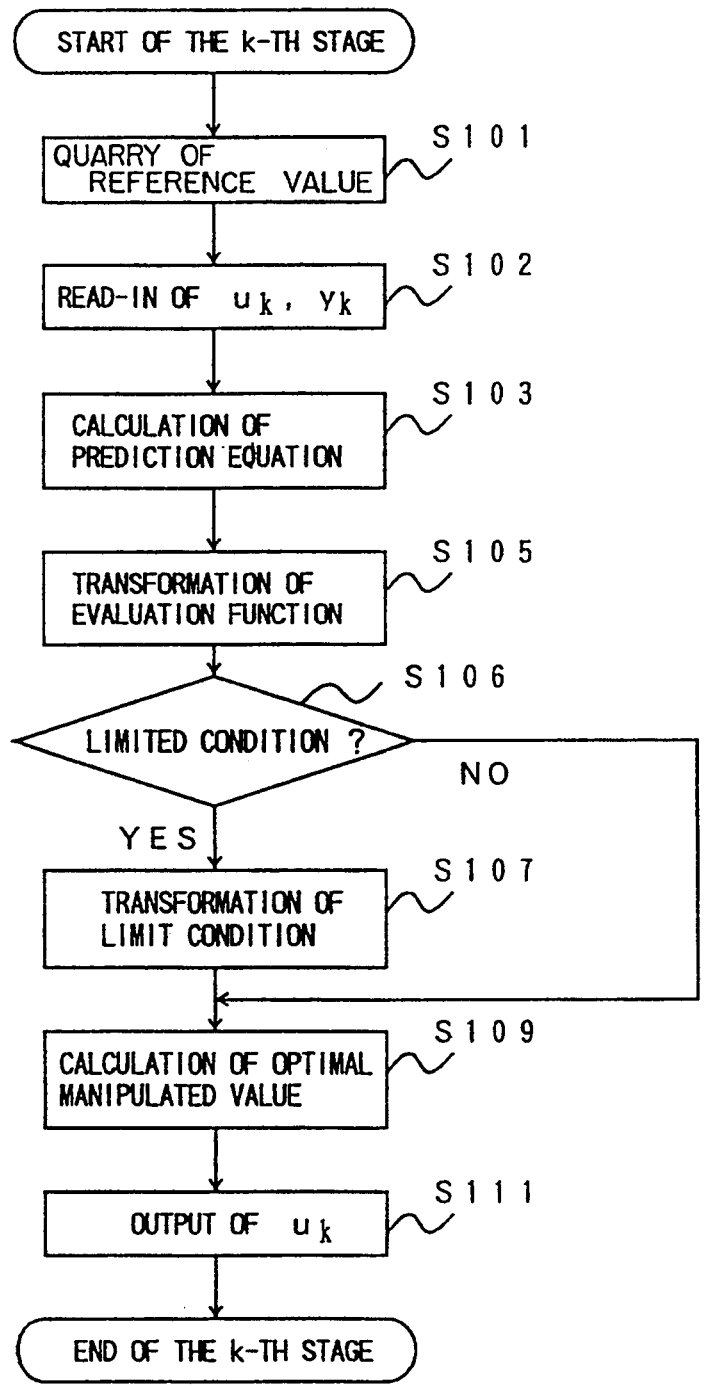
F I G. 2

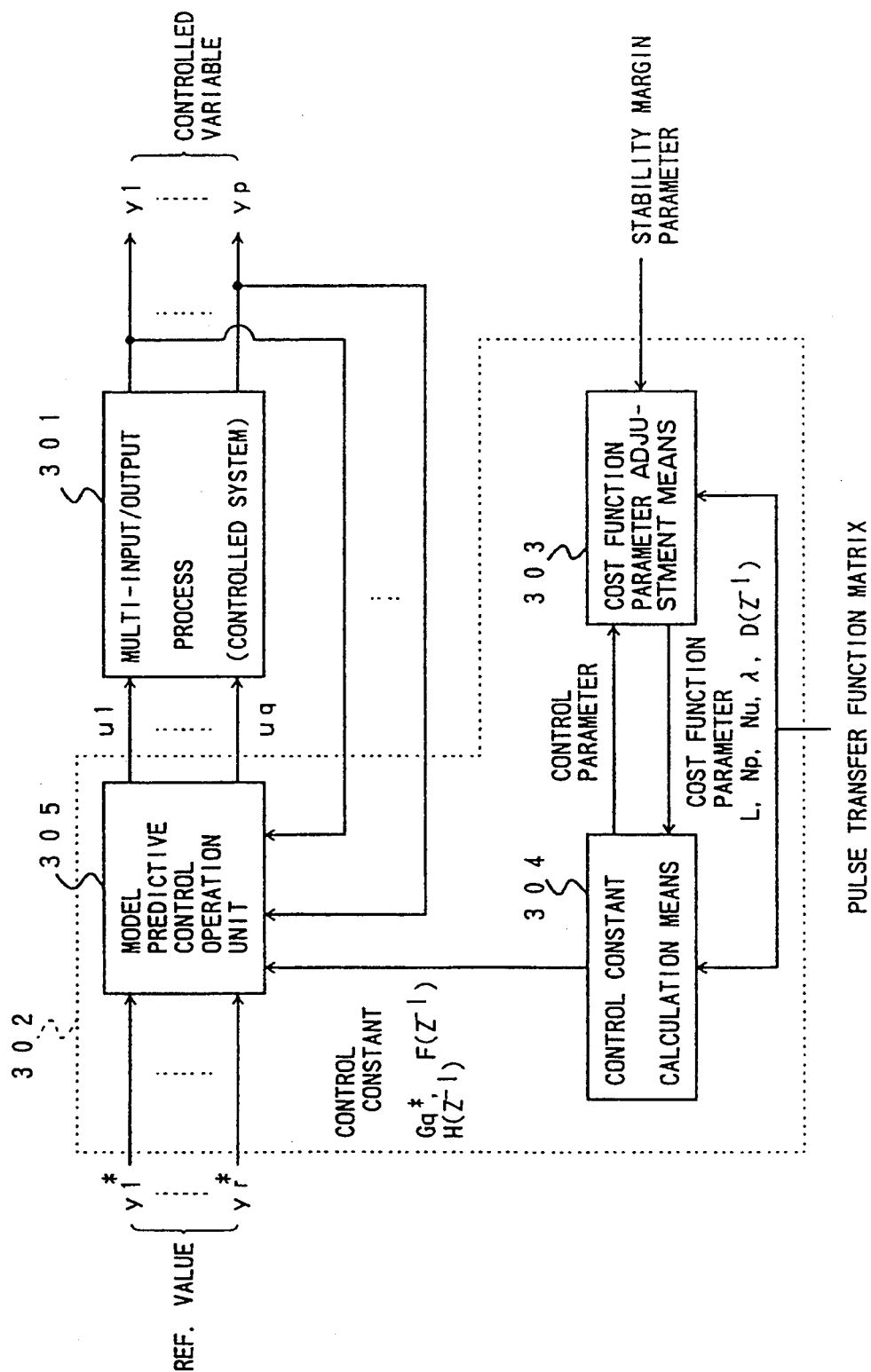
F I G. 19

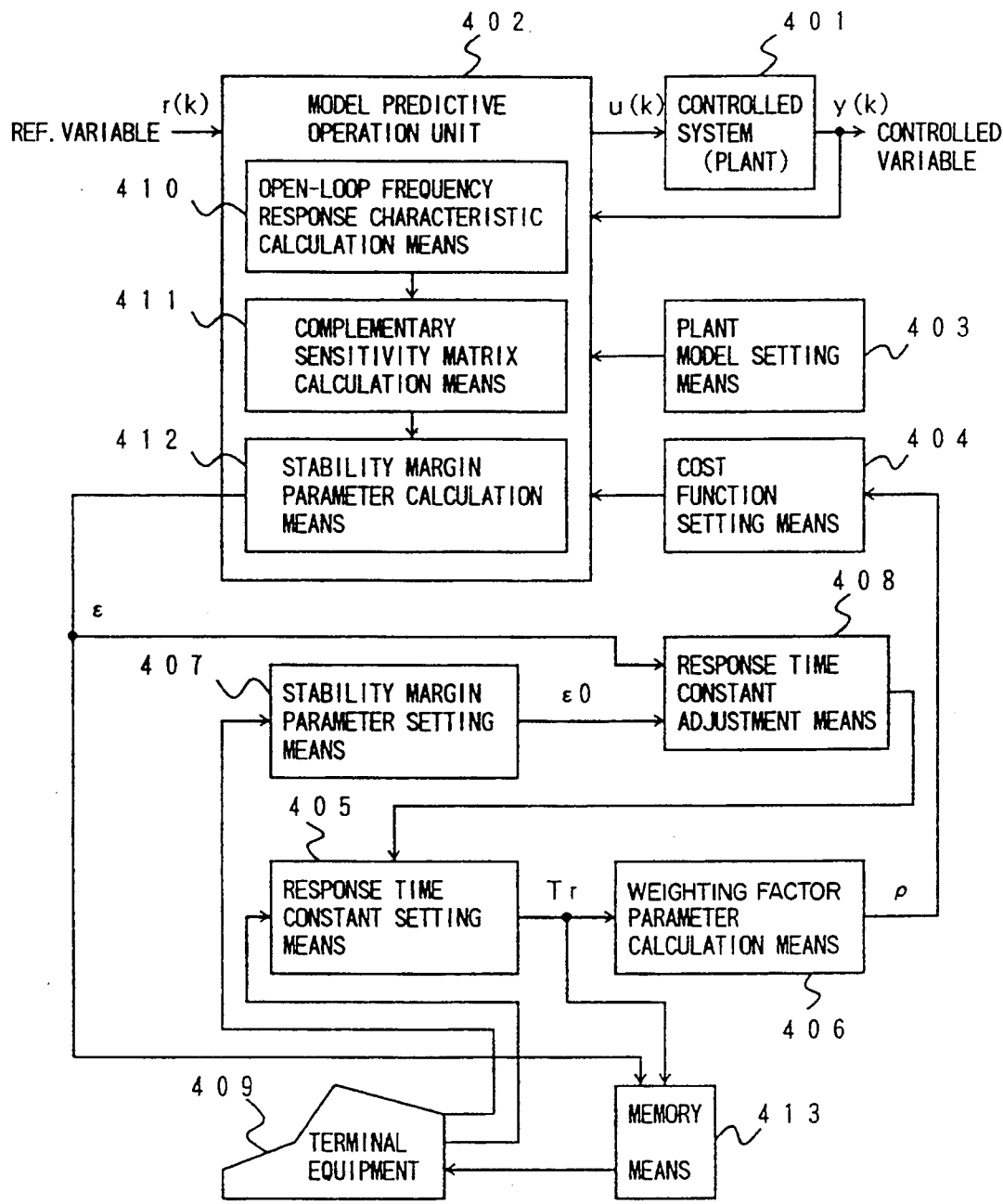
F I G. 29

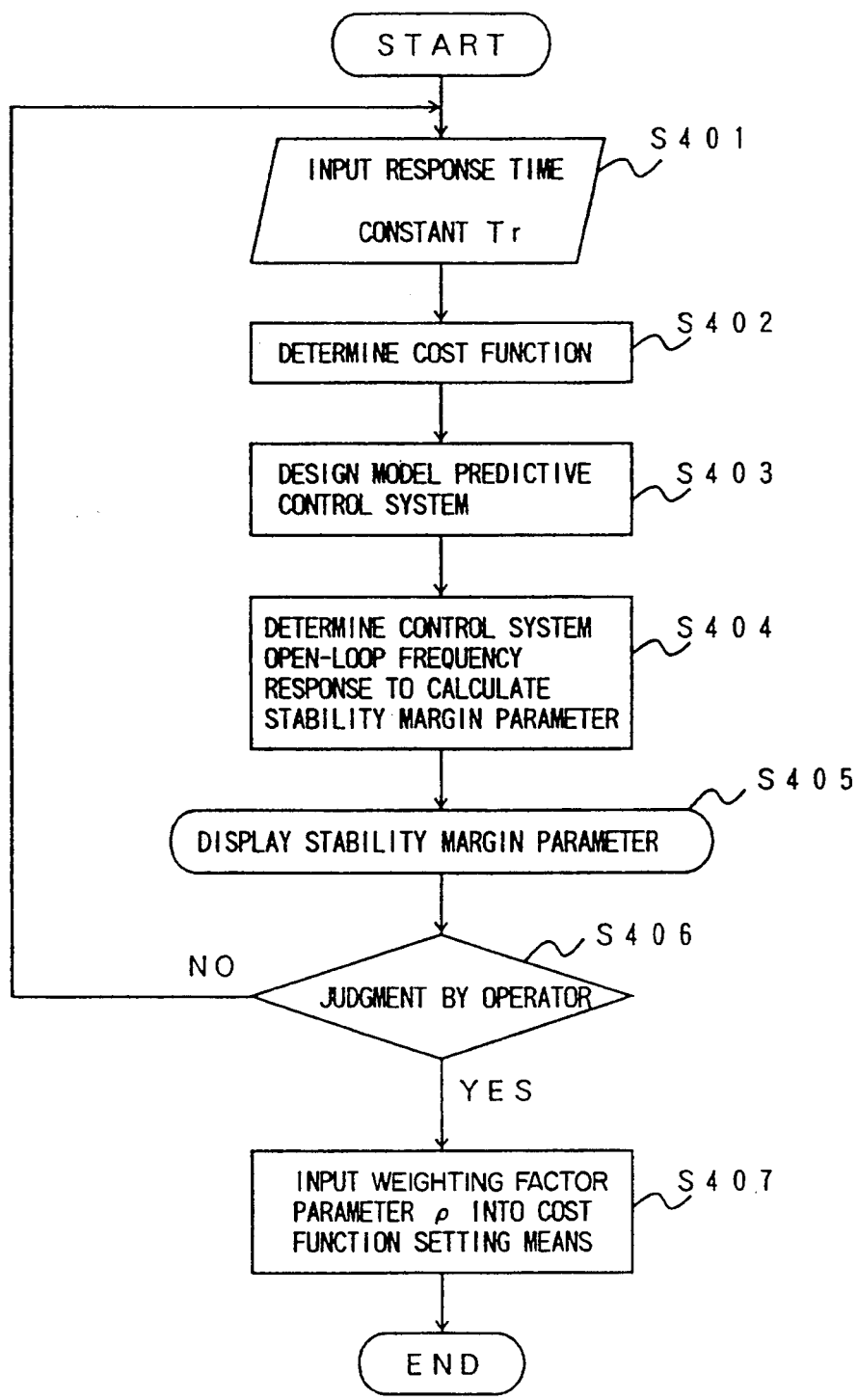
F I G. 31

MODEL PREDICTIVE CONTROL APPARATUS

TECHNICAL FIELD

This invention relates to a model predictive control apparatus adapted for predicting future movement or trend of a control response on the basis of a dynamic characteristic model of a controlled system to calculate manipulated variables while taking such a prediction in consideration, and an input device for a model predictive control, which is adapted to carry out setting of the operation condition, manipulated variables, or the like at this model predictive control apparatus.

BACKGROUND ART

In recent years, in the process control system, there have been frequently used model predictive control technologies to construct a linear discrete time model on the basis of an impulse response or a step response of the process in order to conduct optimal control/operation while satisfying a large number of limits imposed on the process (plant) to calculate in sequence, from a predictive equation or formula derived from this model, such an optimal manipulated variables to minimize an cost function in quadratic form relating to deviations from reference or objective values of controlled variable's future values and manipulated variable's future values.

These technologies aim at determining manipulated variables applied at the present time point in order that a controlled variable future value to follow a reference value trajectory as close as possible is provided under a necessary minimum change in the manipulated variable.

Such model predictive control apparatus has merits as recited below.

1) Control response stable with respect to a process having a long dead time can be realized,
2) Quick response property can be improved by a feed-forward control using a future reference value,
3) Such model predictive control apparatus can be applied to a multi-variable control system as well,
4) Without necessity of an accurate dynamic characteristic model of a controlled system, it is possible to easily design a control system from a step response, for example.
5) By including a physical law or a non-linear dynamics of a controlled system (process) into the predictive model, fine control can be expected,
6) It is possible to directly insert limit condition relating to an operation of a controlled system (e.g., upper and lower limiters, change rate limiters, etc.) into control rule, and the like.

Until now, various predictive control systems have been proposed. These systems are explained, e.g., in the following literatures.

(1) Nishitani: Application of Model Predictive Control, Measurement and Control (Japanese) Vol. 28, No. 11, pp. 996-1004 (1989), and
(2) D. W. Clarke & C. Mohtadi: Properties of Generalized Predictive Control, Automatica 25-6 pp. 859 (1989), etc. Particularly, in the literature (2), a Generalized Predictive Control (GPC) including various model predictive control systems has been proposed. In accordance with this control system, when a future reference value y* is given, a control response future value y(k+i)(i=1, . . . , Np) is predicted on the basis of a model of a controlled system (process) to calculate or determine a manipulated variable increment $\Delta u(K)$ which minimizes a control cost function indicating control performance:

$$J = \sum_{i=L}^{Np+L-1} \{D(z^{-1})(y(k+i) - y^*(k+i))\}^2 + \lambda \sum_{i=1}^{Nu} (\Delta u(k+i-1))^2 \quad (1)$$

where parameter L is a prediction starting time, parameter Np is a prediction horizon, parameter Nu is a control horizon, parameter $\lambda$ is a weighting factor or coefficient, and $D(Z^{-1})$ is a pole assignment polynomial.

In this control technology, since a predictive equation for determining future values of controlled variables or manipulated variables is represented by a function relating to past controlled variables or manipulated variables, prediction is carried out every time on the basis of past controlled variables or manipulated variables so that a controlled variable's future value becomes closer to a corresponding reference or objective value to determine a manipulated value applied at that time point. At this time, it is necessary to determine manipulated variables in order to satisfy the limit conditions relating to controlled variables/manipulated variables.

Meanwhile, as a general method of determining an optimal solution to minimize an cost function in a quadratic form while satisfying the limit conditions or constraints, there is a quadratic programming (QP) (With respect to QP, see Konno and Yamashita "Non-linear Programming" (Nikka Giren), Sekine "Mathematical Programming" (Iwanani Shoten), etc.). In order to use this QP, the cost function and the constraints must relate to only manipulated variables which are a parameter to be optimized.

However, as the constraints imposed on the process, there are not only those relating the manipulated variable which is a parameter to be optimized, but also those relating to controlled variable or those relating to controlled variable change rate. Accordingly, with conventional control systems, it was impossible to solve manipulated variables which can satisfy the above-mentioned latter constrains by QP as well.

As stated above, in the conventional model predictive control technology, since while there exist not only constrains imposed on the process relating to manipulated variable but also those relating to controlled variable and controlled variable change rate, manipulated variables which satisfy constrains relating to those controlled variables could not be solved by QP, it was impossible to conduct a control in which constrains relating to controlled variable with respect to the process are also taken into consideration.

It is to be noted that several of model predictive control systems in which constrains relating to controlled variable/manipulated variable/future value thereof of the process are taken into consideration have been already proposed by the inventors of this application. For example, there are (3) Ohya and Iino "Model predictive control system in which constrains relating to controlled variable and manipulated variable are taken into consideration" (Preliminary Report of Science Lecture Meeting No. 29 of Measurement Automatic Control Society JS-2-4, p. 19, July (1990)), (4) Ohya and Iino "Model Predictive Control System" (Japanese Patent Application No. 111800/1990), and (5) Iino and Ohya "Model Predictive Control Apparatus" (Japanese Patent Application No. 138541/1990), etc.

In accordance with these control systems, upper and lower limit conditions expressed below with respect to values from a present or current time k up to a certain time point in future are given to a controlled variable $y(k)$, a controlled variable change rate $\Delta y(k) = y(k) - y(k-1)$, a manipulated variable $u(k)$, a manipulated variable change rate $\Delta u(k) = u(k) - u(k-1)$:

$$y_{min}(k+i) \leq y(k+i) \leq y_{max}(k+i) \quad (2)$$

$$\Delta y_{min}(k+i) \leq \Delta y(k+i) \leq \Delta y_{max}(k+i) \quad (3)$$

where $i = 1, 2, 3, \ldots Np$ (Np is a prediction horizon and indicates a time range in which a controlled variable predictive value is taken into consideration).

$$u_{min}(k+i) \leq u(k+i) \leq u_{max}(k+i) \quad (4)$$

$$\Delta u_{min}(k+i) \leq \Delta u(k+i) \leq \Delta u_{max}(k+i) \quad (5)$$

where $i = 0, 1, 2, 3, \ldots Nu$ (Nu is a control horizon and indicates a time range of a future optimal manipulated variable calculated at a time by control operation). Then, manipulated variables to minimize the above-mentioned cost function J in a quadratic form are calculated while satisfying the above-mentioned upper and lower limit conditions to give the manipulated values thus calculated to a controlled system.

Meanwhile, in order to execute the above-described model predictive control, it is necessary to select in advance equations of the predictive model, and a large number of various control parameters included in the control cost function (1) or the upper and lower limit equations (2) to (5). Further, a process operator must suitably change the predictive model equation and/or various control parameters with a view to rationally adjusting diverse future reference value response characteristics or a large number of limit conditions depending on the operating condition varying every moment on the basis of the operation experience of the operator.

Accordingly, in the model predictive control, it is necessary to monitor and adjust parameters more than those in the conventional PID control. In addition, it is necessary to manipulate a plant operation so that various operation indices such as economical cost function, etc. indicating the operation cost, or the production amount of the process, etc. are satisfied while making a comparison between a present process state and a future process state.

However, a console which has been used for a conventional PID control has only a function to indicate or display a present operating state, or present and past operating states. Accordingly, simply using such a console for a model predictive control makes it difficult to conduct an accurate display of information and quick inputting operation.

The conventional model predictive control system is of a structure such that a model predictive control operation unit and control parameters calculation means are provided with respect to one input/output process. Namely, a process of one input/output system having a single manipulated variable and a single controlled variable is an object to be controlled.

However, many processes such as chemical, iron and steel, cement, paper making, foods or the like constitute a multivariable system (multi-input/output system) where a plurality of control variables such as temperature, pressure, flow rate, liquid level, and the like interfere with each other. Accordingly, an effective control system is expected for these controlled systems. In the case where the model predictive control is applied to these controlled systems, the following problems arise.

First, in these multi-input/output systems, there are instances where the number of manipulated variables and the number of controlled variables are different. In a multi-variable control system design method using an easily available transfer function conventionally proposed, it is the premise that the number of manipulated variables and the number of controlled variables are equal to each other. For example, an example thereof is described in "Design Theory of Linear Control System" (Japanese) Publication of Society of Instrumentation, Control Engineers, Chapter 6 (pp. 186–221). Accordingly, this design method cannot be used for design of the model predictive control system as it is.

Hence, a model predictive control system which can be applied also in the case where the number of manipulated variables and the number of controlled variables are different is required.

Secondly, in the model predictive control system, since the characteristic of the control system, particularly stability or robust property with respect to characteristic change, i.e., stability margin in so called a Nyquist stability criterion varies to much degree depending on how to select cost function parameters L, Np, Nu, $\lambda$, $D(Z^{-1})$ included in the above-described cost function of the equation (1), it is necessary to suitably make adjustment (tuning) of the above-mentioned parameters at the time of starting of a control apparatus.

However, in the conventional model predictive control apparatus, the relationship between the cost function parameters and the control characteristic is not caused to become clear, so an operator empirically determined these cost function parameters while repeating trial-and-error. For this reason, labor is required for making an adjustment so that the control system is sufficiently stabilized, and it takes much time for starting of the control apparatus.

Further, in the conventional model predictive control systems, since control operation is carried out by placing emphasis on minimization of the cost function of the equation (1), there may take place the case where a closed loop pole determining a transient response characteristic of the control system cannot be suitably assigned. As a result, there may take place the problem that even if the control response is stable or quick, there results an oscillatory response form.

An object of this invention is to provide a model predictive control apparatus directed for a controlled system of multi-input/output including the case where the number of manipulated variables and that of controlled variables are different, and capable of calculating, by using QP, optimal manipulated variables to minimize an cost function while satisfying not only the limit condition relating to manipulated variables, but also the limit condition relating to controlled variables and their change rates.

Another object of this invention is to provide an input device suitable for a control apparatus of the model predictive control system.

A further object of this invention is to provide a model predictive control apparatus such that cost function parameters are automatically set to respective optimal values.

A still further object of this invention is to provide a model predictive apparatus in which an oscillation of a controlled value y in a rise response characteristic is suppressed.

BRIEF DESCRIPTION OF THE DRAWINGS

FIG. 1 is a functional block diagram showing the configuration the entirety of a model predictive control system according to an embodiment of this invention, FIG. 2 is a flowchart showing a flow of the control system by the model predictive control apparatus shown in FIG. 1, FIG. 10 is an explanatory view of a limit value input mode picture on screen by a reference model input, FIG. 11 is an explanatory view of a limit value input mode picture on screen, by a free-form curve input reference model input, FIG. 12 is an explanatory view of a control deviation threshold value input mode picture on screen, FIG. 13 is an explanatory view of a control deviation threshold value input mode having an attenuation characteristic, FIG. 19 is a block diagram showing the configuration of a multi-variable model predictive control apparatus of this invention, FIG. 29 is a block diagram showing an embodiment of a model predictive control apparatus of this invention, FIG. 31 is a flowchart for explaining a processing procedure in stability margin parameter calculation means.

DISCLOSURE OF THE INVENTION

Figure 3:
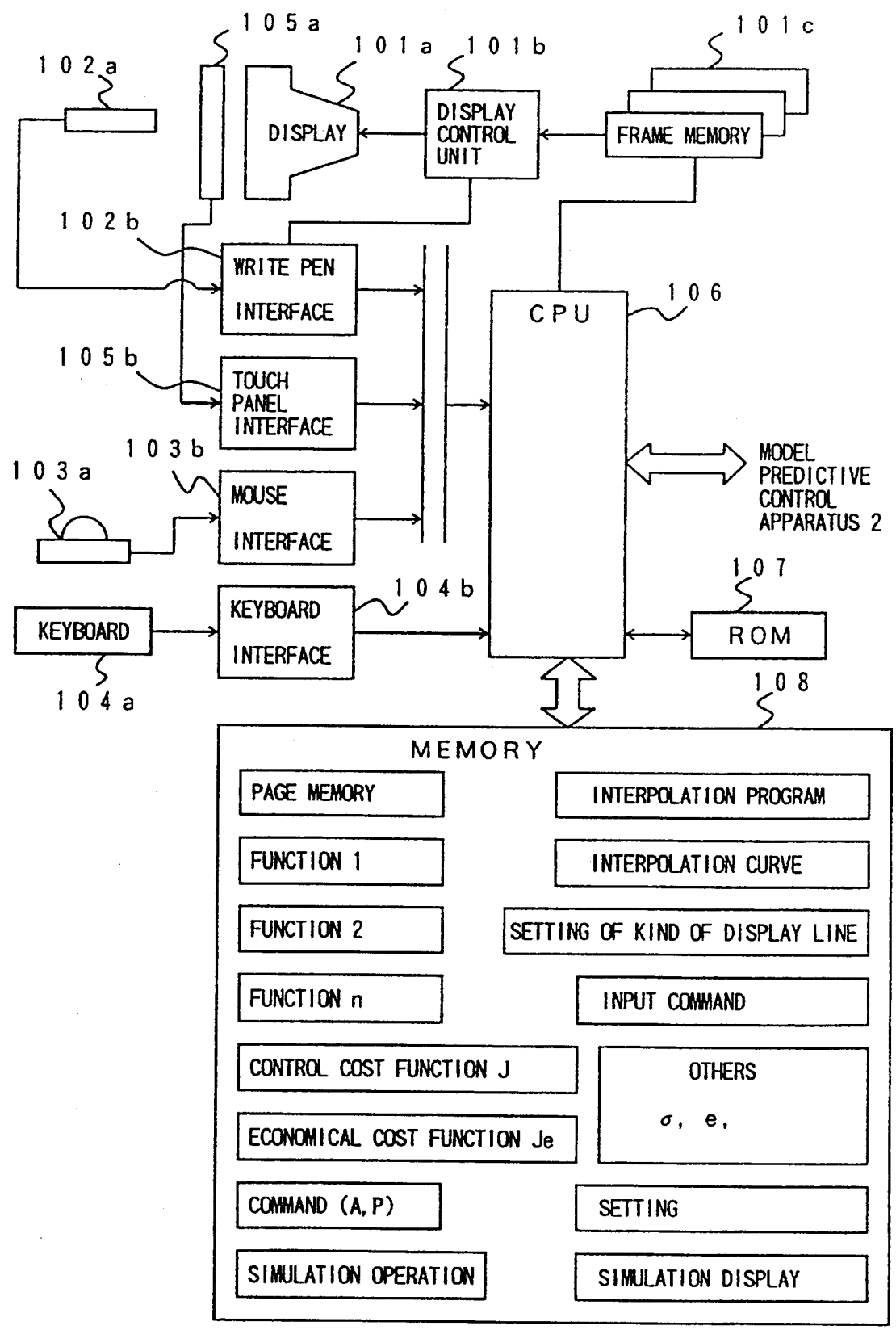
FIG. 3 is a functional block diagram of the input device 10.

In accordance with this invention, there is provided a model predictive control apparatus comprising: prediction means in which a model approximating a dynamic characteristic of a controlled system having a plurality of manipulated variables and controlled variables is used to determine a predictive equation of future values of the controlled variables; and arithmetic means adapted to transform limit conditions of a control condition to manipulated variables, and to calculate a manipulated variable to minimize an cost function in a quadratic form relating to a difference between a future reference value and a manipulated value, set on the basis of the predictive equation while satisfying the limit conditions, thus to give the calculated manipulated variable to the controlled system.

In the model predictive control apparatus of this invention, since an approach is employed to transform the cost function and all the constraints to constraints relating to a manipulated variable change rate which is a parameter to be optimized to calculate, by using QP, a manipulated variable change rate to minimize the transformed cost function while satisfying all the transformed constrains, control can be carried out by taking into consideration not only the constrains relating to manipulated variables but also the constrains relating to controlled variables. Thus, satisfactory control function can be provided also with respect to a controlled system such as a plant, etc. in which constrains are added with respect to not only manipulated variables but also controlled variables.

Further, in accordance with this invention, there is provided an input device for inputting control parameters of the model predictive control apparatus, comprising: screen display means for visually displaying various control information on a screen; future reference characteristic input means for inputting a new future reference value from the content displayed on the screen display means; limit condition input means for inputting a new limit condition corresponding to the reference characteristic from the content displayed on the screen display means; simulation arithmetic means adapted for repeatedly applying model predictive control operation to a dynamic characteristic model of a controlled system by using the new future reference value and the new limit condition to calculate a predictive controlled variable response indicating a response characteristic of the predictive controlled variable; simulation display means for allowing the screen display means to graphically display thereon the new future reference value, the new limit condition and the predictive controlled variable response; and setting means responsive to a setting command generated subsequently to the graphic display to set the new future reference value and the new limit condition at the model predictive control apparatus.

In accordance with this input device, when a future reference that the model predictive control apparatus should follow or a limit condition that the model predictive control apparatus should follow is inputted, simulation is carried out to display it on the screen. Thus, before a new future reference, etc. is set at the model predictive control apparatus, reasonableness of a newly selected reference, etc. or safety of the plant operation is conjectured in advance.

Further, in accordance with this invention, there is provided an input device for the model predictive control apparatus, comprising: cost function memory means for storing an cost function serving as an operation index of the controlled system such as a process equipment with at least a deviation between the predictive controlled variable and the future reference value and the manipulated variable being as a parameter; screen display means for displaying the cost function on the screen; cost function input means for updating the cost function by parameters of the cost function inputted through the screen to form a new cost function; simulation arithmetic means for repeatedly performing the predictive control operation to calculate a group of values of the new cost function; simulation display command means for allowing the screen display means to graphically display values of the new cost function; and setting means responsive to a setting command generated after the graphic display to set the new cost function at the model predictive control apparatus.

In this input device, when an cost function or any parameter of the cost function is altered, simulation of evaluation is carried out by a new cost function to display it on the screen. Thus, it is possible to confirm reasonableness as an operation index of a selected cost function before a new cost function is set at the model predictive control apparatus.

Moreover, in accordance with this invention, there is provided a model predictive control apparatus comprising: prediction means for predicting a plurality of controlled variable future variables $y_i$ on the basis of a dynamic characteristic model of a multi-input/output plant in which there are a plurality of manipulated variables and controlled variables; arithmetic means for calculating such a plurality of optimal manipulated variables to minimize an cost function in a quadratic form expressed below, having, as function parameters, a prediction starting time L, a prediction horizon Np, a control horizon Nu, a weighting coefficient $\lambda$, and a pole assignment polynomial $D(z^{-1})$ of the closed loop with respect to a deviation signal between the controlled variable future value $y_i$ and a future reference value $y_i^*$ to give it to a controlled system;

$$J = \sum_{j=L}^{Np} \sum_{i=1}^{p} \{D(z^{-1})(y_i(k+j) - y_i^*(k+j))\}^2 +$$

$$\lambda \sum_{j=1}^{Nu} \sum_{i=1}^{q} (\Delta u_i(k+j-1))^2$$

$$(\Delta u_i(k) = u_i(k) - u_i(k-1))$$

and parameter adjustment means for adjusting the cost function parameters.

In this invention, since the predictive equation for predicting a future controlled variable used for derivation of a control operational equation is in a form such that it can be applied even in the case where the number of manipulated variables and that of controlled variables are different, the control operational equation thus derived can be also applied to a multi-input/output process in which the number of manipulated variables and that of controlled variables are different.

Further, in accordance with this invention, there is provided a model predictive control apparatus comprising: prediction means for determining a predictive equation of future values of controlled variables by using a model obtained by approximating a dynamic characteristic of a controlled system; arithmetic means for calculating a manipulated variable to minimize an cost function in a quadratic form relating to a difference between a future reference value and a manipulated variable, set on the basis of the predictive equation while satisfying limit conditions to give the manipulated value thus calculated to the controlled system; response time constant setting means for setting a response time constant indicating a rise time at which the controlled system should be operative; weighting factor parameter calculation means for calculating a weighting factor including the response time constant in an index part, the value thereof increasing with passage of time; and cost function setting means for constructing a new cost function in which the calculated weighting factor is built in to set it as the cost function.

In this invention, when a response time constant is inputted, a weighting factor of an exponential function corresponding to this time constant is determined, and the weighting factor thus determined is added to the cost function. Accordingly, it is possible to designate a response time constant of the model predictive control system. Thus, it is possible to assign the pole of the control system in a complex plane discriminating stability into a stable region, thus to effectively improve a transient response characteristic particularly attenuation factor. Further, since it is possible to evaluate stability margin of the control system, a suitable response time constant in which stability is taken into consideration can be set. In addition, when a stability margin is given as a control specification, there can be provided a configuration to automatically adjust a response time constant so that there results a control system to satisfy it. Accordingly, suitable stability and the transient response characteristic can be realized.

BEST MODE FOR CARRYING OUT THE INVENTION

Embodiment of this invention will now be described while making reference to the attached drawings.

FIG. 1 is a block diagram showing the configuration of a model predictive control apparatus according to an embodiment of this invention and a process control system to which this model predictive control apparatus is applied, and FIG. 2 is a flowchart showing a flow of the control system by the model predictive control apparatus.

First, in FIG. 1, the model predictive control apparatus 1 includes an input unit 10, a control operation unit 20, and model setting means 50, and is adapted to input a reference value r inputted from reference value input means 12 of the input unit 10 and a controlled variable measured value y taken out from a controlled system 40 by a sensor to allow a process control unit 30 to output an optimal manipulated variable u therefrom.

For example, a process 40 of a plant for manufacturing a product p from stuff s is assumed as a controlled system. When a production reference value r (reference value) of the product p varies, a throw-in quantity u (manipulated variable) of the stuff s is manipulated to allow an yield y (controlled variable) of the product p to follow the reference value r.

As shown in FIG. 1, this model predictive control apparatus 1 comprises a control operation device or unit 20 including means for transforming an cost function and a constraint to values relating to only manipulated variables. By the control operation unit 20, a future value of a controlled variable is predicted by using a model which will be described later to calculate an optimal manipulated variable to minimize the cost function in a quadratic form while satisfying the limit condition.

The process control device or unit 30 connected to the control operation unit 20 of the model predictive control apparatus 1 serves as, e.g., an actuator to give an optimal manipulated variable calculated by the control operation unit 20 to the controlled system 40. The input unit 10 includes limit condition input means 13 for inputting a constraint relating to future values of controlled variables and manipulated variables of the plant 40, cost function input means 11 for inputting parameters of the cost function, and reference value input means 12 for inputting a controlled variable reference value. The model setting means 50 serves to conjecture or input a model approximating a dynamic characteristic of the controlled system 40.

The control operation unit 20 comprises prediction means 21, cost function transformation means 22, constraint or limit condition transformation means 23, and optimal manipulated variable calculation means 24. By the prediction means 21, a predictive equation of future values of controlled variables by using a model. The cost function transformation means 22 transforms the cost function in a quadratic form relating to a deviation from a reference value of the controlled variable future value and manipulated variable future value to set an cost function for QP. The constraint transformation means 23 transforms the constraint inputted from the input unit 10 to set a constraint for QP. The optimal manipulated variable calculation means 24 sequentially calculates, by using QP, manipulated variables to minimize an cost function which satisfies the constraint set by the constraint transformation means 23, is inputted from the cost function input means 11 and adjusted by the cost function adjustment means 25, and is set by the cost function transformation means 25.

Such optimal manipulated variable calculation method will now be described in detail.

First, a dynamic characteristic, an cost function and a constraint of the controlled system serving as the premise of control are given as follows.

Namely, the dynamic characteristic of the controlled system is represented at a model 11 by the following equation (7) by using functions of a delay operator Z expressed as equations (6a) and (6b) as the relationship of a controlled variable $y_k$ and a manipulated variable $u_k$ at time k $$A(Z^{-1}) = 1 + a_1 z^{-1} + \ldots + a_n z^{-n} \tag{6a}$$

$$B(Z^{-1}) = b_0 + b_1 z^{-1} + \ldots + b_m z^{-m} \tag{6b}$$

$$A(Z^{-1}) y_k = B(Z^{-1}) U_{k-1} \tag{7}$$

In this instance, a time (dead time) d until the influence of an input begins appearing on an output is expressed by allowing $b_0, b_1 \ldots b_d$ of the equation (6b) to be equal to zero.

A predictive equation of a controlled variable from the time $t+L$ up to the time $K+L+Np-1$ is calculated on the basis of the above model as follows:

$$\begin{bmatrix} y_{k+L} \\ y_{k+L+1} \\ \cdot \\ \cdot \\ \cdot \\ y_{k+L+Np-1} \end{bmatrix} = [G] \begin{bmatrix} \Delta u_k \\ \cdot \\ \cdot \\ \Delta u_{k+Nu-1} \end{bmatrix} + [F] \begin{bmatrix} y_k \\ \cdot \\ \cdot \\ y_{k-n} \end{bmatrix} + [H] \begin{bmatrix} \Delta u_{k-1} \\ \cdot \\ \cdot \\ \Delta u_{k-m} \end{bmatrix} \tag{8}$$

Here, matrices [G], [F] and [H] are assumed to be calculated in advance below by the following identity (Diophantine equation)

$$1 = E_j(z^{-1})(1-z^{-1})A(z^{-1}) + z^{-j} F_j(z^{-1}) \tag{9}$$

In the above equation, $E_j(Z^{-1})$, $F_j(z^{-1})$ and $B(z^{-1})E_j(z^{-1})$ are expressed as follows:

$$E_j(z^{-1}) = 1 + e_{j1} z^{-1} + \ldots + e_{j,j-1} z^{-(j-1)} \tag{10a}$$

$$F_j(z^{-1}) = f_{j0} + f_{j1} z^{-1} + \ldots + f_{jn} z^{-n} \tag{10b}$$

and $$B(z^{-1})E_j(z^{-1}) = h_{j0} + h_{j1} z^{-1} + \ldots + h_{j,j+m-1} z^{-(j+m-1)} \tag{11}$$

Accordingly, the matrices [G], [H] and [F] are expressed as follows:

$$[G] = \begin{bmatrix} h_{L,L-1} & \cdots h_{L0} & 0 & \cdots 0 \\ \vdots & & & \\ h_{Nu,Nu-1} & \cdots & h_{Nu,o} & \\ \vdots & & & \\ h_{L+Np-1,L+Np-2} \cdots & & & h_{L+Np-1,L+Np-Nu} \end{bmatrix} \quad (12a)$$

$$[H] = \begin{bmatrix} h_{L,L} & \cdots & h_{L,m+L-1} \\ \vdots & & \vdots \\ h_{L+Np-1,L+Np-1} \cdots & & h_{L+Np-1,m+L+Np-2} \end{bmatrix} \quad (12b)$$

$$[F] = \begin{bmatrix} f_{L0} & \cdots & f_{Ln} \\ \vdots & & \vdots \\ f_{L+Np-1,0} & \cdots & f_{L+Np-1,n} \end{bmatrix} \quad (12c)$$

Further, the cost function is determined so that a deviation $(y^*_1 - y_{K+1})$ between a controlled variable predictive value and a reference value future value and a manipulated variable change rate predictive value $u_{k+1}$ become as small as possible.

$$J = \sum_{i=0}^{Np-1} (y_i^* - y_{k+L+i})^2 + \lambda \sum_{i=0}^{Nu-1} (\Delta u_{k+i})^2 \quad (13)$$

($\lambda$ is weighting factor)

Further, the constraints imposed on the plant are expressed as follows:

$$u_{min}(i) \leq u_i \leq u_{max}(i) \quad (14a)$$

$$\Delta u_{min}(i) \leq \Delta u_i \leq \Delta u_{max}(i) \quad (14b)$$

$$y_{min}(i) \leq y_i \leq y_{max}(i) \quad (14c)$$

$$\Delta y_{min}(i) \leq \Delta y_i \leq \Delta y_{max}(i) \quad (14d)$$

The equation (14a) corresponds to upper and lower limiter of the controlled variable, the equation (14b) corresponds to a change rate limiter of the manipulated variable, the equation (14c) corresponds to upper and lower limiter of the controlled variable, and the equation (14d) corresponds to a change rate limiter of the controlled variable.

The calculation procedure of the manipulated variable $u_k$ at the time k (the n-th stage) will now be described while making reference to the flowchart shown in FIG. 2 as well.

Initially, at step S101, reference values from the time $k+L$ up to the time $k+L+Np-1$ are quarried or taken out by the input unit 1 to set them to a reference value future value series $[y^*_1, \ldots y^*_p]$ Then, at step S102, a controlled variable $y_k$ is read in and is inputted to a buffer. In this buffer, past control values $[y_k, y_{k-1}, \ldots, y_{k-n}]$ and past manipulated change rates $[\Delta u_{k-1}, \Delta u_{k-2}, \ldots \Delta u_{k-m-d+1}]$ are stored.

At step S103, the constant part of the controlled variable predictive equation (8) is calculated by using data stored in the buffer by the prediction means 13.

$$\begin{bmatrix} c_0 \\ \vdots \\ \vdots \\ c_{Np-1} \end{bmatrix} = [F] \begin{bmatrix} y_k \\ \vdots \\ \vdots \\ y_{k-n} \end{bmatrix} + [H] \begin{bmatrix} \Delta u_{k-1} \\ \vdots \\ \vdots \\ \Delta u_{k-m} \end{bmatrix} \quad (15)$$

At step S105, this predictive equation is used to expand the cost function J of the equation (13) by the cost function transformation means 22 to calculate an cost function in a quadratic form of the manipulated variable change rate $\Delta u$.

$$J = \sum_{i=0}^{Nu-1} \left( \sum_{j=0}^{Nu-1} q_{ij} \Delta u_{k+i} \Delta u_{k+j} + p \Delta u_{k+i} \right) \quad (16)$$

At step S106, whether or not there is any limit condition is judged. As a result, in the case where there is no limit condition, the optimal manipulated variable calculation means 24 solves the following equation (17) at step S109;

$$\partial J / \partial \Delta u_{k+i} = 0 : i = 0, \ldots, Nu-1 \quad (17)$$

whereby an optimal manipulated variable change rate to minimize J is provided.

On the other hand, in the case where there is any limit condition, that limit condition is set at step S107. In order to determine a manipulated variable change rate so as to minimize the cost function J between these upper and lower limits, QP is utilized at step S109 in this case. In order to utilize this QP, the cost function and the constraint must be a function exclusively including an optimized parameter $\Delta u$. In view of this, by the limit condition transformation means 23, the limit condition is developed in a form expressed below by using the controlled variable predictive equation (8):

$$b_{min} \leq [a_0 \, a_1 \ldots a_{Nu-1}] \begin{bmatrix} \Delta u_k \\ \vdots \\ \vdots \\ \Delta u_{k+Nu-1} \end{bmatrix} \leq b_{max} \quad (18)$$

This transformation is carried out as follows:

(1) $u_{min}(k+i) \leq u_{k+1} \leq u_{max}(k+i)$

A manipulated variable $u_{k+i}$ i steps later from the present time point k can be described below by a manipulated variable $u_{k-1}$ at the time $k-1$ and a manipulated change rates $\Delta u_k, \ldots, \Delta u_{k+i}$ from the time k up to the time $k+i$:

$$u_{k+i} = u_{k-1} + \Delta u_k + \ldots + \Delta u_{k+i} : i = 0, \ldots, Nu-1.$$

Therefore, the following equations will hold:

$$u_{min}(k+i) - u_{k-1} \leq \sum_{j=0}^{i} \Delta u_{k+j} \leq u_{max}(k+i) - u_{k-1} \quad (19a)$$

(2) $\Delta u_{min}(k+i) \leq \Delta u_{k+1} \leq u_{max}(k+i)$  (19b)

Since this condition is the limit condition of the manipulated variable change rate itself, there is no necessity of transformation.

(3) $y_{min}(k+L+i) \leq y_{k+L+1} \leq y_{max}(k+L+i)$

From the controlled variable predictive equation (3), $$\begin{bmatrix} y_{min}^{(k+L)} \\ \cdot \\ \cdot \\ \cdot \\ y_{min}^{(k+L+Np-1)} \end{bmatrix} - \begin{bmatrix} c_0 \\ \cdot \\ \cdot \\ \cdot \\ c_{Np-1} \end{bmatrix} \leq \quad (19c)$$

$$[G] \begin{bmatrix} \Delta u_k \\ \cdot \\ \cdot \\ \cdot \\ \Delta u_{k+Nu-1} \end{bmatrix} \leq \begin{bmatrix} y_{max}^{(k+L)} \\ \cdot \\ \cdot \\ \cdot \\ y_{max}^{(k+L+Np-1)} \end{bmatrix} - \begin{bmatrix} c_0 \\ \cdot \\ \cdot \\ \cdot \\ c_{Np-1} \end{bmatrix}$$

(4) $\Delta y_{min}(k+L+i) \leq \Delta y_{k+L+1} \leq \Delta y_{max}(k+L=i)$

A controlled variable change rate $\Delta y_{k+L+i}$ at a time later by i steps from the time k+L is expressed as a difference between a controlled variable $y_{k+L+i}$ at time k+L+i and $y_{k+L+i-1}$ at time k+L+i-1:

$$\Delta y_{k+L+i} = y_{k+L+i} - y_{k+L+i-1}: i=0, \ldots, Np-1$$

In this instance, in calculating a predictive value $y_{k+L-1}$ earlier by i steps of the predictive section, it is necessary to superfluorously calculate, by one row, a row where the first subscripts in the matrix of the equations (7a), (7b), (7c) become equal to L−1. When L is equal to 1, a controlled variable $y_k$ obtained at a present or current time point is used. If it D is assumed to be described below:

$$[D] = \Delta \begin{bmatrix} 1 & & & 0 \\ -1 & 1 & & \\ \cdot & \cdot & & \\ & \cdot & \cdot & \\ 0 & & -1 & 1 \end{bmatrix}$$

From the predictive equation (8) of $y_{k+L}$, $$\begin{bmatrix} \Delta y_{min}^{(k+L)} \\ \cdot \\ \cdot \\ \cdot \\ \Delta y_{min}^{(k+L+Np-1)} \end{bmatrix} - \begin{bmatrix} y_{k+L-1} \\ 0 \\ \cdot \\ \cdot \\ 0 \end{bmatrix} - [D] \begin{bmatrix} c_0 \\ \cdot \\ \cdot \\ \cdot \\ c_{Np-1} \end{bmatrix} \leq \quad (19d)$$

-continued $$[D][G] \begin{bmatrix} \Delta u_k \\ \cdot \\ \cdot \\ \cdot \\ \Delta u_{k+Nu-1} \end{bmatrix} \leq \begin{bmatrix} \Delta y_{max}^{(k+L)} \\ \cdot \\ \cdot \\ \cdot \\ \Delta y_{max}^{(k+L+Np-1)} \end{bmatrix} -$$

$$\begin{bmatrix} y_{k+L-1} \\ 0 \\ \cdot \\ \cdot \\ 0 \end{bmatrix} - [D] \begin{bmatrix} c_0 \\ \cdot \\ \cdot \\ \cdot \\ c_{Np-1} \end{bmatrix}$$

In a manner stated above, a limit condition transformed with respect to [$u_k$, $u_{k+1}$, ..., $U_{k+Nu-1}$] is obtained.

By solving a quadratic programming problem prepared by the limit conditions (14a, b, c, d) transformed into the form of the equation (18) and the cost function (11) by QP by using optimal manipulated variable calculation means 24 at step 109, an optimal manipulated value change rate [$\Delta u_k$, $\Delta u_{k+1}$, ..., $\Delta u_{k+Nu-1}$] to minimize the cost function J while satisfying all the limit conditions is obtained.

At step 111, only the first element $\Delta u_k$ of the calculated optimal manipulated value change rates [$\Delta u_k$, $\Delta u_{k+1}$, ..., $\Delta u_{k+Nu-1}$] is used to calculate a manipulated variable $u_k = u_{k-1} + \Delta u_k$ at that time point to output it.

In this way, model predictive control at the k-th stage is executed.

Namely, optimal manipulated variables $u_k = u_{k-1} + \Delta u_k$ are sequentially calculated at respective stages, and these variables are given to the process 40 in the plant serving as a controlled system. Since the controlled system 40 is operated in accordance with a manipulated value $j_k$ which satisfies the limit condition relating to the controlled variable y as well, a control in which both limit conditions of the manipulated value and the controlled value are taken into consideration can be conducted.

As described above, in accordance with this invention, since an approach is employed to transform the cost function and all the limit conditions to a limit condition relating to a manipulated variable change rate which is an optimal parameter to be optimized to calculate a manipulated variable change rate to minimize, by QP, the transformed cost function while satisfying all the transformed limit conditions, it is possible to carry out a control by taking into consideration not only the limit condition relating to the manipulated variable but also the limit condition relating to the controlled variable.

FIG. 3 is a block diagram showing the configuration of an input device for a model predictive control apparatus according to this invention. The input device 10 is comprised of, e.g., a screen display 101a, a write pen 102a, a mouse 103a, a keyboard 104a, a touch sensor arranged on a display screen, a CPU 106, a memory 108, and the like. When an operator operates a key switch of the key board 104a, a keyboard interface 104b generates a code signal to deliver it to the CPU 106.

The CPU 106 executes a control program of the input device stored in a ROM 107. The CPU 106 allows the memory 108 to store various information therein. This information includes a page memory in which formats of various pictures on screen for carrying out display on the screen display 101a, the kind of data to be displayed, and the like are stored, model transfer functions 1~n for future value prediction, a control cost function J which will be described later, an economical cost function Je, a command map for discriminating a command inputted as position information from the picture on screen as actual instruction or select information, a simulation operation program for carrying out simulation operation by a selected function and designated control parameters, an interpolation program for carrying out a line or wire drawing interpolation between points designated in a graph area on a simulation display program picture on screen in which a simulation operation result is developed into a frame memory 101c, a kind of display line setting program for determining the kind of curves displayed on the screen depending on the condition, and the like. Also select information for control parameters inputted from the screen, etc. is included therein.

The CPU 106 has a function as a bit map processor in addition to input control for the write pen and the keyboard, etc., and serves to edit input information, information delivered from the model predictive control unit 20 or the process control unit 30 through the model predictive control unit 20, and picture on screen information stored in the memory 108 to deliver information thus edited to the frame memory 101c. The frame memory 101c constitutes a bit map display unit along with the CPU 106, the display control unit 101b and the screen display 101a. By providing a plurality of frame memories, e.g., a color display or a multi-window display is carried out.

In order to enable a command input from on the screen, the previously described pointing tool such as write pen 102a, mouse 103a, touch sensor 105a, etc. and the keyboard 104a are used.

When an operator allows the write pen 102a to be in contact with an arbitrary position on the screen, a detection signal is sent from the write pen 102a to the write pen interface 102b at the time when a scanning electron beam on the screen is passed through the front portion of the write pen 102a. The write pen interface 102b includes a vertical position counter adapted to count horizontal synchronizing signals delivered from the display control unit 101b and to be reset in response to a vertical synchronizing signal, and a horizontal position counter adapted to count clock signals and to be reset in response to a horizontal synchronizing signal. Both counters hold accumulated values in response to a detection signal from the write pen 102a to deliver, to the CPU 106, it as a screen address signal A indicating X and Y positions on the screen.

When the operator depresses a predetermined position of the touch panel 105a arranged on the monitor screen, X and Y positions on the screen are detected. As a result, a screen address signal A is delivered from the touch panel interface 105b to the CPU 106.

When the operator operates the mouse 103a, X and Y pulse train signals are generated depending on quantities in X and Y directions of the rotary ball of the mouse, respectively. The mouse interface 103b updates values of the X and Y counters by the X and Y pulse train signals to thereby discriminate the position of the pointer on the screen. This position is delivered to the CPU 106 as a screen address signal A depending on the switch operation of the mouse. Write pen 102a, mouse 103a, keyboard 104a, and touch sensor 105a, etc. are so called a pointing tool, and have the role of transmitting a certain point on the screen to the CPU.

Figure 4:
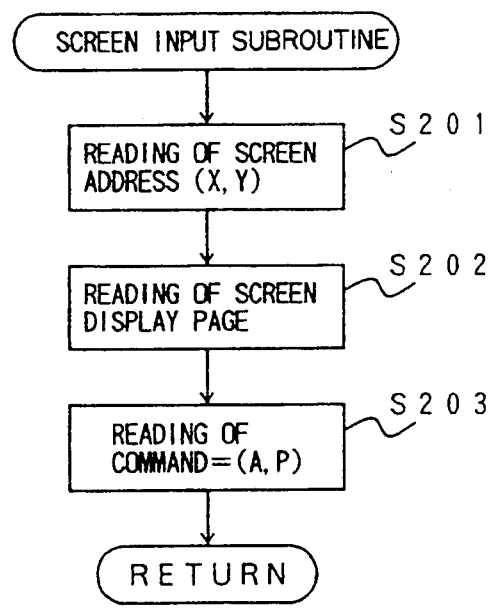
FIG. 4 is a flowchart for discriminating an input content from on a picture on screen.

When the CPU 106 detects supply of the address signal A, it executes screen input subroutine programs shown in FIG. 4 peculiar to respective interfaces stored in the ROM 107 to discriminate the content of an inputted command. Namely, the CPU 106 reads a designated position A (X, Y) on the screen represented by the screen address signal A. The CPU 106 discriminates a display page P of the picture displayed at present on the screen display 101a (step S202). The CPU 106 reads a corresponding command content from the map of the command memory area with a designated position A (X, Y) on the screen and a page P of a present picture displayed on screen being as a key. Further, the CPU 106 takes thereinto data input from the keyboard depending on the content of a command (step S203). The content of the inputted command is stored into the memory 108 by a control program (not shown).

Figure 5:
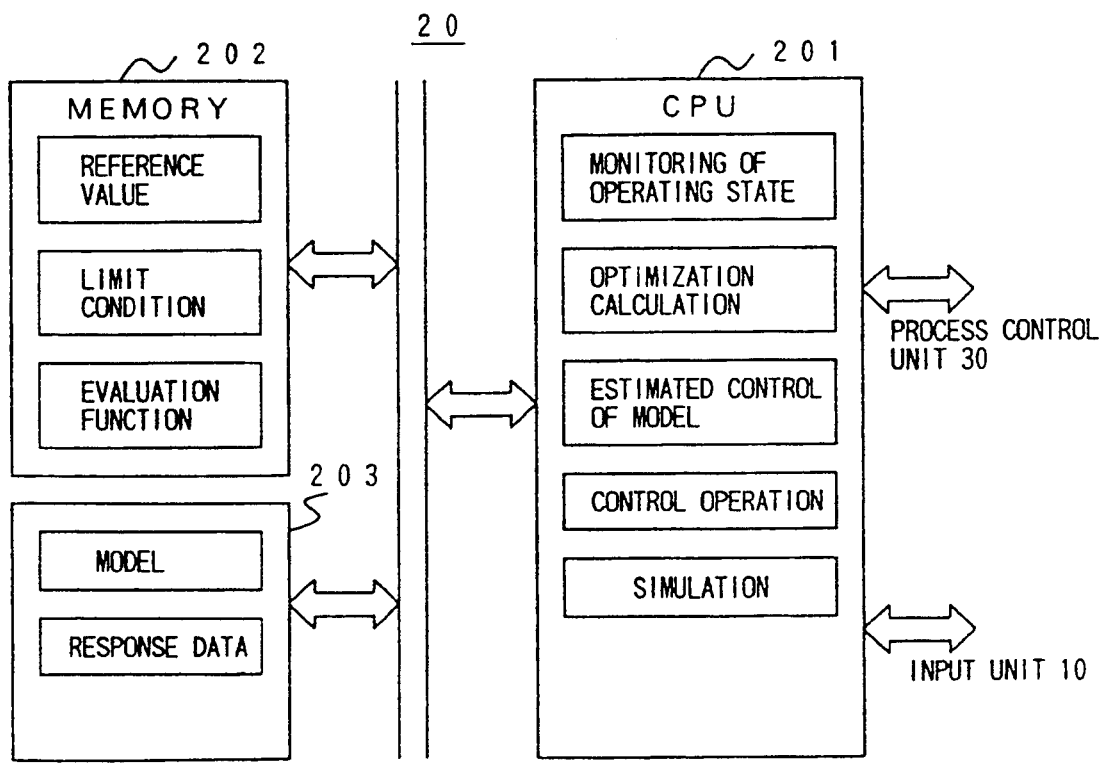
FIG. 5 is a functional block diagram of a model predictive control apparatus.

The model predictive control apparatus 20 is roughly divided into a CPU 201, a memory 202, and a memory unit 203 from a viewpoint of the hardware configuration as shown in FIG. 5. In the memory 202, a future reference value of a process controlled variable designated by the pointing tool from the keyboard 104a or a display picture, etc. of the input device 10, limit conditions relating to a controlled variable/manipulated variable of the process and change rates thereof, control and economical cost functions for carrying out evaluation relating to at least a deviation signal between a future controlled variable and a future reference value and an increment in the manipulated variable, and control parameters for a dynamic model, etc. approximating the dynamic characteristic of the plant equipment are selected and stored through the CPU 201.

Further, in the memory unit 203, a response data base for recording signals of respective controlled variables/manipulated variables of the process, a model data base for storing the history of a selected dynamic characteristic model, and the like are formed. Data stored as a data base is suitably read out for a simulation which will be described later, and is delivered to the CPU 106 of the input device 10. Such data are utilized for a simulation operation, etc. in the input device 10.

The CPU 201 performs a simulation function, an operation state monitoring function, an optimizing calculation function, a control operation function, a model estimation and management (control) function, etc. on the basis of various control information delivered from the input device 10 or the process control device 30.

The simulation function of the CPU 201 predicts a future controlled variable on the basis of a selected dynamic characteristic model.

The operating state monitoring function monitors, on a real time basis, the operating state/the control performance of the process.

The optimizing calculation function calculates an optimal manipulated variable to satisfy limit conditions relating to, e.g., controlled variables/manipulated variables by using the quadratic programming algorithm in accordance with the method shown in the above-mentioned reference materials (3) and (4).

The control operation function predicts a control response future value y on the basis of the dynamic characteristic model of the process (controlled system) when a future reference value y* is given to calculate an increment in the manipulated variable Δu(k) to minimize a control cost function in a quadratic described below relating to a deviation signal between a future controlled variable and a future reference value and the manipulated variable increment:

$$J = \sum_{i=L}^{N_p+L-1} \{D(z^{-1})(y(k+i) - y^*(k+i))\}^2 + \quad (20)$$

$$\lambda \sum_{i=1}^{Nu} (\Delta u(k+i-1))^2$$

The model estimation and management (control) function estimates/corrects/evaluates the dynamic characteristic model of the process from response data.

The process control device 30 sends an operation signal to an actuator provided in the plant, and transmits/receives data signals indicating process controlled variables/manipulated variables and the operating condition of the process, or the like between the process control device 30 and the CPU 201 of the model predictive control apparatus 20 to control, e.g., temperature, pressure, flow rate, liquid level within a tank of the plant, etc. The process 40 is a process to be controlled, and processes of various industrial plants such as chemical process, power generation plant, iron steel plant, or the like are assumed as this process.

The reference value inputting and the limit condition inputting from the input device 10 will now be described. By making use of the inputting means through the previously described screen display, it is possible to easily input future reference values or limit conditions to the model predictive control apparatus.

Figure 6:
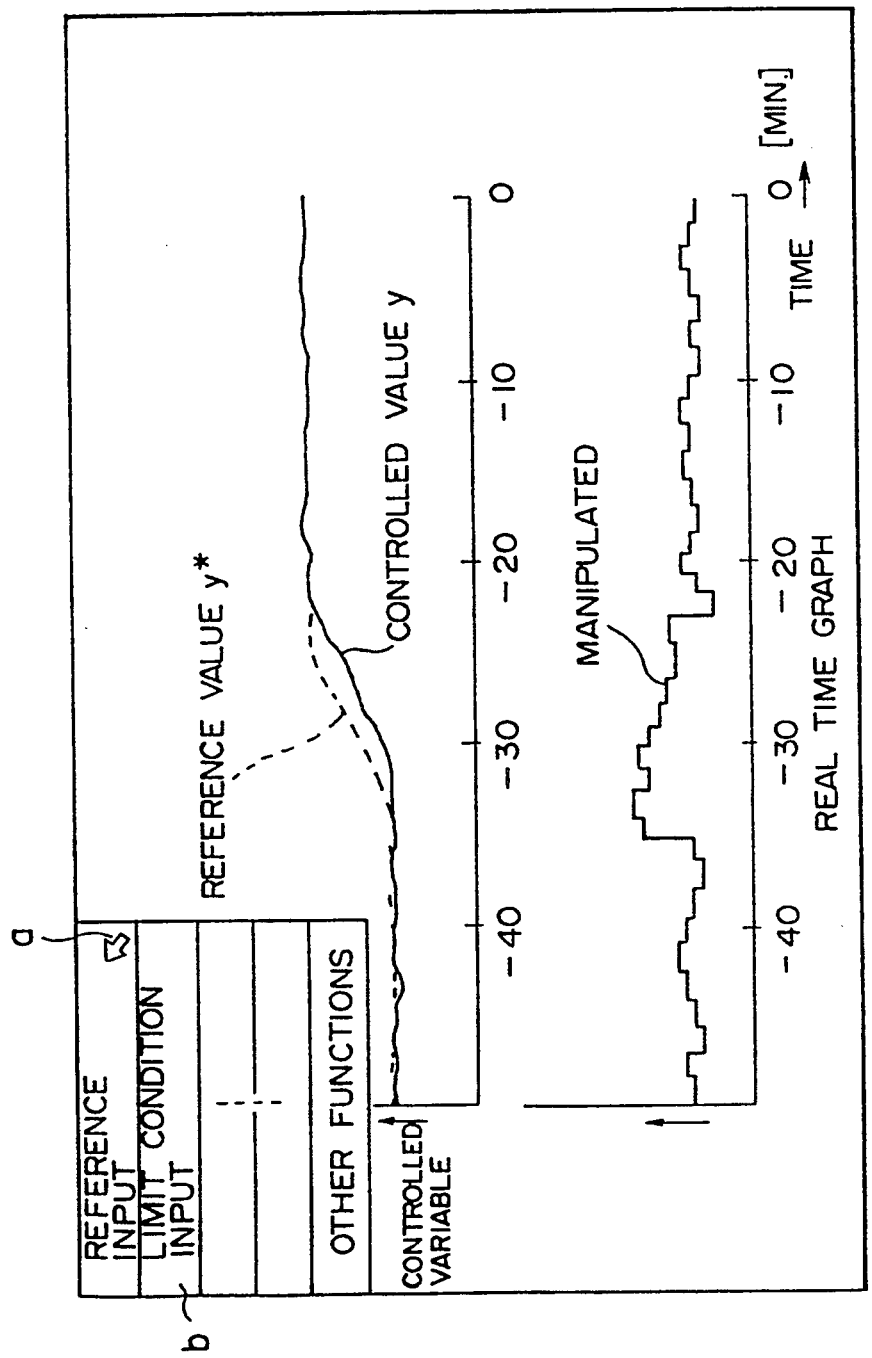
FIG. 6 is an explanatory view of an ordinary display picture on screen.

FIG. 6 is an example of a picture on screen (standard picture on screen) of the first page of a display picture displayed in an ordinary operation mode on the display 101a of the input device 10 wherein a reference value y* and a process controlled variable y are graphically displayed by dotted lines and a solid line, respectively. Further, a controlled variable u is graphically displayed by histogram. Respective values are shown with time from a past time earlier than the present or current time point by a predetermined time, which is indicated by (−) time, up to the present or current time point indicated by (0) time. On the screen, a pointer a position-controlled by an operation of a pointing tool such as a mouse, etc., or similar tools is displayed. When an icon (not shown) for accessing various functions is selected by this pointer, the content of a command is discriminated by execution of the subroutine shown in FIG. 4. Thus, a pull-down menu b is displayed on the screen.

Figure 7:
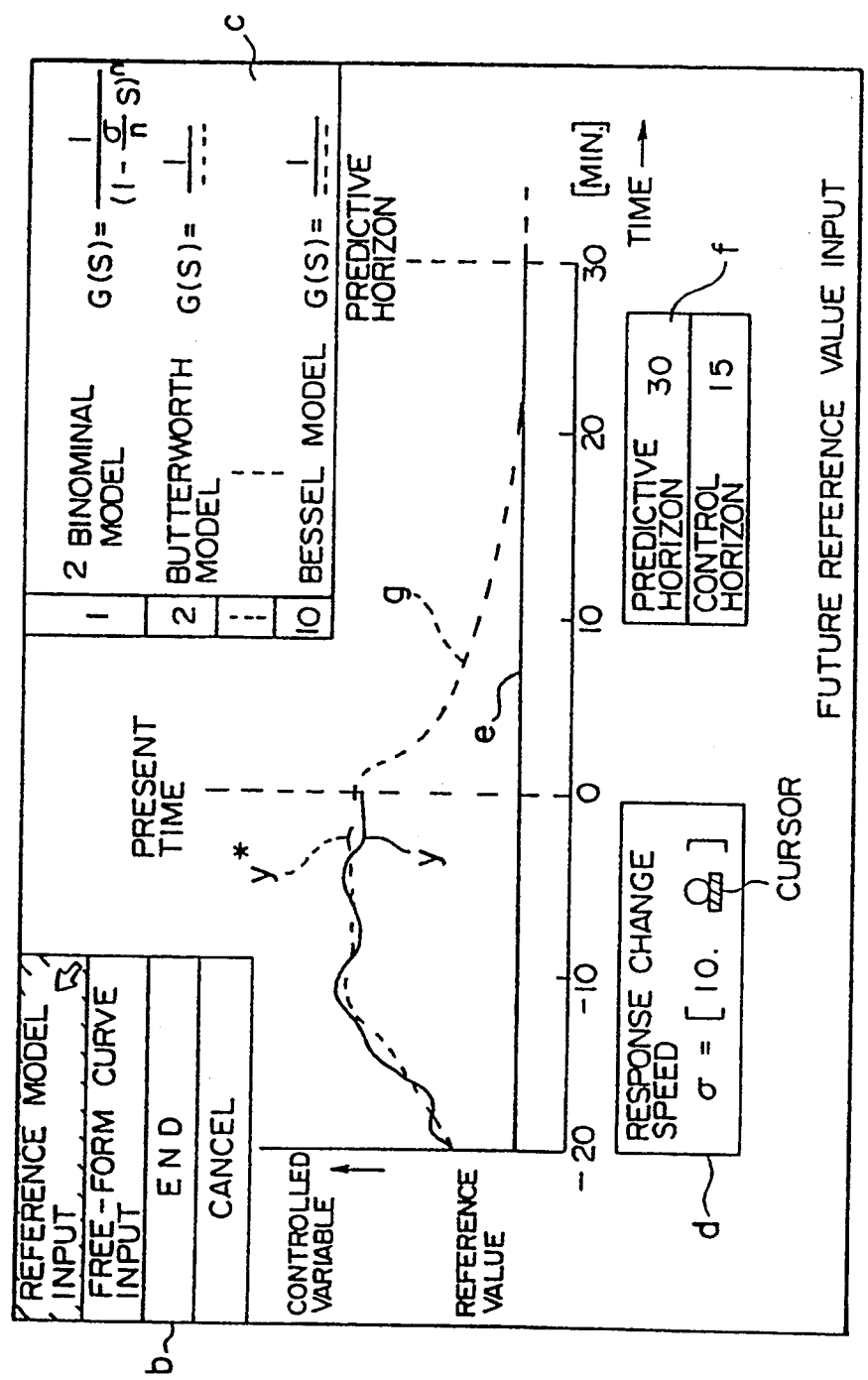
FIG. 7 is an explanatory view of a reference model input mode picture on screen of pictures on screen for inputting a reference value response.

The pointer a is moved, e.g., onto an icon for target value input by the pull-down menu b to instruct selection. As a result, this function is started, so a picture on screen of the reference value inputting mode of the second page of a display picture shown in FIG. 7 is provided. At this stage, either the reference value inputting method based on a reference model or the reference value inputting method by a free-form curve inputting is designated by the pointing tool. When, e.g., a reference model input is selected, a Table of a plurality of reference models representing a response form of the process is developed as show at c in FIG. 7. As this predictive model, a reference model name such as a binomial model, $$G(s) = \frac{1}{(1 + (\sigma/n)s)^n} \quad (21)$$

a Butterworth model $$G(s) = \frac{1}{1 + \sigma s + 0.5(\sigma s)^2 + 0.125(\sigma s)^3}, \quad (22)$$

etc., a transfer function and a response form (not shown) are displayed. An equation of a displayed function is stored as functions 1∼n in the memory 108. From these functions, a No. area of any one of reference models is designated by the pointing tool. This No. is discriminated by the position on the screen of the pointer, and a selected function is stored into the memory 108. Further, the pointer is caused to be positioned within the area indicated at d of FIG. 7 to input, from the keyboard 104a, the value of a response change speed (control parameter σ) corresponding to a time constant of the reference model. The fact that the input value designates a response change speed (time constant) is discriminated by the position of the pointer, and a discriminated input value is stored into the memory 108.

When the position of the line e indicating a final reference value is designated within the area where the graph is displayed, the value of the ordinate on the graphic coordinate is discriminated, so the line e is displayed. This reference value is stored into the memory 108. An area f is selected by the pointer to input, from the keyboard, a predictive time to be taken into consideration in the model predictive control, e.g., 30 minutes. The fact that input data is the predictive time is discriminated by the position of the pointer. The data thus discriminated is stored into the memory 108, and the predictive time of 30 minutes is displayed within the area f.

When control parameters required for these simulations are all inputted, the simulation operation program serving as the simulation operation means stored in the memory 108 is executed. Thus, a future reference value response curve g varying from the present reference value up to the final reference value is calculated or determined within the range of a designated predictive section (prediction horizon). Further, the simulation display program serving as the simulation display command means is executed. As a result, a graphic image is formed on the frame memory 101 and this image is graphically displayed on the screen. This curve is calculated and determined as a response y*(t) when a signal r(t) varying, e.g., in a step form is inputted to a selected reference model G(s), i.e., $$y(s) = G(s) \cdot r(s)$$

(In the above equation, y(s), r(s) are Laplace transform type of y(t), r(t), respectively.)

An operator visually recognizes the graph displayed on the screen to confirm that there is no problem to allow the pointer to be in correspondence with an end icon displayed in the area b of FIG. 7 to instruct a setting. The CPU 106 transfers, to the model predictive control apparatus 20, control parameters such as selected function, response speed, reference value and predictive time, etc. stored in the memory 108 with the response curve responsive to the above setting command being as a future reference value.

The model predictive control device 20 stores the control parameters into the memory 202, and carries out a model predictive control on the basis of newly set control parameters.

In this way, an operator selects, by a simple operation, one of a plurality of reference models depending on the operating condition of the process to simply designate control parameters, thereby making it possible to easily determine the trajectory of a future reference value. Further, an operator designates a desired time constant with respect to that reference model, thereby making it possible to visually study in advance various states of the reference value response trajectory g varying at an arbitrary response speed by simulation. This response waveform is added as extension of the graph of the reference value y* of the present process control and is displayed on the display screen 101a of the input device 10. This assists an operator in precisely monitoring not only the present circumstances of the process but also future operations thereof.

Figure 8:
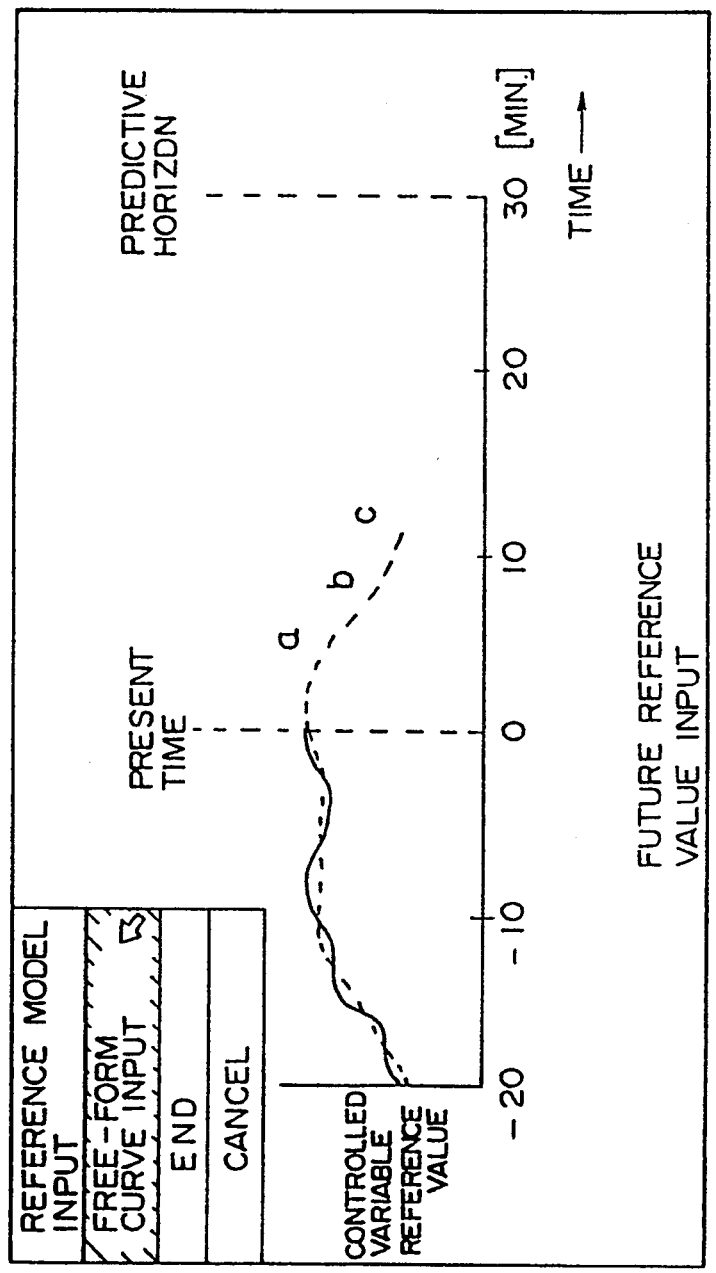
FIG. 8 is an explanatory view of a free-form curve input mode picture on screen of pictures on screen for inputting a reference value response.

In the selection of the above-described icon of FIG. 7, when an operator designates a free-form curve input, the page No. 4 of the display picture shown in FIG. 8 is displayed, and a pointer is displayed on the screen. When this pointer is moved within the area of graph by using the pointing tool so that coordinates of a reference or objective locus are designated as indicated by points a, b, c of FIG. 8, positions of respective points are read. As a result, the interpolation program is started. Thus, positions between respective points are interpolated by, e.g., linear interpolation or spline interpolation. An interpolation curve obtained by interpolating positions between respective points or an equation indicating that interpolation curve is stored into the memory 108. This interpolation curve is displayed on the screen.

When an operator selects an end icon to instruct a setting, the interpolation curve or the equation indicating that curve stored in the memory 108 is inputted to the model predictive control apparatus 20 as it is, and is used for control operation.

By such a visual operation, an operator can easily input, to the model predictive control apparatus 20, a reference value response curve that the operator has intended.

Inputting of limit conditions will now be described. In order to facilitate inputting of limit conditions, it is convenient to first display a predictive simulated result of a future reference value by using curve on the screen to set limit conditions with reference to the simulated future reference value curve. Accordingly, in the case where the above-described reference value inputting is not yet carried out, it is necessary to allow such reference value inputting to be precedingly conducted.

Figure 9:
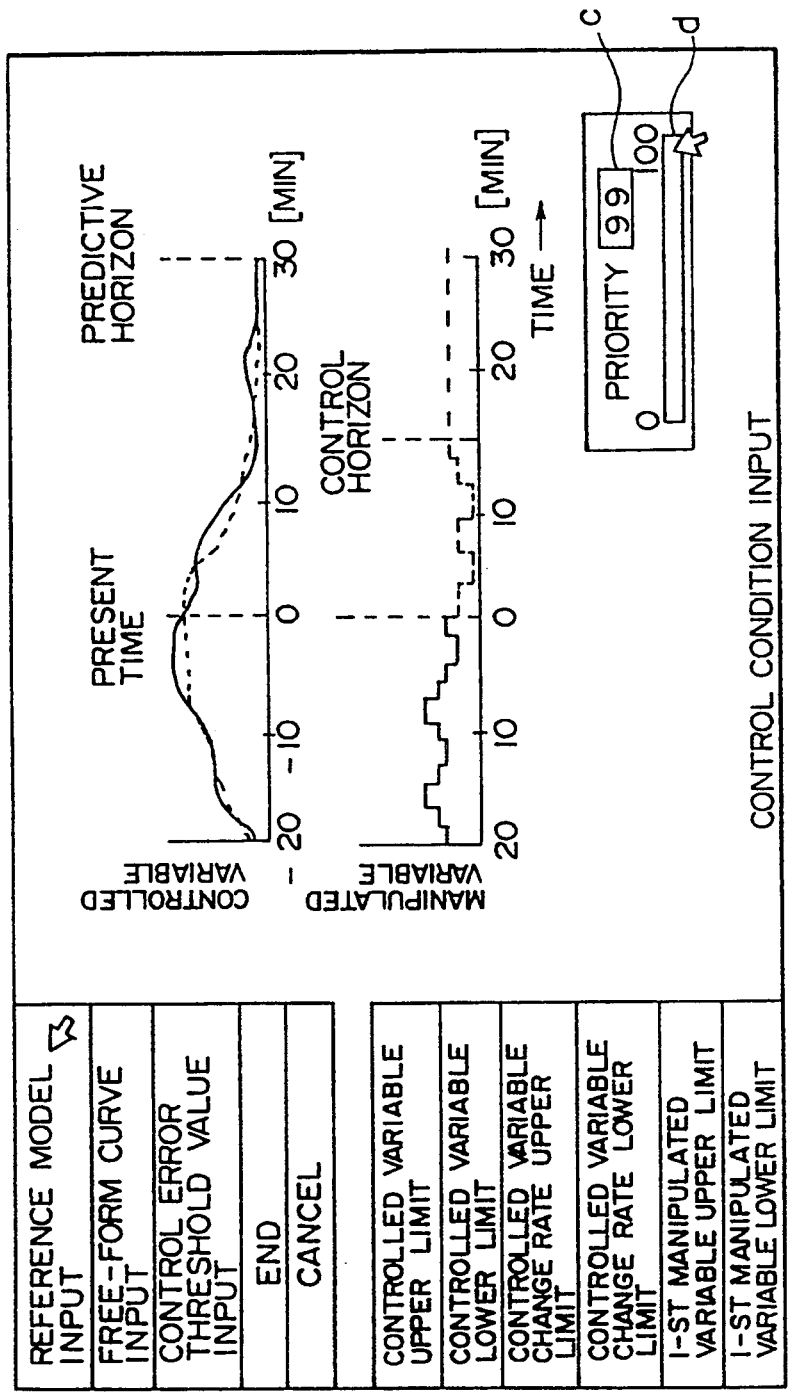
FIGS. 9, 10, 11, 12 and 13 are explanatory views of a limit condition input-mode picture on screen.

When an operator first designates an icon b of the limit condition input by the pointer a on the standard picture on screen of FIG. 6, the function of this portion is started, so the picture of the page No. 5 shown in FIG. 9 is displayed. An the left side of the screen, an icon menu is displayed. The operator selects, by making use of the pointer, from the icon on the upper and left side of the screen, one of parameters such as reference model input, free-form curve input, or control deviation threshold value input, etc. Further, the operator selects one of limit conditions to be inputted by making use of the pointer from the icon on the lower and left side of the screen.

Figure 10:
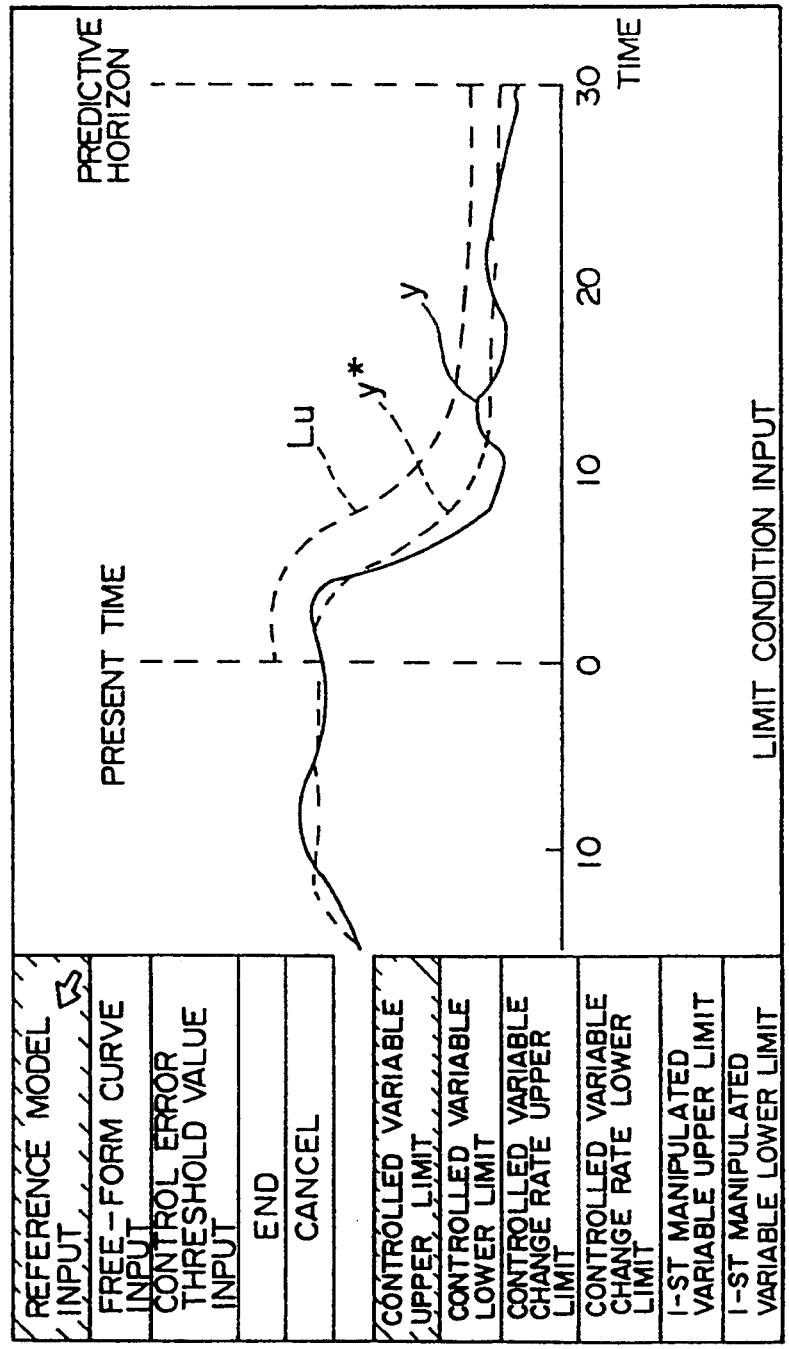

When, e.g., the pointer is moved onto the icon to instruct reference model input and controlled variable upper limit, the instructed content is discriminated by the pointer position and the page of the picture on screen. As a result, the reference model table shown at c of FIG. 7 is displayed (no indication is made in FIG. 9). One reference model is selected by a procedure similar to that of the previously described reference value input. When initial value/final value of limit value are designated in addition to the response change speed (time constant) by designating the position of the graph by using the pointing tool, or by inputting a numeric value by using a keyboard, etc., a curve as shown in FIG. 10 is calculated in a manner similar to that in the case of the previously described reference value on the basis of the selected reference model, and is displayed on the screen as an upper limit curve Lu of the controlled variable.

An operator simply one of a plurality of reference models in this way, thereby making it possible to easily set various limit conditions as a limit condition of the response form.

Figure 11:
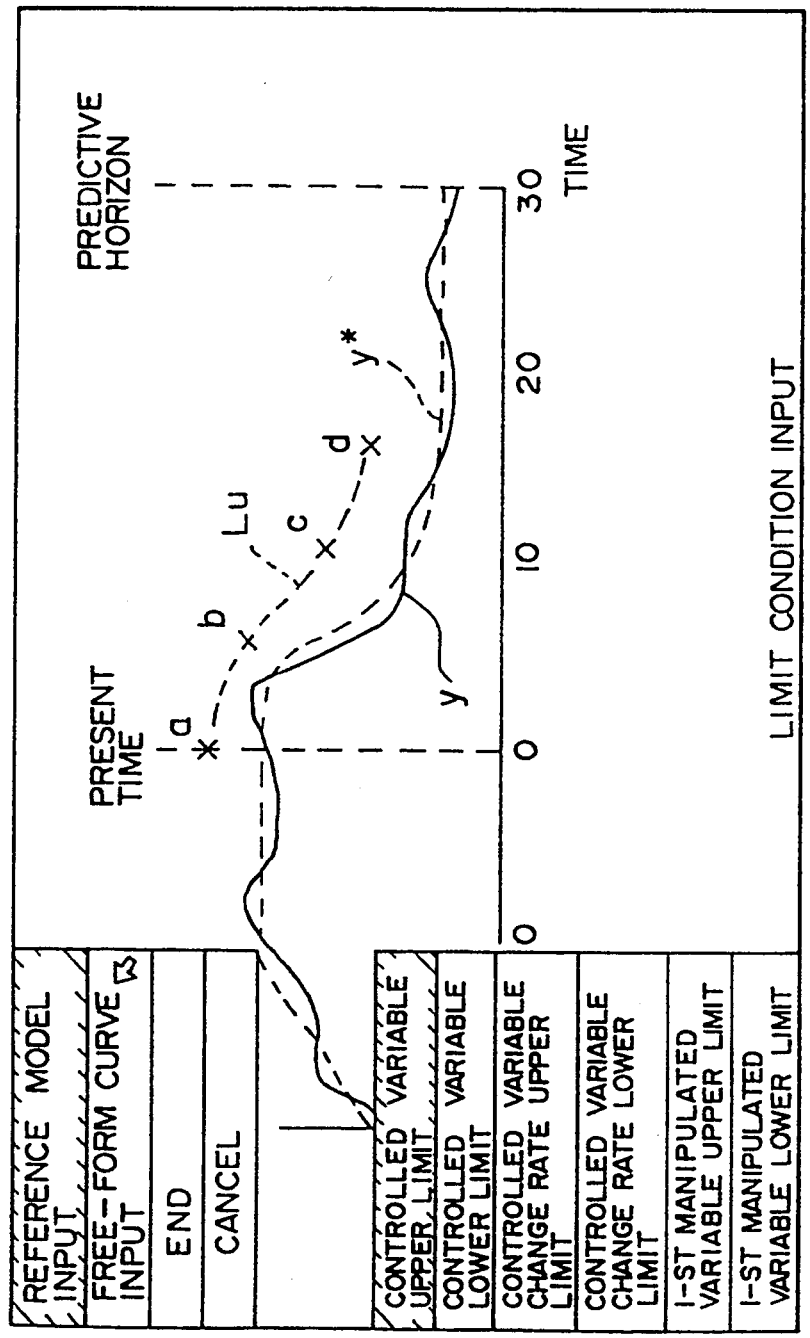

When a free-form curve input is designated in the picture on screen shown in FIG. 8, a picture as shown in FIG. 11 is displayed. In this picture, a pointer corresponding to any input means of various pointing tools prepared in the input device 10 is displayed on the screen. When the position on the graph is designated in a successive manner as indicated by the points a, b, c, d of FIG. 11 by that pointer, position therebetween are interpolated by the linear interpolation or the spline interpolation such as a quadratic curve, etc. by making use of the interpolation program. As a result, a curve thus obtained is displayed as a curve Lu of the upper limit condition. If the limit curve Lu displayed is a desired one, an operator selects the end icon by the pointer. Thus, the interpolation curve or the equation of the curve formed in the memory 108 by the CPU 106 is set at the model predictive control apparatus 20 as a control parameter of the limit condition. In the case of re-setting the limit condition for a second time, an operator selects an icon of cancel. Thus, the input data in this mode becomes ineffective. Display on the screen is carried out from the initial state of this mode, resulting in a re-inputting enable state.

By such inputting of curve waveform data, an operator can easily input, by visual means, a curve that he intends, i.e., the range allowed for a future control response y, etc. to the predictive control apparatus 20.

Figure 12:
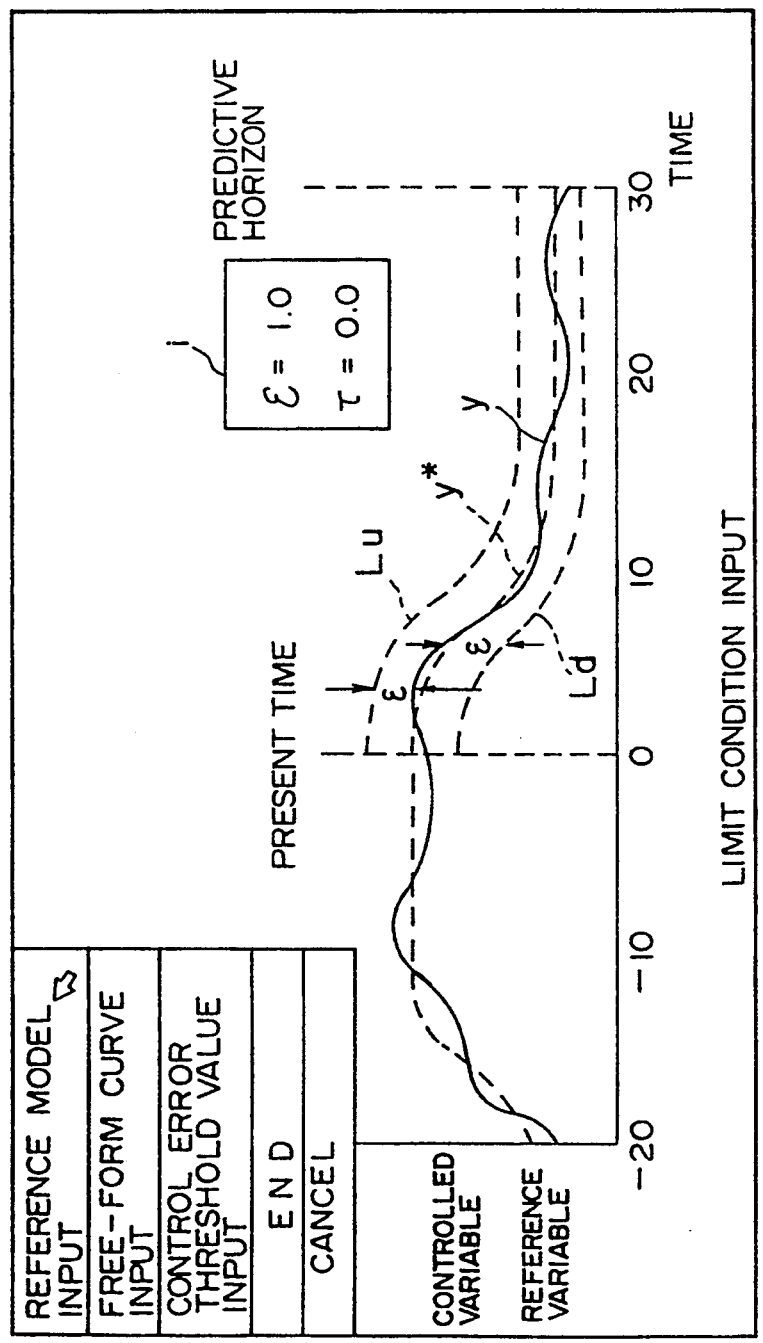

When an operator selects an icon of the control deviation threshold value input in the picture on screen shown in FIG. 9, a picture as shown in FIG. 12 is displayed. Further, the operator moves the pointer to the input area i to input a control deviation threshold value $\epsilon$ from the keyboard 104a to thereby add to the previously set future reference curve y* or subtract $\epsilon$ therefrom. An upper limit curve Lu and a lower limit curve Ld which are thus obtained are displayed on the screen as an upper limit value and a lower limit value of the controlled variable, respectively.

The threshold value $\epsilon$ may be given by a time function expressed below by further inputting an attenuation factor $\tau$:

$$\epsilon(t) = \epsilon \exp(-\tau t)$$

Figure 13:
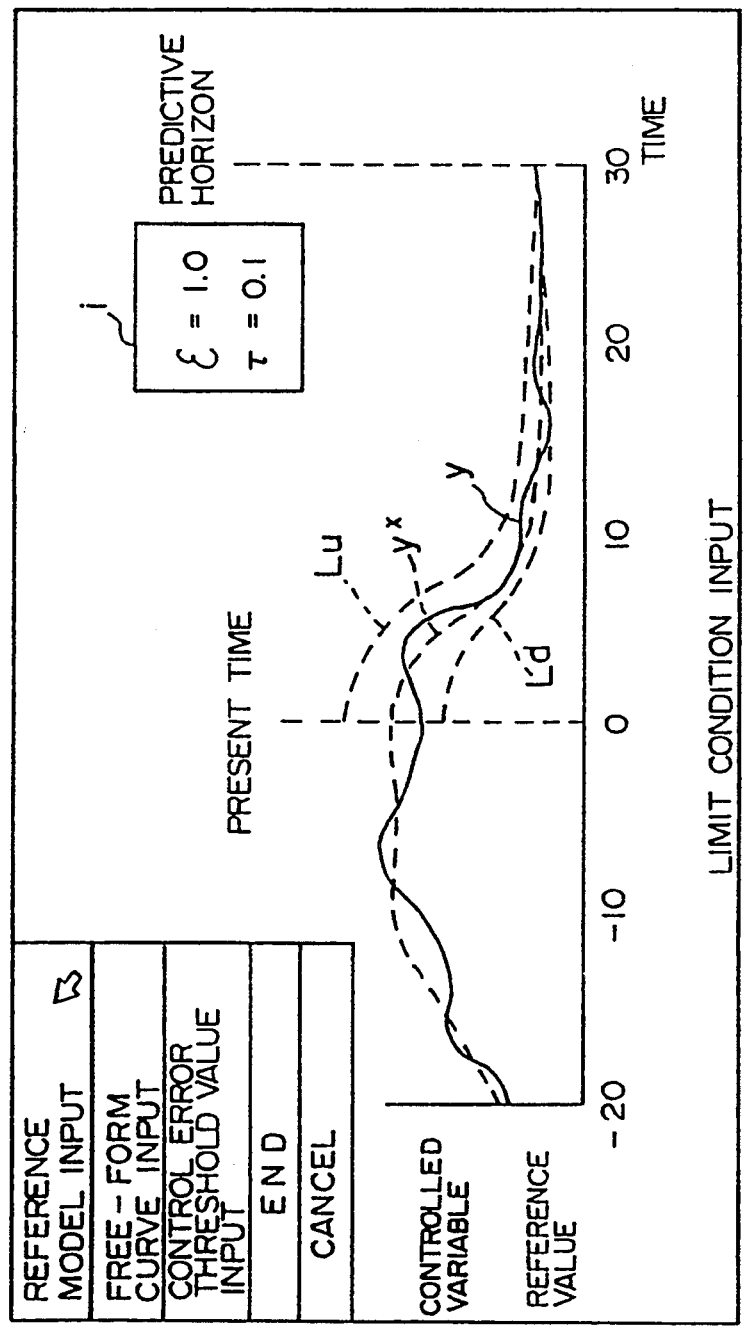

In this case, an upper limit value Lu or a lower limit value Ld of the controlled variable to converge into a future reference value y* as shown in FIG. 13 will be set. By this method, a limit value of the controlled variable y can be inputted with ease in a form to encompass the response waveform of the previously set future reference value y*.

In the pictures on screen shown in FIGS. 9 to 13, with respect to the previously inputted future reference value, a future predictive value of the controlled variable is calculated or determined on the basis of the dynamic characteristic model of the process by the simulation function, and the future predictive value thus determined is graphically displayed by solid line. An operator can input suitable limit values Lu, Ld while looking at the predictive response curve. This is the same also in connection with not only display of the controlled variable but also display in the input of the manipulated variable or a change rate signal thereof, etc. Further, an operator selects an icon of priority as indicated by c, d of FIG. 9 by using the pointer, thereby making it possible to set priority with respect to the inputted limit condition by inputting a numeric value from the keyboard, or designating the position of a bar graph by using the pointer. For example, the limit condition having the highest priority is caused to be the 0 level and the limit condition having the lowest priority is caused to be the 100 level. Respective limit conditions are temporarily stored into the memory 108 together with those numeric values.

The merit resulting from designation of priority in the limit condition is as follows. In the case where an optimal manipulated variable to satisfy all the limit conditions becomes unable to be calculated in the control operation function and the optimizing calculation function in the model predictive apparatus 20, a control operation is repeatedly performed until a quasi-optimal manipulated variable is calculated by releasing limit conditions in order from the limit condition of a lower priority to use it for a manipulated variable of the process, thereby making it possible to continue the operation of the process without interruption of the control operation. Since these actual control operation methods are described in the above-described reference materials (3)~(5), their explanation will be omitted.

The above-mentioned priority may be set every kind of limit conditions, and with respect to the portion of a certain time of one limit condition. Further, when a priority is set, respective limit conditions are displayed in a distinctive manner by, e.g., color of line, thickness of line, interval between broken lines, a numeric value of priority, or the like by a representation form determined in advance depending on the set priority. Such a processing is carried out by execution of kind of display line setting program stored in the memory 108.

Since the priority of the limit condition can be distinguished at a glance by the device of such representation form, and attention of an operator is arisen thereby, the operator becomes easy to instantaneously and correctly judge a priority set at the model predictive control apparatus.

Finally, end of operation is designated by the icon in respective limit condition input pictures on screen, whereby simulations of the response curve of a selected future reference value, the upper limit condition, the lower limit condition, and the future controlled variable are executed, and whether or not the predictive value of the controlled variable is converged under a selected condition is visually confirmed. When an icon of end is selected as the result of this confirmation, set control parameters are inputted to the model predictive control apparatus 20 as they are, and are used as the condition of the control operation.

Figure 14:
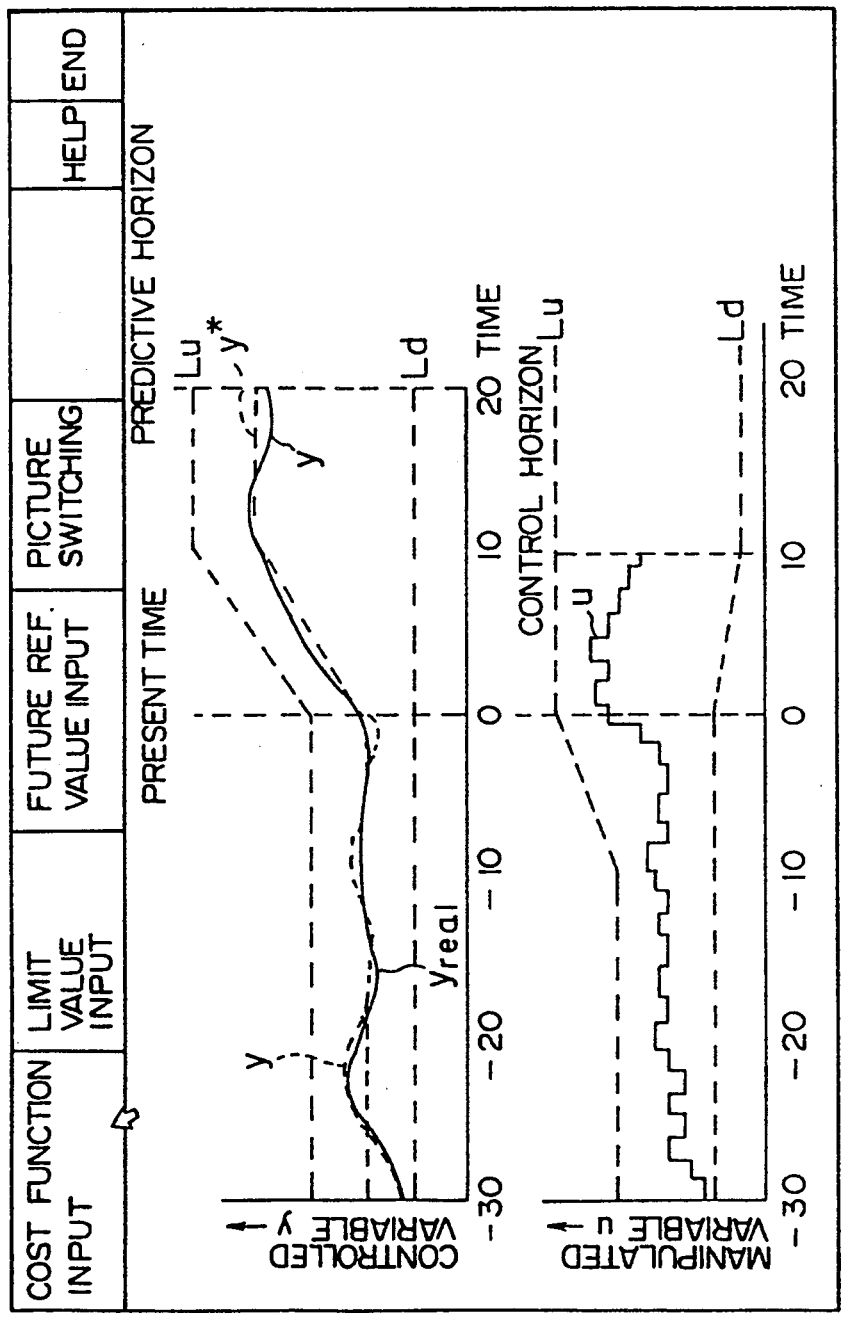
FIG. 14 is an explanatory view of an example of a display picture on screen.

Other display modes and data inputting methods, etc. in a display picture of the input device 10 will now be described. FIG. 14 shows an example of a picture display in an operating state of the control device.

In this figure, a controlled variable predictive value y, a future reference value y*, a manipulated variable u, and upper and lower limit values Lu, Ld set with respect thereto of the process are indicated, and a history curve $y_{real}$ of a past controlled variable is also indicated.

At the upper portion of this picture on screen, there are several icons. By designating any one of them by using a pointing tool, etc., the function of the designated icon can be started. When, e.g., an cost function input icon at the upper and left side of the picture on screen is designated, an cost function input program is started. As a result, an cost function input picture shown in FIG. 16 which will be described later is displayed. From on the screen, a control cost function J for discrimination of control performance, an economical cost function Je for judgment of the plant operating cost, and the like can be inputted.

When a limit value input icon is designated, a picture permitting upper and lower limit values Lu, Ld with respect to the controlled variable/manipulated variable, etc., to be inputted is developed. When a future reference value inputting icon is designated, a picture permitting a future reference value f* to be inputted by using a method of designating a free-form curve by the pointing tool, or the like is developed. Further, by designating of a picture switching cion, switching to display pictures of FIGS. 15 and 17, etc. is carried out.

Figure 15:
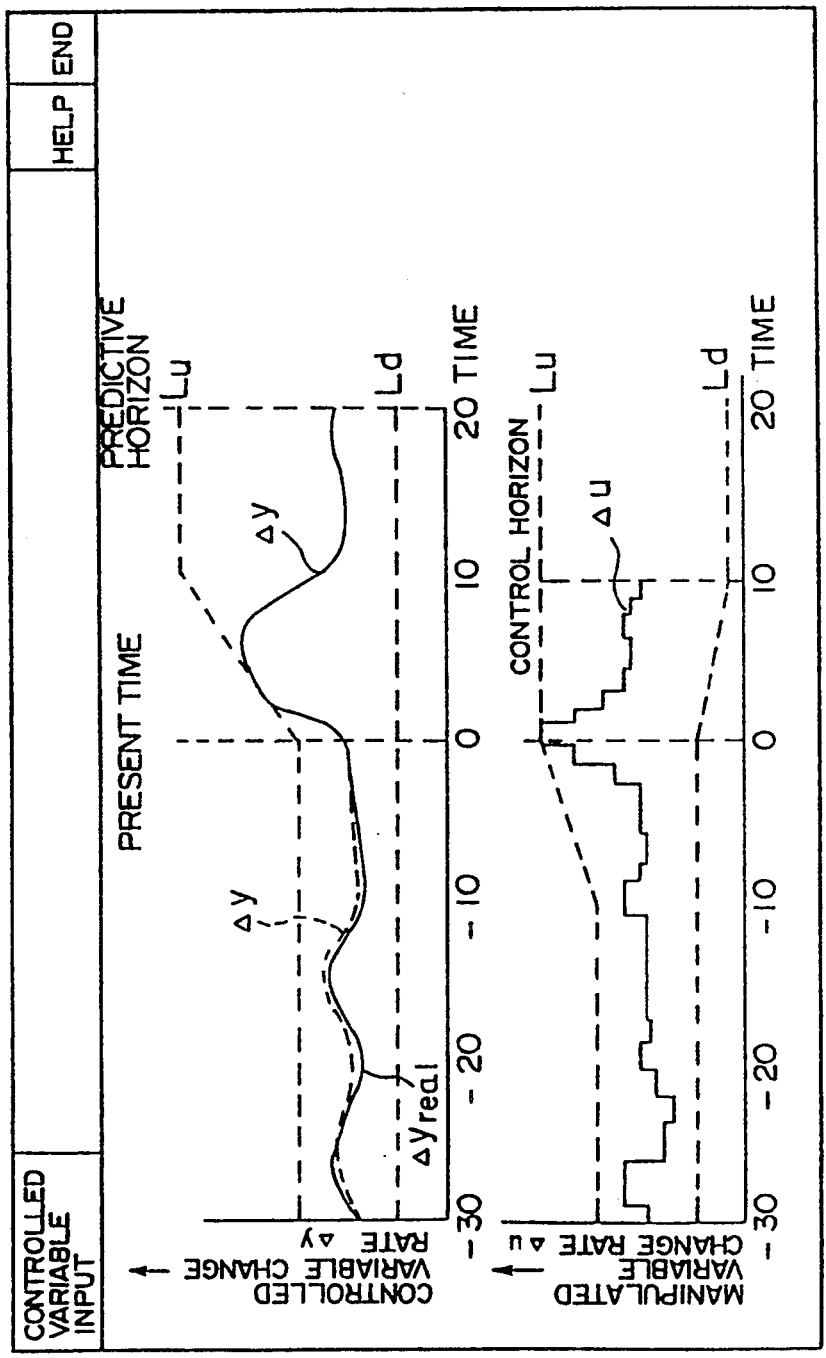
FIG. 15 is an explanatory view of an example of a display picture on screen.

FIG. 15 shows a controlled variable change rate predictive value $\Delta y$, a manipulated change rate $\Delta u$, and upper and lower limit values Lu, Ld set with respect thereto of the process, and also shows a past history curve $\Delta y_{real}$ of the controlled variable change rate.

When a limit value input icon is designated in this display picture, limit values Lu, Ld with respect to the controlled variable change rate $\Delta y$ the manipulated variable change rate $\Delta u$ can be inputted by the procedure shown in the description of FIGS. 10 to 13.

Meanwhile, in the operation of the plant, in addition to a quantitative control of a controlled system, it is also important factor that the plant is economically operated. For this reason, an approach is employed such that the control cost function and the economical cost function can be made reference to as an cost function serving as the plant operation index. The control cost function serves as an index indicating to what degree a deviation between a reference value and a controlled value, or a controlled value is reduced, in other words, the control performance. Namely, the economical cost function serves as an index indicating the process operation cost or yield, etc.

Figure 16:
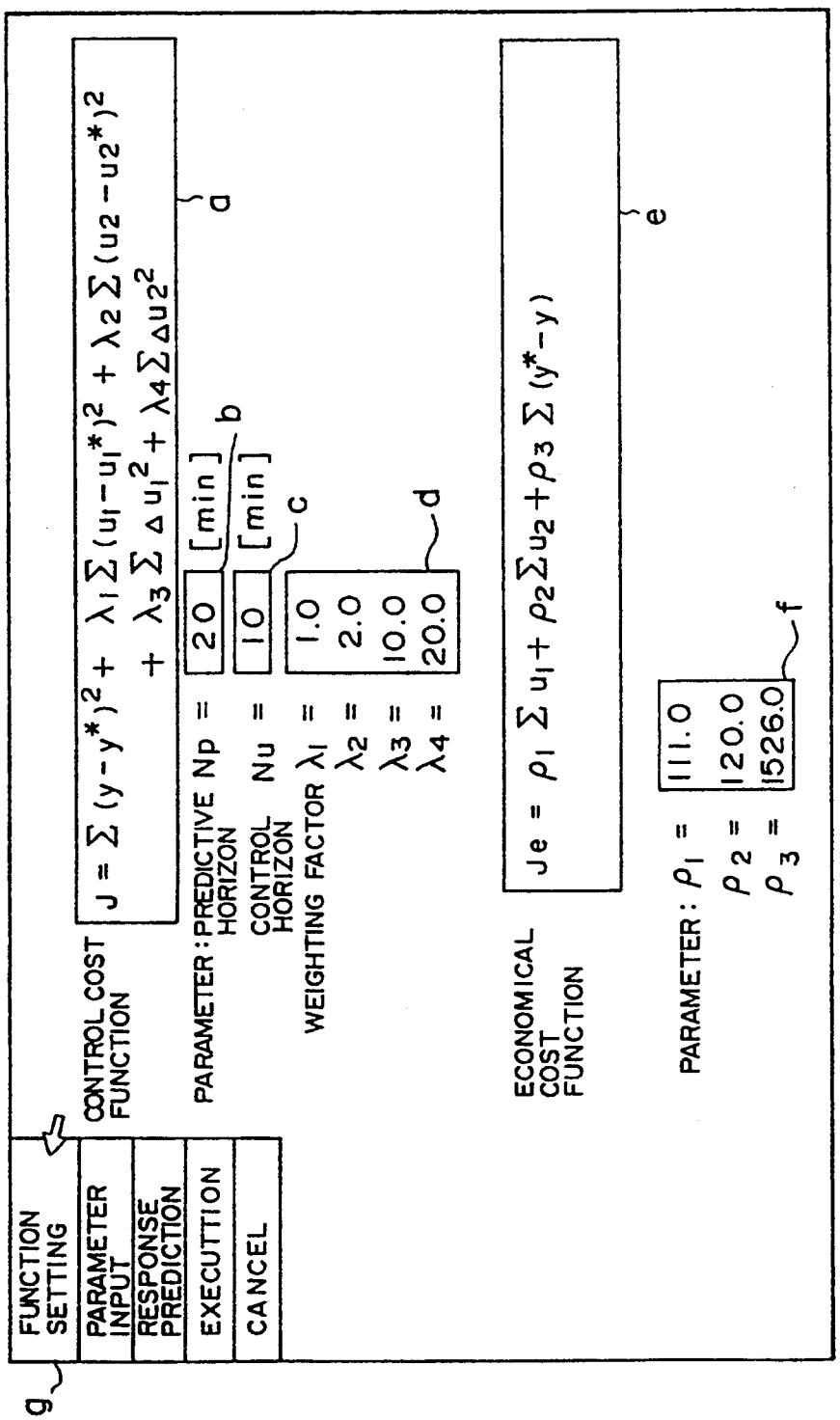
FIG. 16 is an explanatory view of an input mode picture on screen of an cost function.

FIG. 16 is a display picture for setting or altering the cost function J and the economical cost function Je by the icon of the cost function input function of FIG. 14. By designation of the icon g, the CPU 106 is notified of the kind of input data, thus making it possible to carry out various kinds of inputs.

For example, after the function setting icon is designated by the pointer, a control cost function equation J to be taken into consideration in the control operation can be inputted by the keyboard 104a in a picture area shown at a in FIG. 16. The inputted cost function is stored into the memory 108. Further, after an icon of the parameter input is designated, the pointer is moved to the input areas of b, c, d of FIG. 6, thus making it possible to input, by the keyboard 104a, control parameters such as a prediction horizon Np, a control horizon Nu, weighting factors 1~4, etc. included in the cost function.

Similarly, the economical cost function Je indicating an operation cost and yield of the process, etc. can be inputted into the area e of FIG. 16 from the keyboard 104a. Values of those parameters $\rho 1$, $\rho 2$, $\rho 3$ can be inputted by the keyboard 104a. Control parameters inputted from on the picture on screen are stored into the memory 108. In these input areas on the screen, an cost function equation, a numeric value or a standard value set at present is ordinarily displayed.

Figure 17:
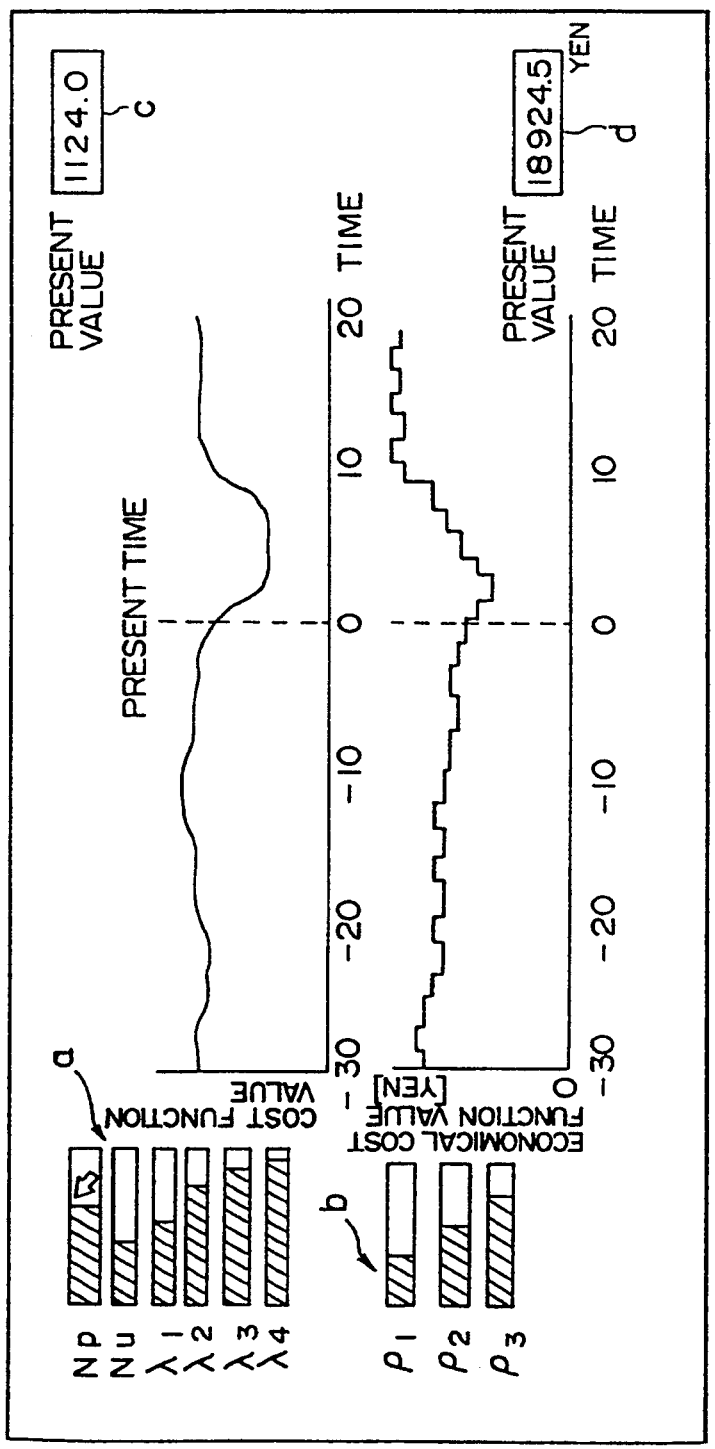
FIG. 17 is an explanatory view of a display mode picture on screen of an cost function.

When the response predictive icon is started by the pointer after the cost function is set, the simulation operation program and the simulation display program stored in the memory 108 are started. FIG. 17 shows an example of a picture showing the simulation result of the cost function J wherein the ordinate and the abscissa of the graph represent a predictive value and a time base, respectively. Two curves J and Je respectively calculated for the control cost function J and the economical cost function Je set at present are displayed. The both cost functions consist of a history curve portion showing development up to the present time and a predictive curve portion showing a future predictive value portion. In the area c and d within the picture, the present cost function value and the present economical evaluation value are displayed, respectively. On the left side of the picture on screen, parameters set in the cost function, e.g., prediction horizon Np, control horizon Nu, weighting factors $\lambda 1 \sim \lambda 4$, and parameters $\rho 1 \sim \rho 3$ included in the economical cost function are displayed in a form of the bar graphs a, b. By inputting the position of the pointer by using a pointing tool, etc. within the bar graph display area, approximate values corresponding to the position can be inputted as values of respective parameters.

When an operator confirms the simulated result by visual observation to allow the present picture to return to the picture of FIG. 16 to designate execution (end) icon serving as a setting command by using the pointer, the set cost functions J, Je are transferred from the memory 108 to the predictive control apparatus 20, and is stored into the memory 202. Thus, a new cost function is set at the CPU 201 of the predictive control apparatus 20, and is used for an actual control operation.

When the operator designates the icon of cancel in the picture on screen of FIG. 16 by using the pointer, the cost function inputted and displayed on the screen is canceled, and the inputted content relating to the cost function which has been temporarily stored is also reset. Thus, there results the state where re-inputting can be conducted.

It is to be noted that when an icon of the future reference value input is selected by the pointer in the picture display shown in FIG. 14, the previously described future reference value input function is started. As a result, a reference value input picture (not shown) is displayed.

When an icon of the limit value input is designated by the pointer in the picture display shown in FIG. 14, the previously described limit condition input function is started.

Figure 18:
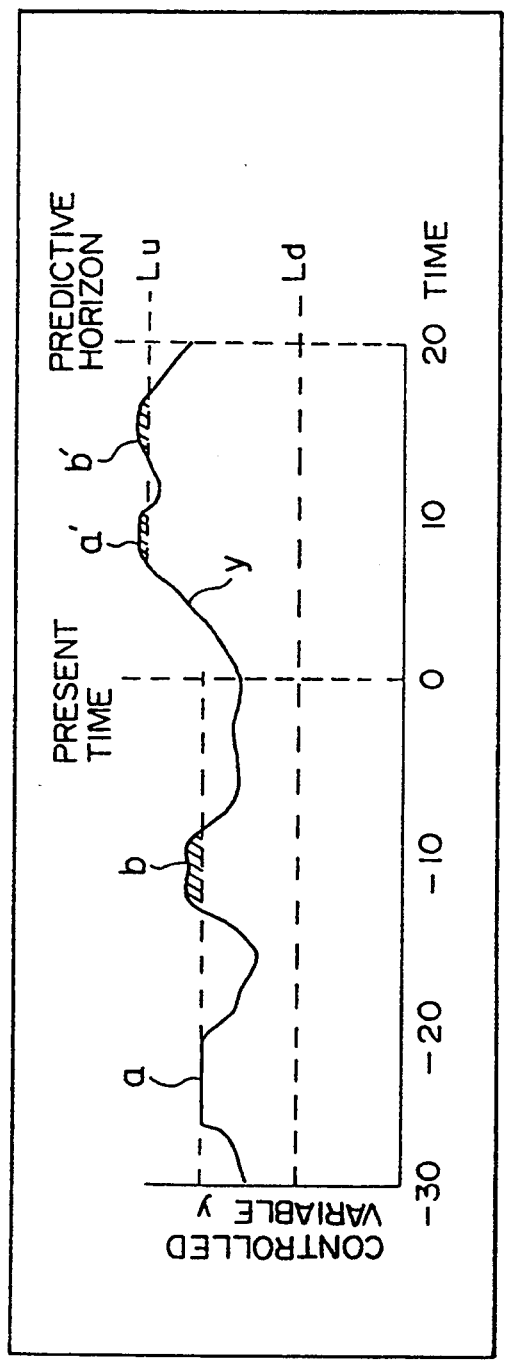
FIG. 18 is an explanatory view showing a display example of an intersecting portion of a controlled variable predictive value curve and a limit value curve.

Meanwhile, there are instances where the history curve and the predictive curve of respective parameters displayed (controlled variable, manipulated variable, and change rates thereof, etc.) and the upper and lower limit values may be in contact with each other, or cross over each other. In such cases, as shown in FIG. 18, for example, the portion where the predictive curve and the limit value curve are in contact with each other, or the portion where the predictive curve is above the limit value curve is displayed in a manner distinguished from other portions by display color, thickness of curve, and kind of curves by the previously described kind of display line setting program. Particularly, at the portion where there is no solution to satisfy the limit condition in the control operation, and the control condition is disregarded in accordance with the rank of priority, a special display is conducted at a corresponding portion on the curve with a view to arising an operator's attention. For example, the portions of a, a' of FIG. 18 are displayed as the portion where the limit condition is taken into consideration, and the portions b, b' are displayed as the portion where the limit condition is disregarded.

It is to be noted that while, in the above-described embodiment, there is employed a configuration such that the input device 10 and the model predictive control apparatus 20 are controlled by separate or individual CPUs, there may be employed a configuration such that, if CPU has a sufficiently high operation or computational processing ability, the input device 10 and the model predictive apparatus 20 are caused to be of a unitary structure to control it by a single CPU.

As described above, the input device for the model predictive control apparatus of this invention is constructed to carry out settings and/or alterations of various predictive models or control parameters, etc. to be inputted to the model predictive control apparatus through the picture on screen of the input device to carry out in advance simulation of the model predictive control by the contents of control parameters thus set, etc, or other factors to confirm their results by visual observation on the screen thereafter to set, at the model predictive control apparatus, data of functions and/or control parameters, etc. of the predictive model. Accordingly, an optimal selection of control parameters, etc. can be easily made in the input device. Thus, improvement in the operation efficiency of the plant operated under various limit conditions can be made, and safety of the operation can be ensured in order that no extraordinary condition takes place in control. Further, by inputting various commands under a guidance of display of pictures, the frequency of erroneous operations in the operation of the plant can be reduced, and the number of switches, dials, instruments, or the like of the input device for the plant control can be reduced to much degree.

An embodiment of a model predictive control apparatus according to this invention having an cost function parameter adjustment function will now be described with reference to FIG. 19. In FIG. 19, a controlled system process 301 is a multi-input/output process having a q number of manipulated variables and a p number of controlled variables. A model predictive control apparatus 302 for controlling the multi-input/output process 301 outputs manipulated variables $u_1 \sim u_q$ for allowing controlled variables $y_1 \sim y_p$ of the process to follow reference values $y^*_1 \sim y^*_p$.

This model predictive control apparatus 302 is composed of cost function parameter adjustment means 303 for determining a suitable cost function parameter on the basis of a given stability margin parameter, etc., control parameters calculation means 304 for determining control parameters from a pulse transfer function matrix of a controlled system given as a dynamic characteristic model, and a model predictive control operation unit 305 for sequentially calculating optimal manipulated variables on the basis of the determined control parameters.

Figure 20:
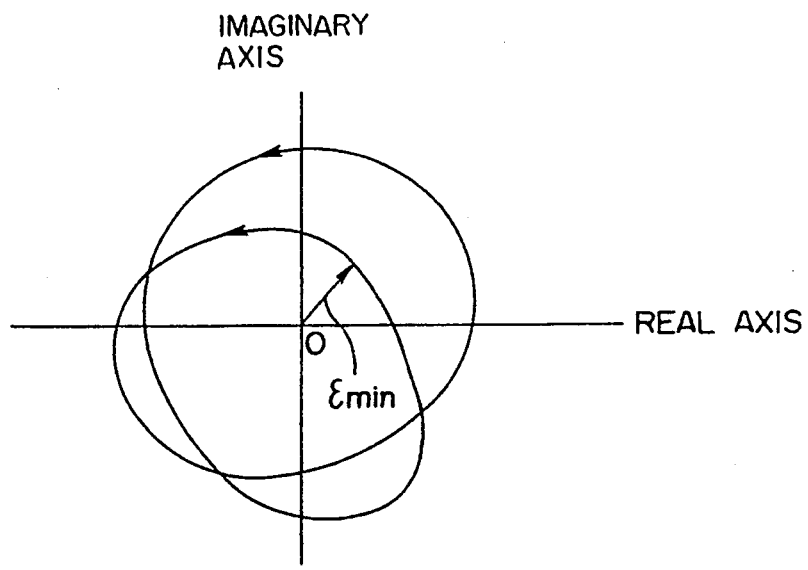
FIG. 20 is a generalized Nyquist diagram for discriminating stability of a multi-variable control system.
Figure 23:
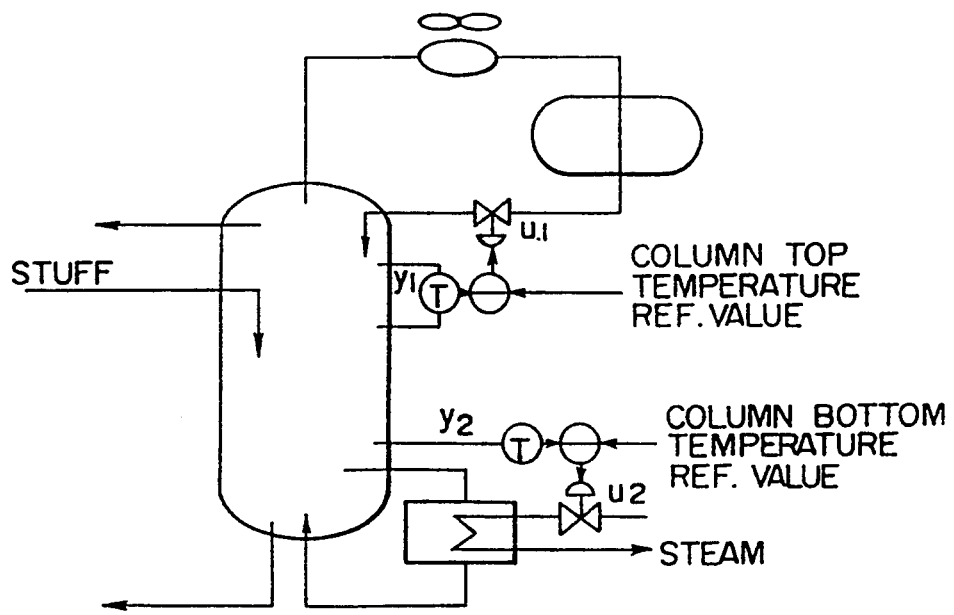
FIG. 23 is a block diagram showing the configuration of a distilling column temperature control system.

The model predictive control system shown in FIG. 19 includes a closed loop system comprised of a multi-input/output process 301 and a model predictive control operation unit 305. The characteristic of this closed loop system governs the control response characteristic or the stability. When assumption is made such that the frequency response matrix of the multi-input/output process is $G(j\omega)$, the frequency response matrix of the model predictive control operation unit is $C(j\omega)$, a unit matrix is I, and the number of respective unstable poles are $N_G$ and $N_C$, respectively, in accordance with the generalized Nyquist theorem, if a vector locus on the complex plane with respect to the frequency $\omega = -\infty \sim \infty$ of $$\det(I+G(j\omega)\,C(j\omega)),$$

or $$\det(I+C(j\omega)\,G(j\omega))$$

rotates by times of $N_G+N_C$ counterclockwise with respect to the origin without being passed through the origin as shown in FIG. 20, the closed loop system is stable. If this property is utilized, in the case where the control parameters is continuously changed in a model predictive control system designed so that it is once stabilized, as long as the above-described vector locus keeps a certain distance $\epsilon_{min}$ from the origin, i.e., as long as the following relationship holds:

$$\det(I+C(j\omega)\,G(j\omega)) > 0,$$

the stability of the closed loop system is kept. This condition is replaced by the following condition relating to the minimum and maximum singular values $$\sigma_{min}(I+C(j\omega)\,G(j\omega)) > 0,$$

or $$\sigma_{max}(I+C(j\omega)\,G(j\omega))^{-1} < \infty$$

in place of the determinant det (. . .). In the above relationships, $\sigma_{min}$ and $\sigma_{max}$ indicate extraction of the minimum singular value and the maximum singular value, respectively.

Figure 21A:
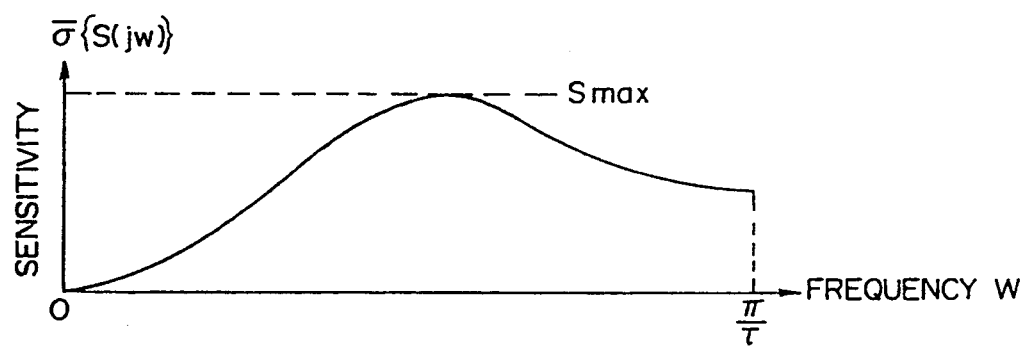
FIGS. 21A and 21B are characteristic diagrams showing a sensitivity characteristic and a complementary sensitivity characteristic for discriminating stability and robust property of the control system, respectively.

In view of this, if $S_{max} < \infty$ corresponding to an inverse number of the $\epsilon_{min}$ as a criterion of stability margin, and the control parameters is adjusted so that the following relationship holds:

$$\sigma_{max}(1+C(j\omega)G(j\omega))^{-1} \leq S_{max} = (\epsilon_{min})^{-1}$$

the stability of the control system is kept. This eventually corresponds to the fact that the peak value of the frequency response curve of the maximum singular value of the sensitivity function $(1+C(j\omega)\,G(j\omega))^{-1}$ shown in FIG. 21A is caused to limitatively fall within a threshold value.

The condition for keeping the robust stability with respect to a change in the characteristic of a controlled system is given below. In the case where the controlled system $G(j\omega)$ changes to $G(j\omega)(1+\Delta(j\omega))$, if the following relationship holds:

$$\sigma_{max}\,T(j\omega) \leq T_{max}(\omega),$$

or $$T_{max}(\omega) = (\sigma_{max}\{\Delta(j\omega)\})^{-1},$$

with respect to the complementary sensitivity function described below, $$T(j\omega) = (I+C(j\omega)\,G(j\omega))^{-1}\,C(j\omega)G(j\omega)$$

the stability of the control system is ensured. In view of this, if a function $T_{max}(\omega)$ corresponding to a change in the characteristic of the object to be controlled expected in advance is given, and the above-described condition holds as shown in FIG. 21B, the robust stability of the control system can be ensured.

Figure 21B:
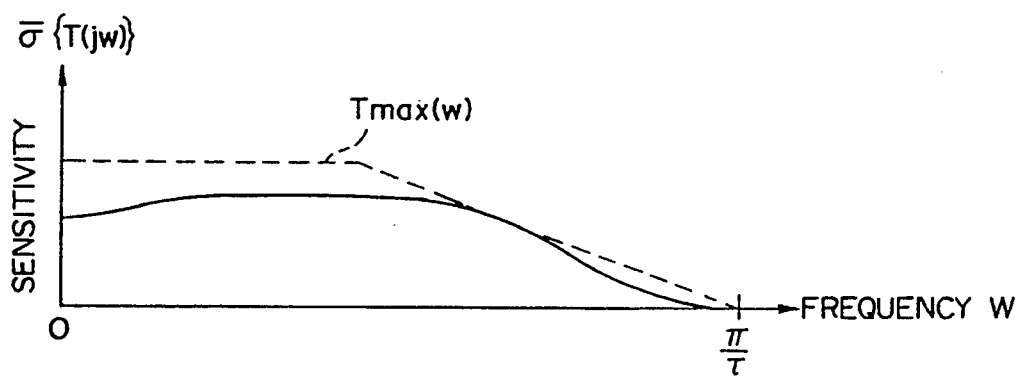

Accordingly, as long as the control parameters or the cost function parameters are adjusted while checking the condition relating to the sensitivity function and the complementary sensitivity function as shown in FIG. 21A and FIG. 21B, the stability and the robust stability of the model predictive control system are ensured. The principle of the parameter adjustment method in the cost function parameter adjustment means 3 proposed by this invention has been described above.

Control parameters included in the control operation equation of the model predictive control apparatus are determined on the basis of the determined cost function parameters.

Respective functions of the model predictive apparatus of this invention will now be described.

As a dynamic characteristic model with respect to the multi-input/output process, a pulse transfer function matrix expressed by the following equation is given to the model predictive control apparatus 302.

$$\begin{pmatrix} y_1(k) \\ \vdots \\ y_p(k) \end{pmatrix} = \tag{23}$$

$$\begin{pmatrix} B_{11}(z^{-1})/A_{11}(z^{-1}) & \cdots & B_{1q}(z^{-1})/A_{1q}(z^{-1}) \\ \vdots & & \vdots \\ B_{p1}(z^{-1})/A_{p1}(z^{-1}) & \cdots & B_{pq}(z^{-1})/A_{pq}(z^{-1}) \end{pmatrix} \begin{pmatrix} u_1(k-1) \\ \vdots \\ u_q(k-1) \end{pmatrix}$$

In the above equation, $A_{ij}(Z-1)$ and $B_{ij}(Z-1)$ are expressed as follows.

$$A_{ij}(Z^{-1}) = 1 + a_1^{ij}Z^{-1} + \ldots + a_n^{ij}Z^{-n},$$

and $$B_{ij}(Z^{-1}) = b_0^{ij} + b_1^{ij}Z^{-1} + \ldots + b_m^{ij}Z^{-m}$$

where p is the number of controlled variables, q is the number of manipulated variables, and the condition where p is not equal to q may hold.

It is to be noted that the equation (23) corresponds to the equation (7) in an one-dimensional input/output model, and the equations (24a), (24b) correspond to the equations (6a) and (6b), respectively.

The purpose of control is to allow the controlled variable $y_1$ to follow the reference value $y_1^*$ so that an cost function expressed by the following equation becomes minimum.

$$J = \sum_{j=L}^{Np} \sum_{i=1}^{p} \{D(z^{-1})(y_i(k+j) - y_i^*(k+j))\}^2 + \lambda \sum_{j=1}^{Nu} \sum_{i=1}^{q} (\Delta u_i(k+j-1))^2 \quad (24)$$

where $\Delta u_i(k) = u_i(k) - u_i(k-1)$ is an increment in the manipulated variable.

Among parameters in the equation (24), L, N and P are a prediction horizon, Nu is a control horizon, $\lambda$ is a weighting factor, and $D(Z^{-1})$ is a polar assignment polynominal. These parameters are generically called an cost function parameter. While parameters L, Np, Nu, $\lambda$ and $D(Z^{-1})$ can be changed every respective manipulated variables $u_1 \sim u_q$ respective controlled variables $y_1 \sim y_p$, the example where these parameters are not distinguished is shown in this embodiment.

The procedure for calculating control parameters in the control parameters calculation means 304 is first given. The control parameters calculation means 304 carries out the following calculation on the basis of the pulse transfer function matrix expressed by the equation (23) of a given controlled system model and the cost function parameters.

Denominator is reduced in the rows with respect to the first to the p-th rows in the matrix of the right side expressed by the equation (23). For example, with respect to the i-th row, $$B_{i1}(Z^{-1})/A_{i1}(Z^{-1}) \ldots B_{iq}(Z^{-1})/A_{iq}(Z^{-1})$$

is reduced as follows:

$$B'_{i1}(Z^{-1})/A_i(Z^{-1}) \ldots B'_{iq}(Z^{-1})/A_i(Z^{-1})$$

As a result, the equation (23) can be transformed into the following form $$\begin{pmatrix} A_1(z^{-1}) & & \\ & \ddots & \\ & & A_p(z^{-1}) \end{pmatrix} \begin{pmatrix} y_1(k) \\ \vdots \\ y_p(k) \end{pmatrix} = \begin{pmatrix} B_{11}'(z^{-1}) & \ldots & B_{1q}'(z^{-1}) \\ \vdots & & \vdots \\ B_{p1}'(z^{-1}) & \ldots & B_{pq}'(z^{-1}) \end{pmatrix} \begin{pmatrix} u_1(k-1) \\ \vdots \\ u_q(k-1) \end{pmatrix} \quad (25)$$

The following equation (which is called a Diophantine equation) is then solved with respect to respective rows ($i = 1 \sim p$) and $j = 1 \sim Np$:

$$D(z^{-1}) = E_{ji}(z^{-1})(1-z^{-1})A_i(z^{-1}) + z^{-j}F_{ji}(z^{-1}) \quad (26)$$

Polynominals described below are determined.

$$E_{ji}(z^{-1}) = 1 + e_1{}^{ji}z^{-1} + \ldots + e_{j-1}{}^{ji}z^{-j+1} \quad (27a)$$

((j−1)th order monic polynominal)

$$F_{ji}(z^{-1}) = f_0{}^{ji} + f_1{}^{ji}z^{-1} + \ldots + f_n{}^{ji}z^{-n} \quad (27b)$$

(n-th order)

These polynominals correspond to the equations (9) and (10a) in the case of one-dimensional input/output, respectively. Here, a closed loop polynominal is given by the following relationship, for example, $$D(Z^{-1}) = 1 - \rho Z^{-1} \quad (28)$$

where $\rho$ is a filter coefficient and indicates a response speed. When $\rho$ is a value close to zero, the response is steep, while when $\rho$ is a value close to 1, the response is gentle.

As a result, predictive values of controlled variables $y_1 \sim y_p$ late by j-steps are given as follows:

$$\begin{pmatrix} y_1(k+j) \\ \vdots \\ y_p(k+j) \end{pmatrix} = G_{j-1} \begin{pmatrix} \Delta u_1(k+j-1) \\ \vdots \\ \Delta u_q(k+j-1) \end{pmatrix} + \ldots +$$

$$G_0 \begin{pmatrix} \Delta u_1(k) \\ \vdots \\ \Delta u_q(k) \end{pmatrix} +$$

$$\begin{pmatrix} F_{j1}(z^{-1}) & & \\ & \ddots & \\ & & F_{jp}(z^{-1}) \end{pmatrix} \begin{pmatrix} y_1(k) \\ \vdots \\ y_p(k) \end{pmatrix} +$$

$$H_j(z^{-1}) \begin{pmatrix} \Delta u_1(k-1) \\ \vdots \\ \Delta u_q(k-1) \end{pmatrix}$$

(29) In the above equation, $G_{j-1}$, $G_0$ are constant matrix of $p \times q$, and $H_j(Z^{-1})$ is a polynominal matrix of $p \times q$ relating to $Z^{-1}$. These parameters are determined by the relational equation.

$$\begin{pmatrix} E_{ji}(z^{-1}) & & \\ & \ddots & \\ & & E_{jp}(z^{-1}) \end{pmatrix} \begin{pmatrix} B_{11}(z^{-1}) & \ldots & B_{1q}(z^{-1}) \\ \vdots & & \vdots \\ B_{p1}(z^{-1}) & \ldots & B_{pq}(z^{-1}) \end{pmatrix} = \quad (30)$$

-continued
$$G_{j-1} + \ldots + G_0 z^{-j+i} + z^{-j} H_j(z^{-1})$$

In the above equation, $G_0 \ldots G_{j-1}$ correspond to the step response matrix of the controlled system (23) equation.

The equation (29) is assumed to be briefly represented by the following equation.

$$y(k+j) = G_{j-1}\Delta u(k+j-1) + \ldots + G_0\Delta u(k) + F_j(z^{-1})y(k) + H_j(z^{-1})\Delta u(k-1) \quad (31)$$

When the equation (31) is collectively represented with respect to $j = 1 \sim Np$, the following relation is presented.

$$\begin{pmatrix} y(k+1) \\ \vdots \\ y(k+Np) \end{pmatrix} = \quad (32)$$

$$\begin{pmatrix} G0 & 0 & \ldots & 0 \\ G1 & G0 & 0 & \ldots & 0 \\ \vdots & & & 0 \\ GNu-1 & & \ldots & G0 \\ \vdots & & & \vdots \\ GNp-1 & & \ldots & GNp-Nu \end{pmatrix} \begin{pmatrix} \Delta u(k) \\ \vdots \\ \Delta u(k+Nu-1) \end{pmatrix} +$$

$$\begin{pmatrix} F_1(z^{-1}) \\ \vdots \\ F_{Np}(z^{-1}) \end{pmatrix} y(k) + \begin{pmatrix} H_1(z^{-1}) \\ \vdots \\ H_{Np}(z^{-1}) \end{pmatrix} \Delta u(k-1)$$

This equation corresponds to the equation (8) in the case of one dimensional model. Collective representation of the equation (32) gives $$y = G\Delta u + F(z^{-1})y(k) + H(z^{-1})\Delta u(k-1) \quad (33)$$

At this time, the cost function of the equation (55) can be expressed as follows.

$$J = (D(z^{-1})y - D(z^{-1})y^*)^T (D(z^{-1})y - D(z^{-1})y^*) + \lambda \Delta u^T \Delta u \quad (34)$$

In the above equation (34), T is a transposed matrix expressed below:

$$y^* = \begin{pmatrix} y^*(k+1) \\ \vdots \\ y^*(k+Np) \end{pmatrix}$$

$$y^*(k+j) = \begin{pmatrix} y^*_1(k+j) \\ \vdots \\ y^*_p(k+j) \end{pmatrix}$$

In this relational equation, $y^*_i(K+j)$ is a reference value j steps later with respect to the i-th controlled variable $y_i$.

At this time, an optimal manipulated variable to minimize the cost function of the equation (24) (or the equation (34)) is given as follows:

$$\Delta u = (G^T G + \lambda I)^{-1} G^T \{D(z^{-1})y^* - F(z^{-1})y(k) - H(z^{-1})\Delta u(k-1)\} \quad (35)$$

An actual manipulated variable is obtained by taking out the first element q (described below) of the vector $\Delta u$ $$\Delta u(k+1) = G_q^* \{D(z^{-1})y^* - F(z^{-1})y(k) - H(z^{-1})\Delta u(k-1)\} \quad (36)$$

(Gq* is a matrix of $q \times (p \times Np)$ obtained by taking out q rows from the top of $(G^T G + \lambda I)^{-1} G^T$) to calculate the following equation.

$$u(K) = u(K-1) + \Delta u(K) \quad (37)$$

Accordingly, the control parameters calculation means 304 extracts Gq*, $F(Z^{-1})$, $H(Z^{-1})$ as a control parameter (control parameters) from the derived equation (36) to provide or offer these parameters to the model predictive control operation unit 5.

The model predictive control operation unit 305 receives control parameters Gq*, $F(Z^{-1})$ and $H(Z^{-1})$ from the control parameters calculation means 304 to carry out control operations on the basis of the equations (36), (37) by using controlled variables $y_1 \sim y_p$ and reference values $y^*_1 \sim y_p$ of the process.

The adjustment means of cost function parameters (prediction horizons L and Np, control horizon Nu, weighting factor $\lambda$, pole assignment polynominal $D(Z^{-1})$) in the cost function parameter adjustment means 303 will now be described.

(i) The prediction horizon Np is determined as follows:

Np = max (time when the step response reaches 90% of the step response final value of the elements i, j of the pulse transfer function matrix (23), or Np = max (time when the impulse response reaches an impulse response peak value of elements i, j of the pulse transfer function matrix of the equation (23))

(ii) The prediction starting length L is determined as follows:

In the case where a dead time of the object process of the equation (23) is known in advance, L = max (dead time of elements i, j of the pulse transfer function matrix of the equation (23))

In the case where a dead time of the controlled system process is not clear,

L = 1

(iii) The control horizon Nu is determined as follows. With respect to G, $$G = \begin{pmatrix} G0 & 0 & \ldots & 0 \\ G1 & G0 & 0 & \ldots & 0 \\ \vdots & & & & \\ \vdots & & & & \\ GNp-1 & & \ldots & G_0 \end{pmatrix} \quad (38)$$

the control horizon Nu is expressed as follows:

$$Nu = \text{int (rank } G/q) + 1 \quad (39)$$

where when Nu>Np, Nu is assumed to be equal to Np. In the above equation (39), int ( . . . ) is an operation for taking out an integer part.

Calculation of the rank G is as follows. Namely, G is subjected to singular value decomposition $$G = U \text{ diag } \{\sigma_1 \ldots \sigma_k \ldots \sigma_{Np}\} V^T \quad (40)$$

From the singular value a, rank G is determined by the following equation $$\text{rank} G = \min \left\{ k: \sum_{i=1}^{K} \sigma_i / \sum_{i=1}^{Np \times p} \geq 1 - \epsilon \right\} \quad (41)$$

where the threshold value $\epsilon$ is assumed to be, e.g., 0.1. The above mentioned U and V are a singular vector.

Figure 22:
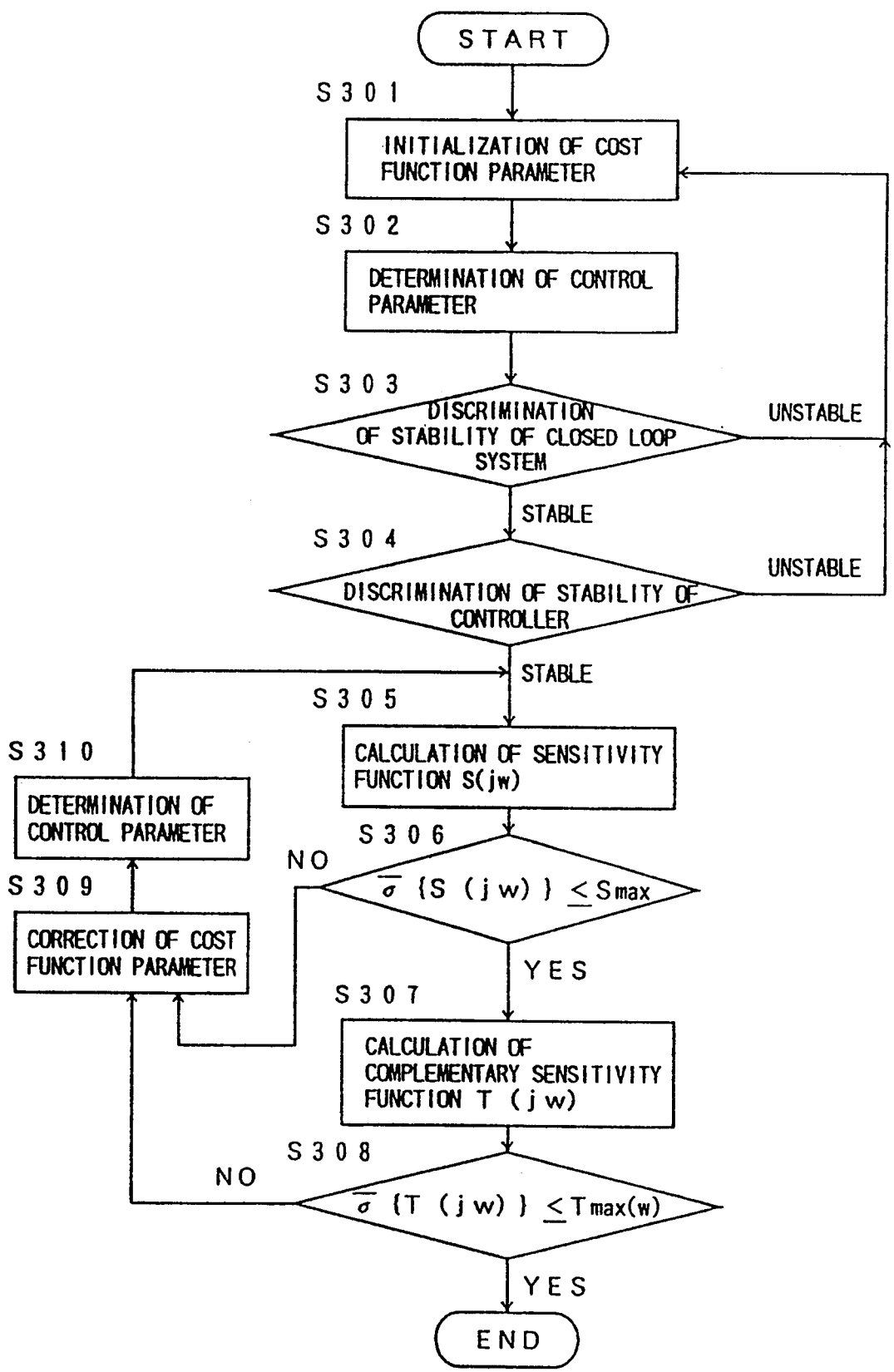
FIG. 22 is a flowchart indicating a processing procedure of cost function parameter adjustment means.

(iv) The weighting factor $\lambda$ and the closed loop pole assignment polynominal $D(Z^{-1})$ is adjusted in accordance with the flowchart of FIG. 22. The procedure thereof is given below.

Step S301: Initial values of $\lambda$ and $D(Z^{-1})$ are given by the following equation, for example:

$$\lambda = \epsilon (\epsilon \geq 0, \text{ e.g., } \epsilon = 10^4)$$

$$D(Z^{-1}) = 1 - \delta Z^{-1} (0 \leq \delta < 1, \text{ e.g., } \delta = 0.9999)$$

Step S302: This cost function parameters are delivered to the control parameters calculation means 4 to determine control parameters in accordance with the procedure of the equations (23)–(36).

Step S303: Root of a characteristic polynomial of the closed loop system (described below) obtained from the controlled object (23) equation and the control rule (36) equation $$\det \{\Delta(z^{-1})A(z^{-1}) + B(z^{-1})$$
$$(I + G_q * H(z^{-1}))^{-1} G_q * F(z^{-1})\} = 0 \quad (42)$$

is calculated to determine whether or not the real parts are all negative. If all the parts are negative, the closed loop system is judged to be stable. Accordingly, the operation proceeds to the next step. When otherwise, the operation returns to the step S301 to alter an cost function parameter initial value. In the above equation, the following relationship holds:

$$\Delta(z^{-1}) = \text{diag}\{(1 - z^{-1}) \ldots (1 - z^{-1})\}$$

$$A(z^{-1}) = \begin{pmatrix} A_1(z^{-1}) & & & \\ & \cdot & & \\ & & \cdot & \\ & & & A_p(z^{-1}) \end{pmatrix}$$

$$B(z^{-1}) = \begin{pmatrix} B_{11}(z^{-1}) & \ldots & B_{1q}(z^{-1}) \\ \cdot & & \cdot \\ \cdot & & \cdot \\ \cdot & & \cdot \\ B_{p1}(z^{-1}) & \ldots & B_{pq}(z^{-1}) \end{pmatrix}$$

Step S304: Root of a characteristic polynomial (described below) of a controller obtained from the control rule (36) equation $$\det (I + G_q * H(z^{-1})) = 0 \quad (43)$$

is calculated to judge whether or not the real parts are all negative. If the real parts are all negative, the control is judged to be stable. Accordingly, the operation proceeds to the next step. When otherwise, the operation returns to the step S301 to alter an cost function parameter initial value.

Step S305: An open-loop transfer function matrix frequency response $L(j\omega)$ of the control system is determined by the following calculation.

$$L(j\omega) = \Delta(z^{-1})^{-1}(I + G_q * H(z^{-1}))^{-1} G_q * F(z^{-1}) A(z^{-1})^{-1} B(z^{-1})|_{z = e^{j\omega \tau}} \quad (44)$$

where $\tau$ is a control period. Subsequently, a sensitivity function expressed below is determined.

$$S(j\omega) = (I + L(j\omega))^{-1} \quad (45)$$

Step S306: Whether or not the maximum singular value of the sensitivity function satisfies the following condition is judged.

$$S_{max} - \epsilon_S \leq \sigma_{max}\{S(j\omega)\} S_{max} \quad (46)$$

where $S_{max}$ and $\epsilon_S$ are a threshold value relating to stability margin given in advance. If this condition holds, the operation proceeds to the next step. In contrast, if this condition does not hold, the operation proceeds to step S309.

Step S307: A complementary sensitivity function is determined.

$$T(j\omega) = (I + L(j\omega))^{-1} L(j\omega) \quad (47)$$

Step S308: Whether or not the maximum singular value of the complementary sensitivity function satisfies the following condition is judged.

$$\sigma_{max}\{T(j\omega)\} \leq T_{max}(\omega) \quad (48)$$

In the above equation, $T_{max}(\omega)$ is a threshold function relating to the robust stability margin given in advance. For example, the following function, etc. is used.

$$T_{max}(\omega) = |K/(1 + Tj\omega)^n| \quad (49)$$

(K>0, T>0, integer n≥1)
If this condition holds, adjustment of the cost function parameters , adjustment of $D(Z^{-1})$ is completed. In contrast, if this condition does not hold, the operation proceeds to step S309.

Step S309: The cost function parameters, $D(Z^{-1}) = 1 - \delta Z^{-1}$ are adjusted in a manner described below.

$$\lambda \leftarrow \lambda \times 0.99 \quad (50)$$

or $$\rho \leftarrow 0.99 \times \delta \quad (51)$$

It is to be noted that it is not necessarily required to both satisfy the stability conditions relating to the sensitivity function and the complementary sensitivity function, and there may be instances where only one of the equations (50) and (51) is executed.

Step S310: The cost function parameter thus readjusted is delivered to the control parameters calculation means 304 to determine control parameters in accordance with the procedure of the equations (23)–(36) in a manner similar to that of the step S302.

As stated above, the weighting factor $\lambda$ and the closed loop pole assignment polynominal $D(Z^{-1})$ are repeatedly adjusted until the stability margin and robust stability margin designated by the control system are satisfied.

In this way, at the cost function parameter adjustment means 303, cost function parameters such as prediction starting time L, prediction horizon Np, control horizon Nu, weighting factor $\lambda$, and pole assignment polynominal $D(Z^{-1})$, etc. are adjusted to respective suitable values.

It is to be noted that the parameter adjustment method of the equations (50), (51) is one example, and parameters such that the conditions of the equation (46), (48) are satisfied may be searched by using other non-linear optimizing calculation method.

The example whether the model predictive control apparatus of this invention is applied to a distilling column temperature control system of a petroleum chemical process will now be described.

Figure 24:
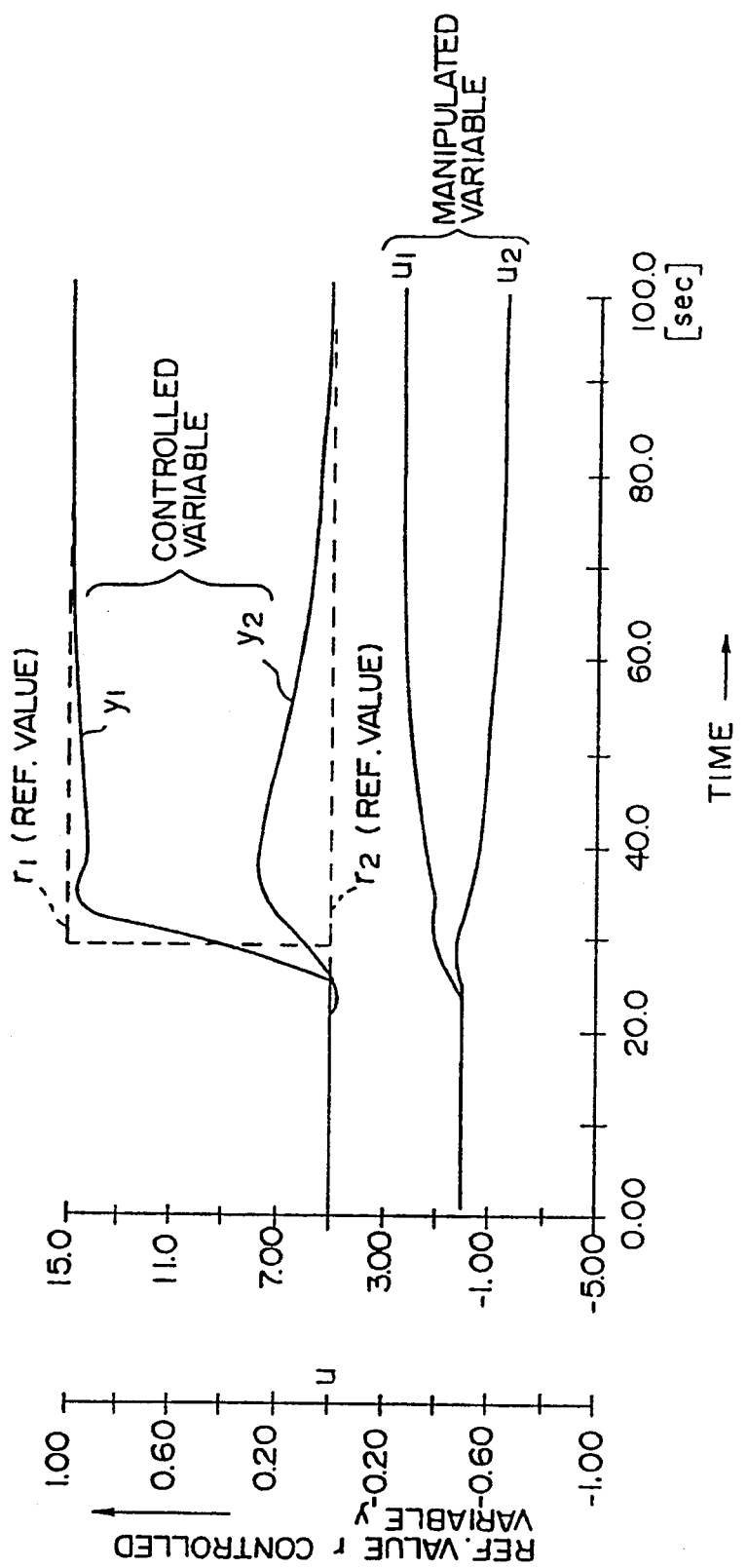
FIG. 24 is a diagram showing a temperature control response characteristic of a distilling column by a conventional model predictive control.

As the characteristic of the distilling column temperature system shown in FIG. 24, a transfer function as descried below was measured. Here, manipulated variables u1, u2 are a return current adjustment valve opening and a steam flow rate adjustment valve opening, and controlled variables y1 and y2 are respectively a column top temperature difference and a column bottom temperature.

$$\begin{pmatrix} y1 \\ y2 \end{pmatrix} = \begin{pmatrix} \frac{1}{(1+4s)(1+6s)} & \frac{0.5}{(1+8s)(1+10s)} \\ \frac{1}{(1+3s)(1+8s)} & \frac{0.3}{(1+6s)(1+10s)} \end{pmatrix} \begin{pmatrix} u1 \\ u2 \end{pmatrix}$$

Figure 25:
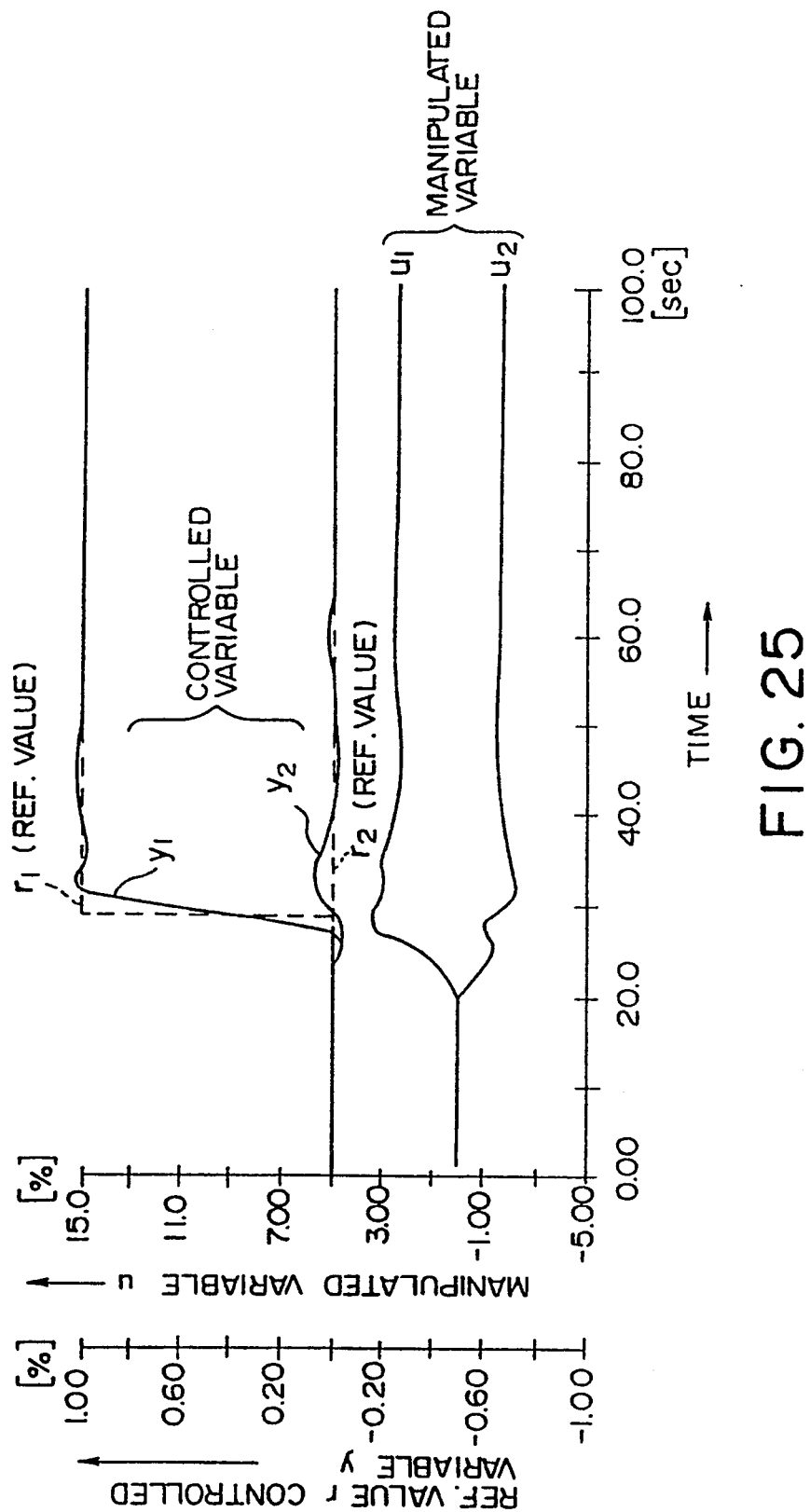
FIG. 25 is a diagram showing a temperature control response characteristic of a distilling column by a model predictive control according to this invention.
Figure 26:
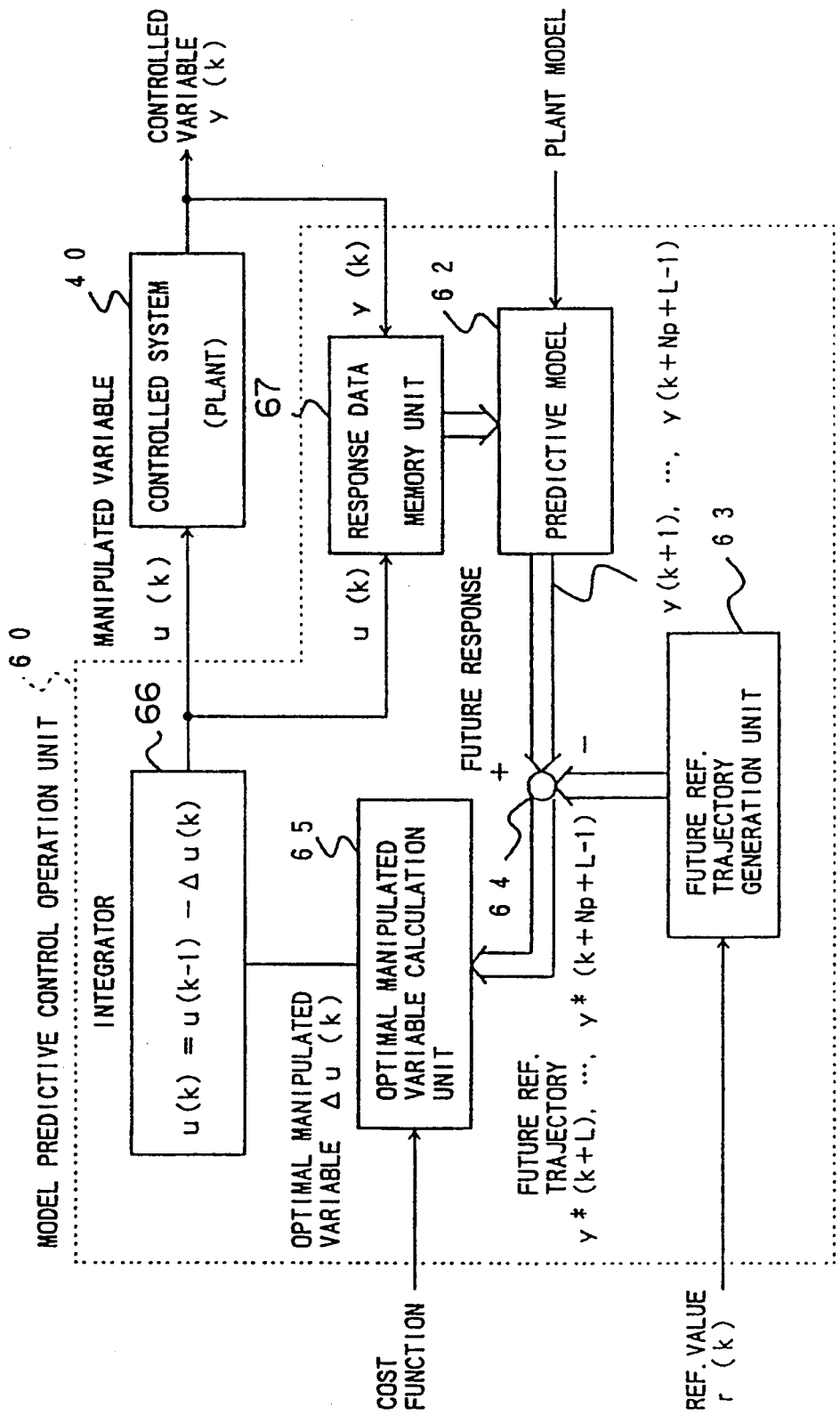
FIG. 26 is a diagram showing the configuration of a conventional model predictive control apparatus.

Cost function parameters are adjusted by this model predictive control apparatus with respect to the pulse transfer function obtained by allowing the transfer function to be discrete by the sampling period of 2 seconds to measure a control response with respect to alteration in the temperature set value. Responses of the control system before and after adjustment are shown in FIGS. 25 and 26, respectively.

Before adjustment, cost function parameters are expressed as follows.

L=1, Np=10, Nu=5

$\lambda=1$, $D(Z^{-1})=1-0.1\ Z^{-1}$

The settling of response with respect to a reference value step change of the controlled variable y1 (column top temperature of the distilation column) is slow because offset remains some time. On the contrary, as the result of the fact that the cost function parameter adjustment means 303 is operated to adjust parameters, cost function parameters are as follows:

L=1, Np=10, Nu=5

$\lambda=0.05$, $D(Z^{-1})=1$

The settling time of the response with respect to a reference value step change of the adjusted controlled variable y1 (column top temperature of the distilation column) is fast, and the influence of interference between controlled variables y1 and y2 is sufficiently reduced. As a result, a multi-variable model predictive control system excellent in quick-response property and incoherence was realized while keeping a sufficient stability.

As described above, in the model predictive control apparatus of this invention, in place of a conventional method of empirically setting cost function parameters, cost function parameter adjustment means is provided to execute a fixed algorithm in which robustness is taken into consideration to find out suitable cost function parameters to thereby adjust the cost function parameter to suitable values. Accordingly, the control apparatus can be quickly started. Further, since adjustment is made so as to satisfy a stability margin condition designated in advance, a robust model predictive control system having sufficient stability at all times and difficult to be affected by a change in the characteristic of the plant is provided. In addition, a model predictive control apparatus applicable to a multi-input/output plant having both a plurality of manipulated variables and a plurality of variables is provided.

An embodiment capable of adjusting a response time constant of this invention will now be described.

An example of the configuration of a typical model predictive control system will be described with reference to FIG. 26. When a manipulated variable u(k) is given from a model predictive control operation unit 60 to a process or robot, etc. serving as a controlled system 1 at a time k, a controlled variable y(k) is outputted from the controlled system 40. The controlled variable y(k) and the manipulated variable u(k) are written into a response data memory unit 61. A predictive model 62 calculates predictive values y(k+L), . . . , y(k+Np+L−1) of the future controlled variable response by making reference to a dynamic characteristic model selected in advance on the basis of fixed storage data of the manipulated variable u and the controlled variable y from the past to the present (time k) of the response data memory unit 61 to deliver it to one input terminal of a subtracted 64. Here, L and Np represent a prediction starting time and a prediction horizon, respectively.

On the other hand, a reference value r(k) inputted from a terminal equipment (not shown) is given to a future reference trajectory generation unit 63. The future reference trajectory generation unit 63 generates future reference trajectories y*(k+L), . . . , y*(k+Np+L−1) to deliver it to the other input terminal of the subtracted 64. The subtracted 64 calculates a future control error signal y(k+i)−y*(k+i) (i=L, . . . , Np+L−1) which is a difference between both signals to deliver it to an optimal manipulated variable calculation unit 65. At the optimal manipulated variable calculation unit 65, the previously described cost function in a quadratic form is set in advance as a representative example. This optimal manipulated variable calculation unit 65 calculates an increment $\Delta u(k)$ in the optimal manipulated variable to minimize J to deliver only u(k) to an integrator 66.

$$J = \sum_{i=L}^{N_p+L-1} \{D(z^{-1})(y(k+i) - y^*(k+i))\}^2 + \tag{53}$$

-continued $$\lambda \sum_{i=1}^{Nu} (\Delta u(k + i - 1))^2$$

In the above equation, Nu is a control horizon and is a weighting factor. $D(Z^{-1})$ represents a pole assignment polynomial and $D(Z^{-1})$ is expressed as $D(Z^{-1})=1+d_1Z^{-1}+ \ldots +d_nZ^{-n}$. $\Delta u(k+i)$ is an increment of a future manipulated variable, and is calculated as $\Delta u(k+i)=u(k+i)-u(k+i-1)$.

At the integrator 66, an operation processing described below.

$$u(k)=u(k-1)+\Delta u(k) \quad (54)$$

is carried out to calculate an actual manipulated variable u(k) including a predictive control component delivered to the controlled system 1 to deliver it to the controlled system 40.

As previously described, in such model control system, it is necessary to suitably adjust cost function parameters, and one means for solution was also described above.

However, in the previously described model predictive control apparatus, it was not taken into consideration to set the response characteristic, e.g., overshoot quantity, time constant and settling time, etc. so that it becomes an ideal response.

It is not disclosed that, for example, in the case where a response within a time constant Tr [sec] is required for the control system, what cost function is actually set results in providing a desired control system. Further, it was difficult to cope with designation of the response characteristic of the control system. Explanation will be given as one example thereof on the assumption that a transfer function model G(s) of the following equation where an oscillatory property is extremely strong is the characteristic of a controlled system.

$$G(s) = \frac{1}{Is} + \frac{\omega^2\phi^2}{\omega^2 + 2\zeta\omega s + s^2} \quad (55)$$

Figure 27:
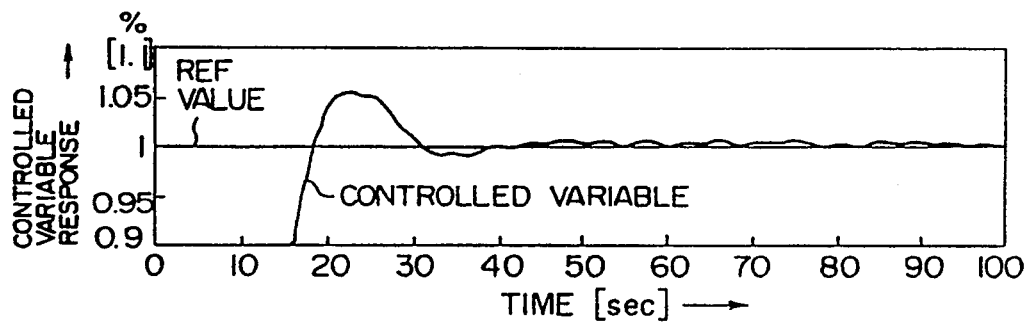
FIG. 27 is a graph showing a control response characteristic example by a conventional model predictive control apparatus.
Figure 28:
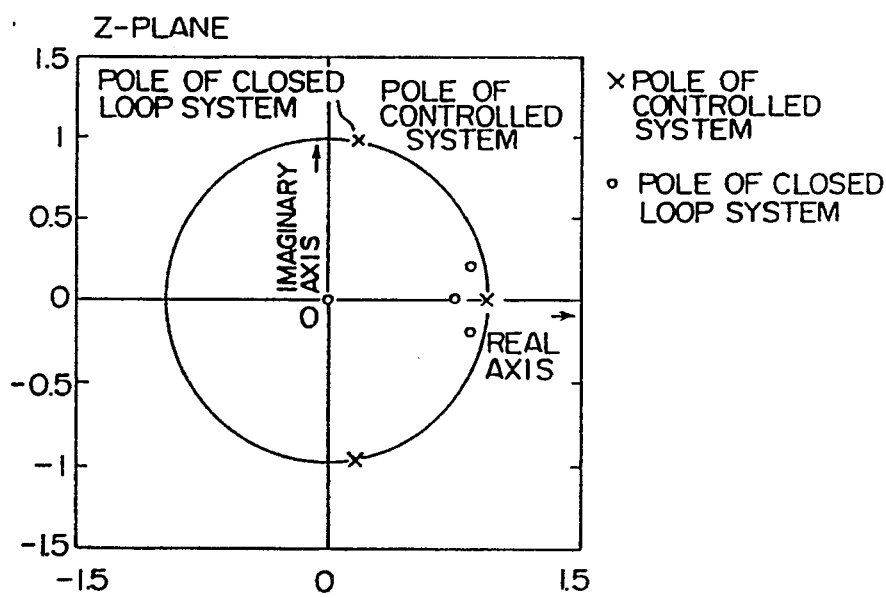
FIG. 28 is a graph showing a closed loop pole assignment of the control system in the example of FIG. 26.

In the above equation, a mechanical system is assumed wherein parameters mentioned below are used. For example, Inertia moment I= 16360 [Kg.cm2],
Attenuation factor $\xi=0.0025$
Resonance frequency 107 $=0.2205\times 2\pi$ [rad/sec], and
Torque admittance $101^2 = 7.49 \times 10_{-5}$ The control response by the model predictive control in the case where the control period of 1.0 [sec] and parameters of Np=10, L=1 and Nu=5 of the equation (1) are given to the above transfer function is shown in FIG. 27. Looking at this figure, it can be confirmed that while the controlled variable y follows the reference value r, fine oscillations appear on the control response. On the complex plane of FIG. 28, pole (mark x) of the controlled object of the control system and poles (mark o) of the control system are shown. Looking at this figure, it can be confirmed that poles close to a unit circle corresponding to the oscillatory mode of the controlled system, i.e., poles where stability is extremely bad remain also at the pole assignment of the closed loop.

An embodiment of a model predictive control apparatus of this invention will now be described with reference to FIG. 29. A model predictive control operation unit 402 includes the entirety of the function of the conventional model predictive control operation unit 60, and further includes open-loop frequency response characteristic calculation means 410, complementary sensitivity matrix calculation means 411, and stability margin parameter calculation means 412, etc. The open-loop frequency response characteristic calculation means 410, the complementary sensitivity matrix calculation means 411, and the stability margin parameter calculation means 412, etc. corresponds to the operation or arithmetic means. The model predictive control operation unit 402 provides feedback of a controlled variable y(k) observed from the process of the controlled system 401, and takes thereinto a reference value r(k) at the same time to calculate an optimal manipulated variable u(k) on the basis of the predictive model and the cost function to deliver it to the controlled system 401.

In this embodiment, in order to ensure generality in the model predictive control, the controlled system 401 is assumed to be a multi-input/output process having a q number of manipulated variables $u_1(k) \sim u_q(k)$ and a p number of controlled variables $y_1(k) \sim y_p(k)$ Namely manipulated variables $u_1 \sim u_q$ for allowing controlled variables $y_1 \sim y_p$ of the process to follow future reference orbits $y^*_1 \sim y^*_p$ generated from controlled reference variables $r_1 \sim r_p$ are sequentially outputted. In this model predictive control apparatus, dynamic characteristic model setting means 403 adapted for setting a dynamic characteristic model of a controlled system for predicting controlled variables and cost function setting means 404 for setting an cost function which means a control object are provided.

When an operator inputs a response time constant Tr from the terminal equipment 409, the response time constant Tr is held in a form suitable for the response time constant setting means 405. The weighting factor parameter calculation means 406 calculates a weighting factor parameter $\rho$ corresponding to the time constant Tr thus held to deliver it to the cost function setting means 404. The cost function setting means 404 constructs an cost function to which the weighting factor parameter $\rho$ is coupled to set it at an optimal manipulated variable calculation unit designated at 65 in FIG. 26 of the model predictive control operation unit 402. Operation means comprised of calculation means 410–412 calculates a stability margin parameter $\epsilon$ of the model predictive control system based on a new cost function. The stability margin parameter $\epsilon$ is delivered to one input terminal of the response time constant adjustment means 408 and the memory unit 413. The calculated stability margin parameter $\epsilon$ of the control system is read out from the memory unit 413 onto a display (not shown) of the terminal equipment 409. As a result, the stability margin parameter $\epsilon$ corresponding to the time constant Tr that an operator has inputted from the terminal equipment 409 is displayed. If the terminal equipment 409 gives a series of response time constants Tr to the response time constant setting means 405, a series of stability margin parameters corresponding thereto are stored or accumulated. Thus, mutual relation between the response time constant Tr and the stability margin parameter $\epsilon$ is determined.

On the other hand, when an operator inputs a stability margin parameter $\epsilon_0$ through the terminal equipment 409, this stability margin parameter $\epsilon_0$ is held at the stability parameter setting means. When the stability margin parameter $\epsilon_0$ is set at the stability parameter setting means 407, the response time constant adjustment means 408 sets the response time constant of the response time constant setting means to an initial value $Tr_0$ to gradually change it. As a result, the value $\rho$ of the weighting parameter calculated in the weighting factor parameter calculation means 406 changes, and the cost function given to the model predictive control operation unit 402 by the cost function setting means 404 also changes. In correspondence therewith, the value of the stability margin parameter delivered from the stability margin parameter calculation means also changes. The response time constant adjustment means 408 changes the response time constant Tr until the set stability margin parameter $\epsilon_0$ becomes in correspondence with the calculated stability margin parameter $\epsilon$. When the set stability margin parameter $\epsilon_0$ becomes equal to the calculated stability margin parameter $\epsilon$, the value of the response time constant Tr of the response time constant setting means is fixed. These constants are given to the terminal equipment 409 through the memory unit 413, and are displayed in a suitable form thereat.

Functions of respective means will now be described. The dynamic characteristic model with respect to the multi-input/output process set at the model predictive control operation unit 402 is given by a pulse transfer function matrix of the following equation from the dynamic characteristic model setting means 403.

$$\begin{pmatrix} y_1(k) \\ \vdots \\ y_p(k) \end{pmatrix} = \begin{pmatrix} B_{11}(z^{-1})/A_{11}(z^{-1}) & \cdots & B_{1q}(z^{-1})/A_{1q}(z^{-1}) \\ \vdots & & \vdots \\ B_{p1}(z^{-1})/A_{11}(z^{-1}) & \cdots & B_{pq}(z^{-1})/A_{pq}(z^{-1}) \end{pmatrix} \begin{pmatrix} u_1(k-1) \\ \vdots \\ u_q(k-1) \end{pmatrix} \quad (56)$$

where $A_{ij}(Z^{-1})$ and $B_{ij}(Z^{-1})$ are expressed as follows:
$$A_{ij}(z^{-1}) = 1 + a_1^{ij} z^{-1} + \ldots + a_n^{ij} z^{-n}$$

$$B_{ij}(z^{-1}) = b_0^{ij} + b_1^{ij} z^{-1} + \ldots + b_m^{ij} z^{-m}$$

In the above equation, p and q respectively represent the number of controlled variables and the number of manipulated variables, and the relationship of $p \neq q$ may hold.

It is now assumed that an cost function of the following equation is given from the cost function setting means 404.

$$J = \sum_{j=L}^{N_p+L-1} \sum_{i=1}^{p} \{\rho^{-2j} D(z^{-1}) O_i^{(k+j)} - y_i^*(k+j))\}^2 + \lambda \sum_{j=1}^{N_u} \sum_{i=1}^{q} \rho^{-2j+2} (\Delta u_i(k+j-1))^2 \quad (57)$$

In the above equation, $\Delta u_i(k) = u_i(k) - u_i(k-1)$ is an increment in the manipulated variable. Further, among parameters in the equation (57), the prediction horizon L is assumed to be equal to 1, and Np control horizon Nu, and weighting factor $\lambda$ are selected by, e.g., the previously described method in which stability of the control system is taken into consideration. Thus, the control system is caused to have sufficient stability.

Further, the pole assignment polynomial $D(Z^{-1})$ is assumed to be equal to 1 for brevity of explanation. In addition, while these parameters L, Np, Nu and $\lambda$ can be changed every respective manipulated variables $u_1 \sim u_q$ and respective controlled variables $y_1 \sim y_p$, the example where they are not distinguished is shown in this embodiment.

The reason why the response characteristic in the model predictive control can be improved by altering the conventional cost function (53) equation to the equation (57) according to the invention of this invention will now be described.

First, the cost function in a quadratic form of the equation (57) is in correspondence with the special case of the cost function of an optimal regulator well known in the control theory if the prediction horizon Np which is a time to be taken into consideration in prediction is selected so that it becomes a long value of infinity.

Generally, in the optimal regulator theory, with respect to a controlled system represented by the following state space model:

$$x(k+1) = Ax(k) + Bu(k) \quad (58a)$$

$$y(k) = Cx(k) \quad (58b)$$

where x is a state variable, y is a controlled variable, u is a manipulated variable, and A, B and C are constants of the matrix, a control rule (k) to minimize an cost function (J) can be given $$J = \sum_{i=1}^{\infty} \{x(k+i)^T Q x(k+i) + u(k+i-1)^T R u(k+i-1)\} \quad (59)$$

$$u(k) = k^T \cdot x(k) \quad (60)$$

where T represents a transposed matrix.

The characteristic of the control system at this time is given below by carrying out substitution of the equation (60) into the equations (58a) (58b);

$$x(k+1) = (A + Bk^T) x(k) \quad (61)$$

Namely, all modes of the closed loop system is attenuated from an initial state to zero at an attenuation factor determined by an eigen value of the matrix $(A + Bk^T)$. Accordingly, an eigen value closest to a unit circle becomes a dominant mode, and corresponds to the response time constant of the control system.

Let now suppose a new state $x^*(k+i)$, an input $u^*$, and an output $y^*(K+i)$ obtained by carrying out transformation expressed below by using a weighting factor parameter $$\rho = \exp(-\Delta/Tr) \quad (0 < \rho \leq 1)$$

$$x(k+i) = \rho^{-i} x^*(k+i) \quad (62a)$$

$$u(k+i) = \rho^{-i} u^*(k+i) \quad (62b)$$

$$y(k+i) = \rho^{-i} y^*(k+i) \quad (62c)$$

when substitution of theses into the equations (58a, 58b), (59), (60) and (61) is made, the state spatial model is expressed below:

$$x^*(k+1) = A' x^*(k) + B' u^*(k) \quad (58a')$$

$$y^*(k) = Cx^*(k) \tag{58a'}$$

Where $A' = \rho A$, $B' = \rho B$
the cost function is expressed below:

$$J = \sum_{i=1}^{\infty} \{\rho^{-2i}x^*(k+i)^T Q x^*(k+i) + \rho^{-2i+2} u^*(k+i-1)^T R u^*(k+i-1)\} \tag{59'}$$

the control rule is expressed below $$u^*(k) = k^T \cdot x^*(k) \tag{60'}$$

the characteristic of the control system is expressed below:

$$x^*(k+1) = \rho(A + Bk^T)x^*(k) \tag{61'}$$

Namely, in the case where a controlled object is originally given by the equations (58a')(58b'), when the cost function equation (59) is set to design an optimal regulator to use a control rule of the obtained equation (60), the pole assignment of the closed loop system becomes an eigen value of the matrix $(A + Bk^T)$ of the equation (61').

Here, the control rule of the equation (60') is the same as the control rule of the optimal regulator designed with respect to the cost function equation (59) for the controlled system of the virtual equations (58a), (58b). Since the virtual control system by the equation (61) necessarily becomes stable by the property of the optimal regulator, all eigen values of the matrix $(A + Bk^T)$ fall within a unit circle of the complex plane.

Figure 30:
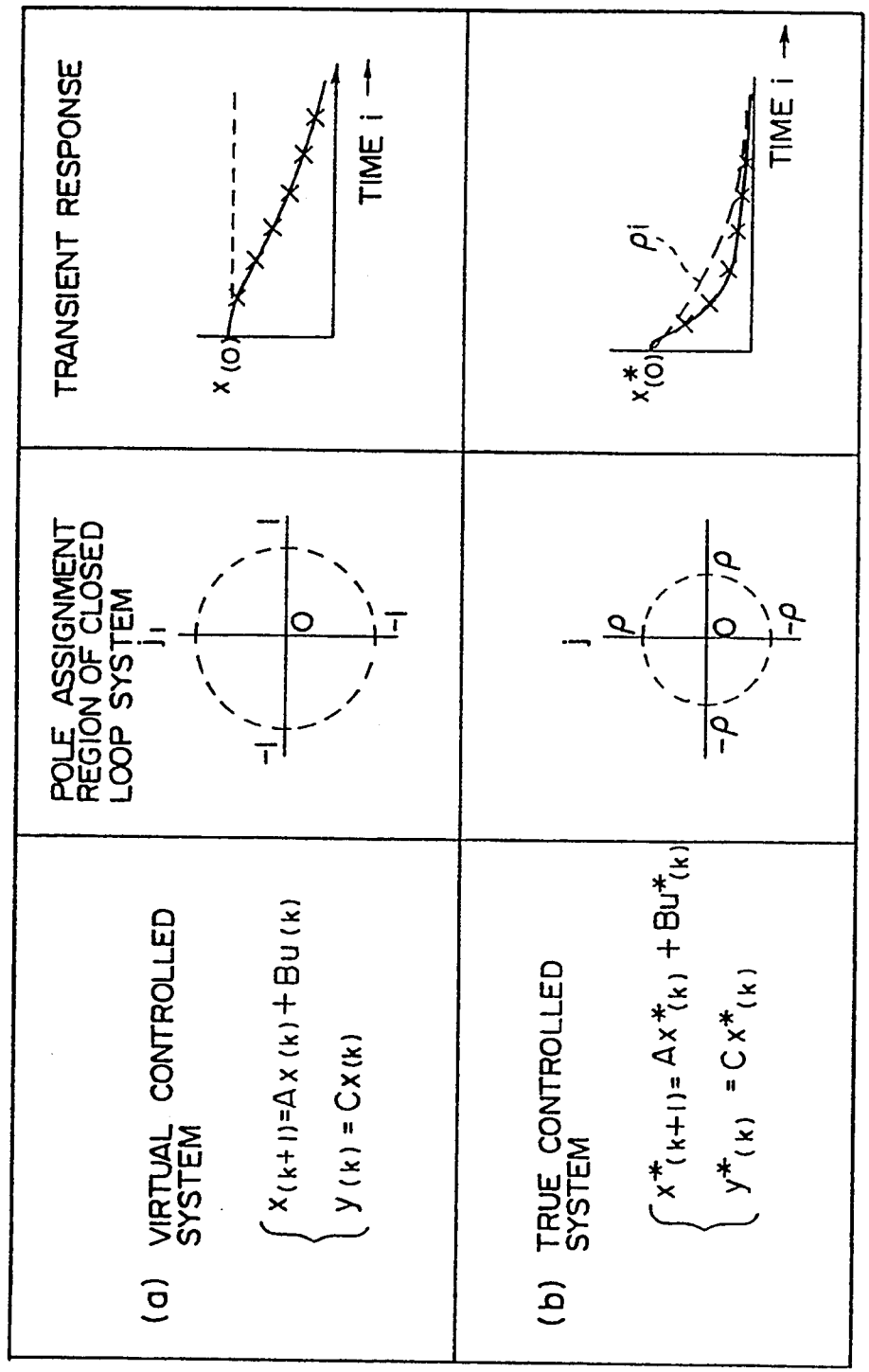
FIG. 30 is a diagram for explaining a closed loop pole assignment by weighting of an cost function and an improvement in a control response.

Accordingly, the center of all eigen values of the matrix $\rho(A + Bk^T)$ of the equation (61') falls within a circle having the origin at its center and a radius $\rho$. This means that all modes in the control system of the equation (61') are attenuated at an attenuation factor more than $\rho^i$ (i is a discrete time), so the response of the control system becomes faster than the time constant Tr. Accordingly, it is guaranteed that the response time constant of the control system by the optimal regulator using the cost function of the equation (59') becomes equal to a value less than Tr. This relationship is shown in FIG. 30.

This property or characteristic holds even in the case where the cost function has a finite time length. If substitution of $Q = C^T C$ and $R = \lambda I$ (I is a unit matrix) in the cost function of the equation (59'), and a section to be considered is set to $i = L \sim Np + L - 1$ in place of $i = 1 \sim \infty$, this cost function becomes in correspondence with the evaluation of the equation (57). Accordingly, when such a control to minimize the cost function of the equation (57), the control response time constant approximately becomes equal to a value less than Tr.

In the case where the controlled object is not of the multi-input/out type, the equation (57) is simplified as follows.

$$J = \sum_{i=L}^{N_p+L-1} \rho^{-2i}\{D(z^{-1})(y(k+i) - y^*(k+i))\}^2 + \lambda \sum_{i=1}^{Nu} \rho^{-2i+2}(\Delta u(k+i-1))^2 \tag{57'}$$

The optimal nanipulated variable to minimize the equation (57) calculated by the model predictive control operation unit 402 will be determined by the following calculation.

First, denominator is reduced in the row with respect to the first to the p-th row in the matrix on the right side of the equation (56). For example, with respect to the i-th row, reduction is carried out as follows.

$$B_{i1}(z^{-1})/A_{i1}(z^{-1}) \ldots B_{iq}(z^{-1})/A_{iq}(z^{-1})$$
$$\downarrow$$
$$B_{i1}'(z^{-1})/A_{i1}(z^{-1}) \ldots B_{iq}'(z^{-1})/A_{iq}(z^{-1})$$

As a result, the equation (56) is deformed in a form described below.

$$\begin{pmatrix} A_1(z^{-1}) & & 0 \\ & \cdot & \\ & & \cdot \\ 0 & & A_p(z^{-1}) \end{pmatrix} \begin{pmatrix} y_1(k) \\ \cdot \\ \cdot \\ y_p(k) \end{pmatrix} =$$

$$\begin{pmatrix} B_{11}'(z^{-1})/A_{11}(z^{-1}) & \ldots & B_{1q}'(z^{-1})/A_{1q}(z^{-1}) \\ \cdot & & \cdot \\ \cdot & & \cdot \\ B_{p1}'(z^{-1})/A_{11}(z^{-1}) & \ldots & B_{pq}'(z^{-1})/A_{pq}(z^{-1}) \end{pmatrix} \begin{pmatrix} u_1(k-1) \\ \cdot \\ \cdot \\ u_q(k-1) \end{pmatrix}$$

It is now assumed that the order of $A_i(Z^{-1})$ is the order of ni, and nmax is expressed as max$\{n_i\}$. The following equation is solved with respect to respective rows (i = 1~p) and j = 1~Np.

$$D(z^{-1}) = E_{ji}(z^{-1})(1-z^{-1})A_i(z^{-1}) + z^{-j}F_{ji}(z^{-1}) \tag{64}$$

Thus, the following polynomials are determined as follows:

$$E_{ji}(z^{-1}) = 1 + e_1^{ji}z^{-1} + \ldots + e_{j-1}^{ji}z^{-j+1} \text{ ((j-1)th order monic polynominal)} \tag{65a}$$

$$F_{ji}(z^{-1}) = f_0^{ji} + f_1^{ji}z^{-1} + \ldots + f_n^{ji}z^{-nmax} \text{ (nmax-th order)} \tag{65b}$$

As a result, a predictive value of controlled variables $y_1 \sim y_p$ i steps hence is given as follows:

$$\begin{pmatrix} D(z^{-1})y_1(k+j) \\ \cdot \\ \cdot \\ D(z^{-1})y_p(k+j) \end{pmatrix} = G_{j-1} \begin{pmatrix} \Delta u_1(k+j-1) \\ \cdot \\ \cdot \\ \Delta u_q(k+j-1) \end{pmatrix} + \ldots + \tag{66}$$

$$G0 \begin{pmatrix} \Delta u_1(k) \\ \cdot \\ \cdot \\ \Delta u_q(k) \end{pmatrix} + \begin{pmatrix} F_{j1}(z^{-1}) & & 0 \\ & \cdot & \\ & & \cdot \\ 0 & & F_{jp}(z^{-1}) \end{pmatrix} \begin{pmatrix} y_1(k) \\ \cdot \\ \cdot \\ y_p(k) \end{pmatrix} +$$

-continued $$H_j(z^{-1}) \begin{pmatrix} \Delta u_1(k-1) \\ \vdots \\ \Delta u_q(k-1) \end{pmatrix}$$

In the above equation, $G_{j-1}$, $G_0$ are a constant matrix of $p \times q$, and $H_j(Z^{-1})$ is a polynominal matrix of $p \times q$ relating to $Z^{-1}$, and are determined by the following relational equation.

$$\begin{pmatrix} E_{j1}(z^{-1}) & & 0 \\ & \ddots & \\ 0 & & E_{jp}(z^{-1}) \end{pmatrix} \begin{pmatrix} B_{11}(z^{-1}) & \cdots & B_{1q}(z^{-1}) \\ \vdots & & \vdots \\ B_{p1}(z^{-1}) & \cdots & B_{pq}(z^{-1}) \end{pmatrix} = \tag{67}$$

$$G_{j-1} + \ldots + G_0 z^{-j+1} + z^{-1} H_j(z^{-1})$$

In the above equation, $G_0 \ldots G_{j-1}$ correspond to a step response matrix of the controlled system of the equation (56).

Assumption will now be made such that the equation (66) is represented in a simple form by the following equation.

$$D(z^{-1})y(k+j) = G_{j-q}\Delta u(k+j-1) + \ldots + G_0\Delta u(k) + F_j(z^{-1})y(k) + H_j(z^{-1})\Delta u(k-1) \tag{68}$$

When this is collectively represented with respect to $i = 1 \sim Np$, the following relationship is given.

$$\begin{pmatrix} D(z^{-1})y(k+1) \\ \vdots \\ D(z^{-1})y(k+Np) \end{pmatrix} = \tag{69}$$

$$\begin{pmatrix} G_0 & 0 & \cdots & 0 \\ G_1 & G_0 & 0 & \cdots & 0 \\ \vdots & & & 0 \\ G_{No-1} & & \cdots & G_0 \\ \vdots & & & \vdots \\ G_{Np-1} & & \cdots & G_{Np-No} \end{pmatrix} \begin{pmatrix} \Delta u(k) \\ \vdots \\ \Delta u(k+Nu-1) \end{pmatrix} +$$

$$\begin{pmatrix} F_1(z^{-1}) \\ \vdots \\ F_{Np}(z^{-1}) \end{pmatrix} y(k) + \begin{pmatrix} H_1(z^{-1}) \\ \vdots \\ H_{Np}(z^{-1}) \end{pmatrix} \Delta u(k-1)$$

When this is further collectively represented, the following representation is given.

$$D(z^{-1})y = G\Delta u + F(z^{-1})y(k) + H(z^{-1})\Delta u(k-1) \tag{70}$$

At this time, the cost function of the equation (57) can be expressed as follows.

$$J = (D(z^{-1})y - D(z^{-1})y^*)^T Q^T Q(D(z^{-1})y - D(z^{-1})y^*) + \lambda u^T R^T R \Delta u \tag{71}$$

In the above equation, Q, R are a weighting factor matrix, and are given below with respect to the weighting factor parameter $\rho$.

$$Q = \begin{pmatrix} \rho I & & & 0 \\ & \rho^2 I & & \\ & & \rho^3 I & \\ & & & \ddots \\ 0 & & & & \rho^{Np} I \end{pmatrix} \tag{72}$$

$$R = \begin{pmatrix} I & & & 0 \\ & \rho I & & \\ & & \rho^2 I & \\ & & & \ddots \\ 0 & & & & \rho^{No-1} I \end{pmatrix}$$

In this equation, I in Q, R is a unit matrix of $p \times p$ and a matrix of $q \times q$, respectively. By allowing respective variables to be different variables every element in place of using I, individual weights may be applied to respective controlled variables and manipulated variables.

Further, a reference value of the controlled variable $y_i$ is expressed as follows.

$$y^* = \begin{pmatrix} y^*(k+1) \\ \vdots \\ y^*(k+Np) \end{pmatrix} \quad y^*(k+j) = \begin{pmatrix} y^*_1(k+j) \\ \vdots \\ y^*_p(k+j) \end{pmatrix} \tag{73}$$

$y^*_i(k+j)$ is a reference value j steps later with respect to the i-th controlled variable $y_i$.

At this time, an optimal manipulated variable to minimize the cost function of the equation (57) (or the equation (57')) is given as follows.

$$\Delta u = (G^T Q^T Q G + \lambda R^T R)^{-1} G^T Q^T Q \times \{D(z^{-1})y^* - F(z^{-1})y(k) - H(z^{-1})\Delta u(k-1)\} \tag{74}$$

An actual manipulated variable is calculated by taking out the first element q of the vector $\Delta u$ $$\Delta u(k+1) = G_{q^*}\{D(z^{-1})y^* - F(z^{-1})y(k) - H(z^{-1})\Delta u(k-1)\} \tag{75}$$

($G_{q^*}$ is a matrix of $q \times (p \times Np)$ obtained by taking out q rows from the top of $(G^T Q^T Q G + \lambda R^T R)^{-1} G^T Q T^T Q$) to calculate the value described below.

$$u(k) = u(k-1) + \Delta u(k) \tag{76}$$

In this way, the model predictive control operation unit 402 carries out calculation of the optimal manipulated variable u(k) under a given condition.

The operation of means supplemented by this invention will now be described with reference to the flowchart of FIG. 31. Respective means are realized on software, etc. of a computer in a practical sense.

First, when an operator inputs a response time constant Tr [sec] from the terminal equipment 409, this response time constant Tr is held by the response time constant setting means 405. The response time constant setting means 405 sends the response time constant Tr

[sec] to weighting factor parameter calculation means 406 (step S401). The weighting factor parameter calculation means 406 reads thereinto the given response time constant Tr sec to determine a weighting factor parameter by the following equation $$\rho = \exp(-\Delta/Tr) \tag{77}$$

($\Delta$[sec] is control period)
to deliver it to the cost function setting means 404. The cost function setting means 404 constructs an cost function represented by the equation (57) by using the weighting factor parameter $\rho$ to deliver it to the model predictive control operation unit 402 (step S402). The model predictive control operation unit 402 calculates a control equation (75) of the model predictive control system by operational processing represented by the equations (57), (63) (75) (step S403).

In the model predictive control operation unit 402, open-loop response frequency characteristic calculation means 410, complementary sensitivity matrix calculation means 411, and stability margin parameter calculation means 412 are newly formed. The open-loop frequency response characteristic calculation means 410 determines, by the following equation, an open-loop frequency response matrix L (j$\omega$) of the closed loop system joined with the controlled object equation (56) by using the control equation (75) which was obtained in the above operation processing.

$$L(j\omega) = A(z^{-1})^{-1} B(z^{-1}) \Delta(z^{-1})^{-1} (I + G_q^* H(z^{-1}) \\ -{}^1 G_q^* F(z^{-1}))|_{z=e^{j\omega\tau}} \tag{78}$$

In the above equation, $A(Z^{-1})$ and $B(Z^{-1})$ represent matrices A and B respectively indicated at the left side and the right side of the equation (63). $\Delta(Z^{-1})$ is a diagonal matrix, and is expressed as $(Z^{-1}) = \text{diag}\{(1-Z^{-1}) \ldots (1-Z^{-1})\}$. I is a unit matrix, and $\tau$ is a control period.

Subsequently, a complementary sensitivity function matrix expressed below is determined by the complementary sensitivity matrix calculation means 11

$$T(j\omega) = (I + L(j\omega))^{-1} L(j\omega) \tag{79}$$

Then, a stability margin parameter expressed below is determined by the stability margin parameter calculation means 12.

$$\epsilon = \left[ \max_{\omega} \sigma \max \{T(j\omega)\} \right]^{-1} \tag{80}$$

In the above equation, $\sigma_{max}$ means a maximum singular value. As long as the stability margin parameter satisfies the following equation when the controlled system changes from G(s) to G(s) (1+$\alpha$(s)), stability of the closed loop system is kept.

$$\max_{\omega} \sigma \max \{\Delta(j\omega)\} < \epsilon \tag{81}$$

Accordingly, $\epsilon$ becomes a sort of criterion indicating stability margin (step S404). The stability margin parameter thus obtained is displayed on a display of the terminal equipment 409 through the memory means 413 (step S405) to hasten an operator for plant, etc. to make a judgment. In the case where the operator judges that stability margin to be good to input Yes from the input means such as a keyboard, etc. (step S406), setting at the cost function setting means 404 of the weighting factor parameter $\rho$ corresponding to the response time constant Tr inputted to the response time constant setting means 405 is established (step S407). In contrast, in the case where the operator judges that stability margin to be insufficient to input No (step S406), the operation returns to the step S401 to re-design a model predictive control system on the basis of a response time constant Tr newly inputted by the operator (steps S401–405).

Figure 32:
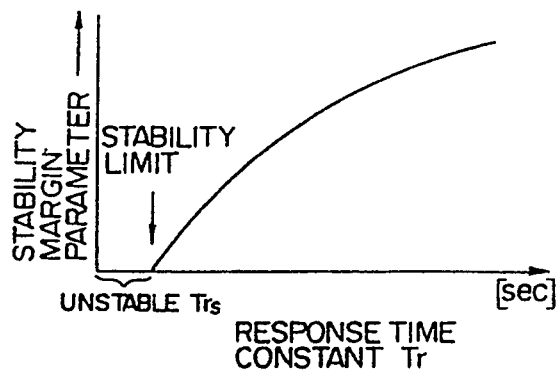
FIG. 32 is a graph showing the relationship between a response time constant Tr and a stability margin parameter $\epsilon$.

The terminal equipment 409 has a sort of simulation function. By this simulation function, a response time constant Tr given from the terminal equipment 409 to the response time constant setting means 405 is successively changed with respect to a certain range to provide a stability margin parameters corresponding to respective response time constants Tr. Namely, a certain value of the response time constant Tr and a stability margin parameter obtained by circulating through the weighting coefficient parameter calculation means 406, the cost function setting means 404, the model predictive control operation unit 402, the open-loop frequency response characteristic calculation means 410, the complementary sensitivity function matrix calculation means 411, and the stability margin parameter calculation means 412 are stored into the memory unit 413. The terminal equipment 409 displays, on the screen, the relationship between the response time constant Tr and the stability margin parameter $\epsilon$ stored in the memory unit 413 by a graph as shown in FIG. 32, for example. In FIG. 32, it is indicated that when the response time constant is more tan $Tr_S$, the control system is stable, and while when the response time constant is less than $Tr_S$, the control system becomes unstable. By visually indicating the relationship therebetween, it is advantageously expected to avoid in advance that the control system is brought into an unstable state resulting from the fact that an operator forcibly request a response speed higher than the response time constant $Tr_S$, thus to carry out a more suitable setting of the response time constant.

Figure 33:
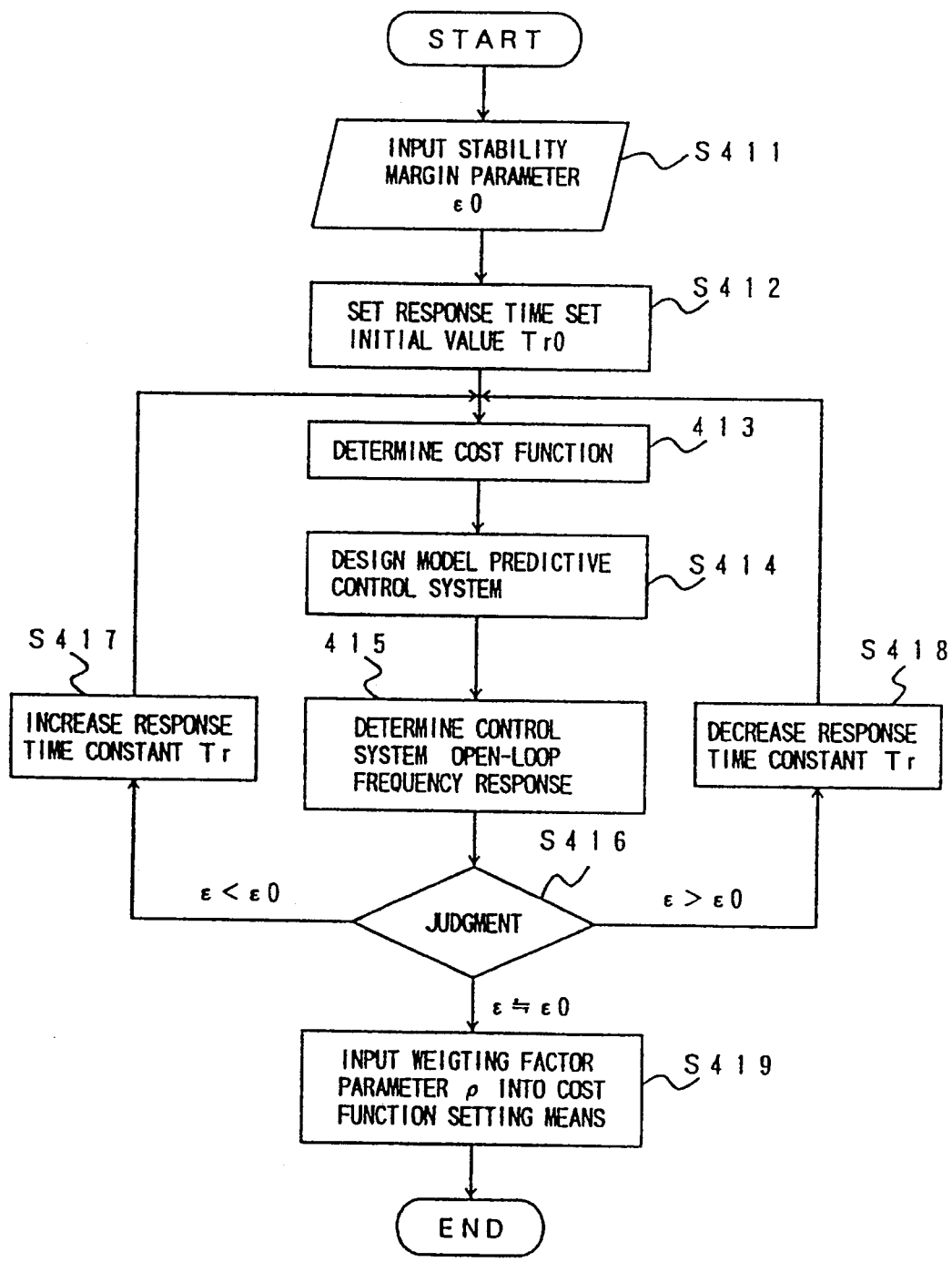
FIG. 33 is a flowchart for explaining a processing procedure in response time constant calculation means.

The operator can directly set the stability margin parameter $\epsilon_0$ at the stability margin parameter setting means 407 from the terminal equipment 409. In such a case, processing is carried out in accordance with the flowchart of FIG. 33.

First, when an operation inputs the stability margin parameter $\epsilon_0$ from the terminal equipment 409 (step S401), the inputted stability margin parameter $\epsilon_0$ is set at the stability margin parameter setting and input means 407. When the response time constant adjustment means 408 detects that a stability margin parameter of the first time is set at the stability margin parameter setting input means 407, it allows the response time constant setting means 5 to set an initial value $Tr_0$. A sufficiently large value is set as the initial value $Tr_0$ (step S412). This initial value $Tr_0$ is transformed to a weighting factor by the weighting factor parameter calculation means 406, and is delivered to the cost function setting means 404. The cost function setting means 404 forms a new cost function of the equation (57) (step S413). By making reference to the cost function of the equation (57), the model predictive control operation unit 402 calculates the control equation (75) of the model predictive control system by the operation processing indicated by the equations (57), (63)–(75) in a manner similar to that of the previously described step S413 (step S414). Further, the open-loop frequency response characteristic calculation means 410, the complementary sensitivity matrix calculation means 411, and the stability margin parameter calculation means 412 carry out an operation processing on the basis of the previously described equations (78), (79) and (80) to calculate a stability margin parameter $\epsilon$ (step S415). The calculated stability margin parameter $\epsilon$ is delivered to the response time constant adjustment means 408. The response time constant adjustment means 408 makes a comparison between the calculated $\epsilon$ and the designated $\epsilon_0$ (step S416).

The response time constant adjustment means 408 performs the following operation on the basis of a compared result:

(1) If $\epsilon < \epsilon_0$, the response time constant adjustment means 408 judges that the stability margin in the present state is small to allow the response time constant to be a slightly large value as indicated below Tr Tr×1.1 to return to the step S413 (step S417).

(ii) If $\epsilon > \epsilon_0$, the response time constant adjustment means 408 judges that the stability margin in the present circumstances is too great to allows the response time constant to be a slightly small value as indicated below Tr Tr/1.1 to return to the step S413 (step S418).

(iii) If 68 is substantially equal to $\epsilon_0$, the response time constant adjustment means 408 judges that the stability margin is satisfactory to display a response time constant Tr at that time as an optimal value onto the terminal equipment 409 through the memory unit 413, and to input, upon confirmation of an operator or automatically, a weighting factor parameter $\rho$ corresponding to the response time constant Tr to the cost function setting means 404 (step S419).

The cost function setting means 404 sets the cost function of the equation (57) at the model predictive control operation unit 402 by using the inputted weighting factor parameter $\rho$.

In this embodiment, the dynamic characteristic model setting means 403 sets the model of the equation (56) of a controlled system at the model predictive control operation unit 402. As a dynamic characteristic of a controlled system, there are the instance where a model is inputted from the terminal equipment 409 or an external storage unit (not shown), and the instance where a model estimated by the real time processing by using a time series analysis method such as a sequential least square method, etc. from the manipulated variable u(k) is used.

Figure 34:
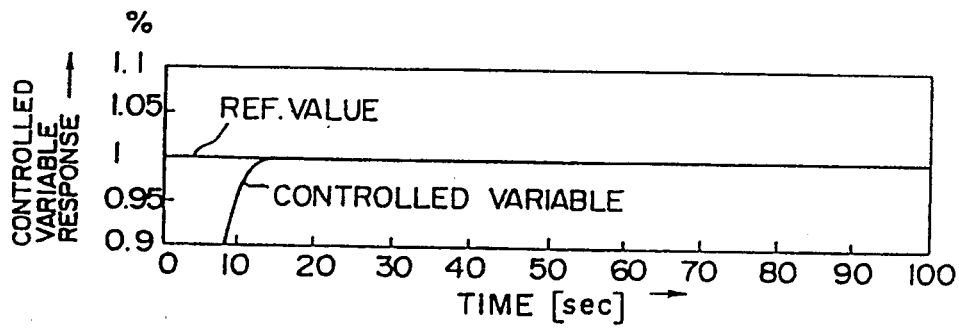
FIG. 34 is a graph showing a control response characteristic example by a model predictive control apparatus of this invention.
Figure 35:
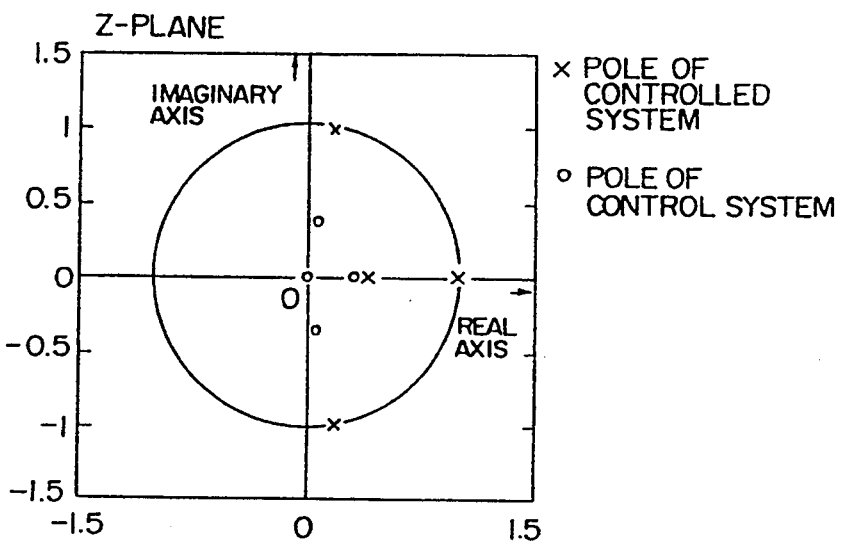
FIG. 35 is a graph showing a closed loop pole assignment of the control system in the example of FIG. 34.

A control response (reference follow-up response) when a model predictive control apparatus of this invention is applied to a controlled system represented by the transfer function of the equation (55) is shown in FIG. 34, and a pole assignment of the control system at that time is shown in FIG. 35.

The prediction horizon Np, the control horizon Nu, the weighting factor $\lambda$, and the control period, etc. in this case are the same as those of the previously described example. Looking at the control response of FIG. 34, it is seen that the response follows a reference value more rapidly than that of the control response by the conventional method shown in FIG. 27. Further, it is seen that, also with respect to the pole assignment (mark 0 in the figure) of the control system of FIG. 35, this polar assignment las a pole within a unit circle so that a sufficiently stability is held, while the pole assignment by the conventional method shown in FIG. 28 has a pole on the unit circle.

It is to be noted while the cost function of the equation (57) or the equation (57) corresponding thereto is used as the cost function in the embodiment of this invention, similar weighting coefficients of the exponential type may be set to cost functions except for the above form, thereby making it possible to approximately improve the response characteristic. By adding weighting factors of the exponential type to the cost function, a control is conducted such that the range where the controlled variable y(k) should be converged gradually become narrow with lapse of the predictive time. Thus, it is suppressed that the process where the controlled variable y(k) reaches a reference value becomes oscillatory.

By using a model predictive control system to sequentially calculate optimal manipulated variables to minimize the cost function while satisfying the limit condition by the use of the quadratic programming by taking into consideration the limit condition shown in the scope of claim 1 of this invention at the stage of calculating an optimal manipulated variable, this invention can be applied to a model predictive control in which the limit condition relating to the manipulated variable is taken into account.

Further, also in the case where the predictive model of the process is non-linear, the response characteristic can be improved by a model control system using the same cost function.

In addition, in the case of the multi-input/multi-output process, different response time constants $Tr_i$ may be set in respective control loops, thus making it possible to control them by individual response speeds. In this case, in place of the equation (77), a weighting factor parameter $\rho_i$ may be calculated or determined by the following equation $$\rho_i = \exp(-\Delta/Tr_i) \quad (\text{[sec] is control period}) \tag{77'}$$

to set the cost function as follows.

$$J = \sum_{j=L}^{Np+L-1} \sum_{i=1}^{p} \{\rho_i^{-2j} D(Z^{-1})(y_i(k+j) - y_i^*(k+j))\}^2 + \lambda \sum_{j=1}^{Nn} \sum_{i=1}^{q} \rho_i^{-2j+2}(\Delta u_i(k+j-1))^2 \tag{57'}$$

As described above, in the model predictive control apparatus of this invention, when a response time constant is inputted, a weighting factor of an exponential function corresponding to this time constant is determined, and this weighting coefficient is added to the cost function. Thus, the response time constant of the model predictive control system can be designated. Further, poles of the control system in a complex plane for discriminating stability can be assigned in a stable area thus to effectively improve the transient response characteristic, particularly attenuation factor. Further, since stability margin of the control system can be evaluated with respect to a designated response time constant, a suitable response time in which stability is taken into consideration can be set. In addition, if a stability margin is given as a control specification, there can be provided a configuration to automatically adjust the response time constant so that there results a control system to satisfy it. Accordingly, suitable stability and transient characteristic can be realized.

We claim:

1. A model predictive control apparatus comprising:
   prediction means in which a model approximating a dynamic characteristic of a controlled system having a plurality of manipulated variables and controlled variables is used to determine a predictive equation of future values of the controlled variables; and
   arithmetic means adapted to transform limit conditions of a control condition to manipulated variables, and to calculate a manipulated variable to minimize an cost function in a quadratic form relating to a difference between a future reference value and a control variable, and a manipulated variable, set on the basis of said predictive equation while satisfying said limit conditions, thus to give the determined manipulated variable to said controlled system.

2. A model predictive control apparatus as set forth in claim 1, which further comprises:
   an input device for respectively inputting limit conditions, parameters of the cost function, and controlled variable reference values relating to future values of controlled variables and manipulated variables of the controlled system,
   said arithmetic means comprising:
   cost function transformation means for transforming an cost function in a quadratic form having, as variables, a predictive controlled variable based on said predictive equation, a deviation from a reference value of said controlled variable future value, and a change in the manipulated variable (manipulated variable future value) to be given to said controlled system, thus to set an cost function with respect to a quadratic programming;
   limit condition transformation means for transforming a limit condition inputted from said input device on the basis of said predictive equation to set a limit condition with respect to a quadratic programming; and
   optimal manipulated variable calculation means for sequentially calculating, by using a quadratic programming, future values of manipulated variables to minimize the cost function set by said cost function transformation means and the limit condition set by said limit condition transformation means.

3. A model predictive control apparatus as set forth in claim 2,
   wherein said prediction means is adapted to determine a predictive equation indicating a future value of a controlled variable y by a past controlled variable y and a past manipulated variable change rate $\Delta u$,
   wherein said limit condition transformation means is such that upper and lower limit equations relating to a controlled variable y, its change rate $\Delta y$, a manipulated variable u, and its change rate $\Delta u$ are used as limit conditions to transform all these conditions to an inequality limit condition relating to $\Delta u$,
   wherein said cost function transformation means is adapted to transform the cost function to a function of $\Delta u$, and
   wherein said optimal manipulated variable calculation means is adapted to calculate an optimal manipulated variable change rate $\Delta u$ by using a quadratic programming.

4. A model predictive control apparatus as set forth in claim 2, wherein said arithmetic means further includes cost function adjustment means for adjusting an inputted cost function to give it to said cost function transformation means.

5. An input device for inputting control parameters of the model predictive control apparatus as set forth in claim 1,
   said input device comprising:
   screen display means for visually displaying various control information on the screen;
   future reference characteristic input means for inputting a new future reference value from the content displayed on said screen display means;
   limit condition input means for inputting a new limit condition corresponding to said reference characteristic from the content displayed on said screen display means;
   simulation arithmetic means in which said new future reference value and said new limit condition are used to repeatedly perform said model predictive control operation with respect to a dynamic characteristic model of the controlled system to calculate a predictive controlled variable response indicating a response characteristic of said predictive controlled variable;
   simulation display means for graphically displaying said new future reference value, said new limit condition, and said predictive controlled response on said screen display means; and
   setting means responsive to a setting command generated after graphic display to set said new future reference value and said new limit condition at said model predictive control apparatus.

6. An input device for a model predictive control apparatus as set forth in claim 5, wherein said future reference characteristic input means allows said screen display means to display thereon a plurality of transfer functions stored in advance to input, as a new future reference value, a response curve that an operator has selected.

7. An input device for a model predictive control apparatus as set forth in claim 5, wherein said future reference characteristic input means is adapted to calculate a curve passing through a plurality of coordinates designated by an operator on said screen to thereby input a new future reference value.

8. An input device for a model predictive control apparatus as set forth in claim 5, wherein said limit condition input means is adapted to allow said screen display means to display thereon a limit condition set in advance in correspondence with a plurality of transfer functions stored in advance and a transfer function that an operator has selected to input it as a new limit condition.

9. An input device for a model predictive control apparatus as set forth in claim 7, wherein said limit condition input means is adapted to calculate a reference curve passing through a plurality of coordinates designated by an operator to thereby input it as a new control condition.

10. An input device for a model predictive control apparatus as set forth in claim 8, wherein said limit condition input means is adapted to implement a predetermined operation to said new future reference value to thereby input it as a new control condition.

11. An input device for a model predictive control apparatus as set forth in claim 1,
said input device comprising:
cost function memory means for storing an cost function serving as an operation index of said process equipment with at least a difference between said predictive controlled variable and said future reference value and said manipulated variable being as a parameter;
screen display means for displaying said cost function on the screen;
cost function input means adapted to update said cost function by parameters of said cost function inputted through a picture on the screen to form a new cost function;
simulation arithmetic means for repeatedly performing said predictive control operation to calculate a group of values of said new cost function;
simulation display command means for allowing said screen display means to graphically display thereon the values of said new cost function; and
setting means responsive to a setting command generated after graphic display to set said new cost function at said model predictive control apparatus.

12. An input device for a model predictive control apparatus as set forth in claim 11, wherein a control cost function indicating control performance with respect to said process equipment is used as said cost function.

13. An input device for a model predictive control apparatus as set forth in claim 11, wherein an economical cost function indicating an operation cost of said process equipment is used as said cost function.

14. A model predictive control apparatus as set forth in claim 1, wherein said apparatus further comprises:
an input device for inputting control specification parameters;
reading means for reading said control specification parameters input through said input device;
calculating means for calculating optimal values of proposed parameters in a quadratic cost function, including a control horizon, weighting factors, and parameters of a pole assignment polynomial of a closed loop, on the basis of a model of controlled system and control specification parameters;
display means for visually displaying the parameters on a screen; and
transfer means for transferring the proposed parameters to said display means and said arithmetic means.

15. The model predictive control apparatus as set forth in claim 14, wherein said reading means receives a first robust performance parameter relating to a threshold value through said input device; and wherein said calculating means further comprises:
means for obtaining sensitivity factors of changes in future controlled variables with respect to increments in the manipulated variables,
means for forming a sensitivity matrix by arranging the sensitivity factors,
means for obtaining singular values of the sensitivity matrix, and
means for determining the control horizon by comparing the singular values with said first robust performance parameter, a determined control horizon being displayed by said display means and transferred to said arithmetic means.

16. The model predictive control apparatus as set forth in claim 14, wherein said reading means receives a second robust performance parameter relating to a threshold value of stability margin through said input device; and wherein said calculating means further comprises:
means for varying the weighting factors and the parameters of the pole assignment polynomial of a closed loop step by step with constant increments,
means for obtaining a value of a sensitivity function,
means for comparing an obtained sensitivity function value with said second robust parameter to judge whether the maximum singular value of the sensitivity function satisfies a predetermined requirement, and
means for repeating said varying of said weighting factors and parameters until said requirement is satisfied, determined weighting factors or parameters of the pole assignment polynomial of a closed loop being displayed by said display means and transferred to said arithmetic means.

17. The model predictive control apparatus as set forth in claim 14, wherein said reading means receives a third robust performance parameter relating to robust stability margin through said input device; and wherein said calculating means further comprises:
means for varying the weighting factors and the parameters of the pole assignment polynomial of a closed loop step by step with constant increments,
means for obtaining a value of a complementary sensitivity function,
means for comparing an obtained value of the complementary sensitivity function with said third robust parameter to judge whether the maximum singular value of the complementary sensitivity function satisfies a predetermined requirement, and
means for repeating said varying of said weighting factors and parameters until said requirement is satisfied, determined weighting factors or parameters of the pole assignment polynomial of a closed loop being displayed by said display means and transferred to said arithmetic means.

18. A model predictive control apparatus comprising:
prediction means in which a model approximating a dynamic characteristic of a controlled system is used to determine a predictive equation of future values of controlled variables;
arithmetic means for calculating or determining a manipulated variable to minimize an cost function in a quadratic form relating to a difference between a future reference value and a controlled variable, and a manipulated variable set on the basis of said predictive equation while satisfying a limit condition to give the manipulated variable thus calculated to said controlled system;
response time constant setting means for setting a response time constant indicating a rise time at which said controlled system should be operated;
weighting factor parameter calculation means for calculating a weighting factor including said response time constant at its exponential part, the value thereof increasing with lapse of time, and
cost function setting means for constructing a new cost function in which the calculated weighting coefficient is built in to set it as said cost function.

19. A model predictive control apparatus as set forth in claim 18, which further comprises:
- arithmetic means for calculating a stability margin parameter indicating a stability with respect to a change in the controlled system of the model predictive control system where said new cost function is set;
- simulation means for recording the value of said stability margin parameter corresponding to an instantaneous value of said response time constant while changing the value of the response time constant set at said response time constant setting means; and
- display means for visually displaying the relationship between the value of the recorded response time constant and the value of the stability margin parameter.

20. A model predictive control apparatus as set forth in claim 18, which further comprises:
- arithmetic means for calculating a stability margin parameter indicating a stability with respect to a change of the controlled system of the model predictive control system where said new cost function is set;
- stability margin parameter setting means for storing the designated stability margin parameter; and
- response time constant adjustment means for changing the value of the response time constant held by said response time constant setting means until the value of said calculated stability margin parameter becomes in correspondence with the value of the stability margin parameter stored in said stability margin parameter setting means.

21. A model predictive control apparatus as set forth in claim 18, wherein said new cost function is an cost function expressed below, obtained by multiplying the term relating to a controlled variable y(k+j), a reference value y*(k+j), a manipulated variable increment $\Delta u(k+j)$, and polynomial $D(Z^{-1})$ for determining a closed loop pole assignment by weighting factor $\rho = \exp(-\Delta/Tr)$ where $\Delta$ is a control period, and Tr is a response time constant:

$$J = \sum_{i=L}^{Np+L-1} \rho^{-2i}\{D(z^{-1})(y(k+i) - y^*(k+i))\}^2 + \lambda \sum_{i=1}^{Nu} \rho^{-2i+2}(\Delta u(k+i-1))^2$$

* * * * *